US011347760B2

(12) United States Patent
Kwok et al.

(10) Patent No.: US 11,347,760 B2
(45) Date of Patent: May 31, 2022

(54) SYSTEMS AND METHODS FOR INDEXING CONTENT

(71) Applicant: GOOGLE LLC, Mountain View, CA (US)

(72) Inventors: Chung Tin Kwok, Mountain View, CA (US); Lei Zhong, Mountain View, CA (US); Zhihuan Qiu, Santa Clara, CA (US); Hyung J. Kim, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/248,927

(22) Filed: Feb. 12, 2021

(65) Prior Publication Data
US 2021/0165799 A1 Jun. 3, 2021

Related U.S. Application Data

(63) Continuation of application No. 16/691,872, filed on Nov. 22, 2019, now Pat. No. 10,963,472, which is a (Continued)

(51) Int. Cl.
| | |
|---|---|
| *G06F 16/30* | (2019.01) |
| *G06F 16/2457* | (2019.01) |
| *G06F 16/248* | (2019.01) |
| *G06F 16/951* | (2019.01) |
| *G06F 16/22* | (2019.01) |

(52) U.S. Cl.
CPC .... *G06F 16/24578* (2019.01); *G06F 16/2228* (2019.01); *G06F 16/248* (2019.01); *G06F 16/951* (2019.01)

(58) Field of Classification Search
CPC .......... G06F 16/2228; G06F 16/24578; G06F 16/248; G06F 16/951
See application file for complete search history.

(56) References Cited

U.S. PATENT DOCUMENTS

| 6,547,829 B1 | 4/2003 | Meyerzon et al. |
| 6,631,496 B1 | 10/2003 | Li et al. |

(Continued)

OTHER PUBLICATIONS

Article entitled "Webmaster Tools Help", by Google, dated Feb. 10, 2010, available at https://web.archive.org/web/20100210032855/http://www.google.com/support/webmasters/bin/answer.py?hl=en&answer=34592 (Year: 2010).*

(Continued)

*Primary Examiner* — Mahesh H Dwivedi
(74) *Attorney, Agent, or Firm* — Brake Hughes Bellermann LLP

(57) ABSTRACT

A system, computer-readable storage medium storing at least one program, and a computer-implemented method for expedited indexing of content is presented. Submitted content is received via a user interface, where the submitted content is copy-and-pasted content from an entity claiming authorship of the content. A link identifying an Internet address hosting the submitted is also received. Responsive to determining the submitted content is new relative to known content, the submitted content is indexed without visiting the Internet address.

20 Claims, 27 Drawing Sheets

Related U.S. Application Data continuation of application No. 16/220,939, filed on Dec. 14, 2018, now Pat. No. 10,503,740, which is a continuation of application No. 16/052,210, filed on Aug. 1, 2018, now Pat. No. 10,204,145, which is a continuation of application No. 14/401,828, filed as application No. PCT/US2013/041722 on May 17, 2013, now abandoned, and a continuation of application No. PCT/US2013/041717, filed on May 17, 2013, and a continuation of application No. PCT/US2013/041723, filed on May 17, 2013.

(60) Provisional application No. 61/648,546, filed on May 17, 2012, provisional application No. 61/648,562, filed on May 17, 2012, provisional application No. 61/648,553, filed on May 17, 2012.

(56) References Cited

U.S. PATENT DOCUMENTS

| | | |
|---|---|---|
| 6,658,423 B1 | 12/2003 | Pugh et al. |
| 7,627,613 B1 | 12/2009 | Dulitz et al. |
| 8,136,025 B1 | 3/2012 | Zhu et al. |
| 8,140,505 B1 | 3/2012 | Jain et al. |
| 8,280,782 B1 | 10/2012 | Talreja et al. |
| 8,874,586 B1 | 10/2014 | Sommers et al. |
| 8,909,625 B1 | 12/2014 | Stewenius |
| 8,983,970 B1 | 3/2015 | Osinga et al. |
| 9,521,182 B1 | 12/2016 | Tang et al. |
| 2002/0198866 A1 | 12/2002 | Kraft et al. |
| 2005/0060312 A1 | 3/2005 | Curtiss et al. |
| 2007/0208703 A1 | 9/2007 | Shi et al. |
| 2007/0208788 A1 | 9/2007 | Chakravarty et al. |
| 2007/0266001 A1 | 11/2007 | Williams et al. |
| 2007/0300249 A1 | 12/2007 | Smith et al. |
| 2008/0154889 A1 | 6/2008 | Pfeiffer |
| 2008/0263026 A1 | 10/2008 | Sasturkar et al. |
| 2008/0288509 A1 | 11/2008 | Mysen et al. |
| 2009/0030680 A1 | 1/2009 | Mamou |
| 2009/0157490 A1 | 6/2009 | Lawyer |
| 2011/0246456 A1 | 10/2011 | Weitz et al. |
| 2012/0117043 A1 | 5/2012 | Radlinski et al. |
| 2012/0130814 A1 | 5/2012 | Hayes |
| 2012/0150972 A1 | 6/2012 | Morris et al. |
| 2013/0246384 A1 | 9/2013 | Victor |

OTHER PUBLICATIONS

International Search Report and Written Opinion, PCT/US2013/041717, dated Sep. 2, 2013, 10 pages.
International Search Report and Written Opinion, PCT/US2013/041722, dated Aug. 19, 2013, 11 pages.
International Search Report and Written Opinion, PCT/US2013/041723, dated Nov. 13, 2013, 9 pages.
"Add Your URL to Google", Google, Apr. 11, 2011, 1 page.
"File Harvest: Targeted, Legal Crawling and Downloading of Online Media", Sowaid, 2009, 70 pages.
"Submit URLS To Google With Fetch as Googlebot", Google, Aug. 3, 2011, 4 pages.
U.S. Appl. No. 16/691,872, filed Nov. 22, 2019, Allowed.
U.S. Appl. No. 16/220,939, filed Dec. 14, 2018, Issued.
U.S. Appl. No. 16/052,210, filed Aug. 1, 2018, Issued.
U.S. Appl. No. 14/401,828, filed Nov. 17, 2014, Abandoned.

* cited by examiner

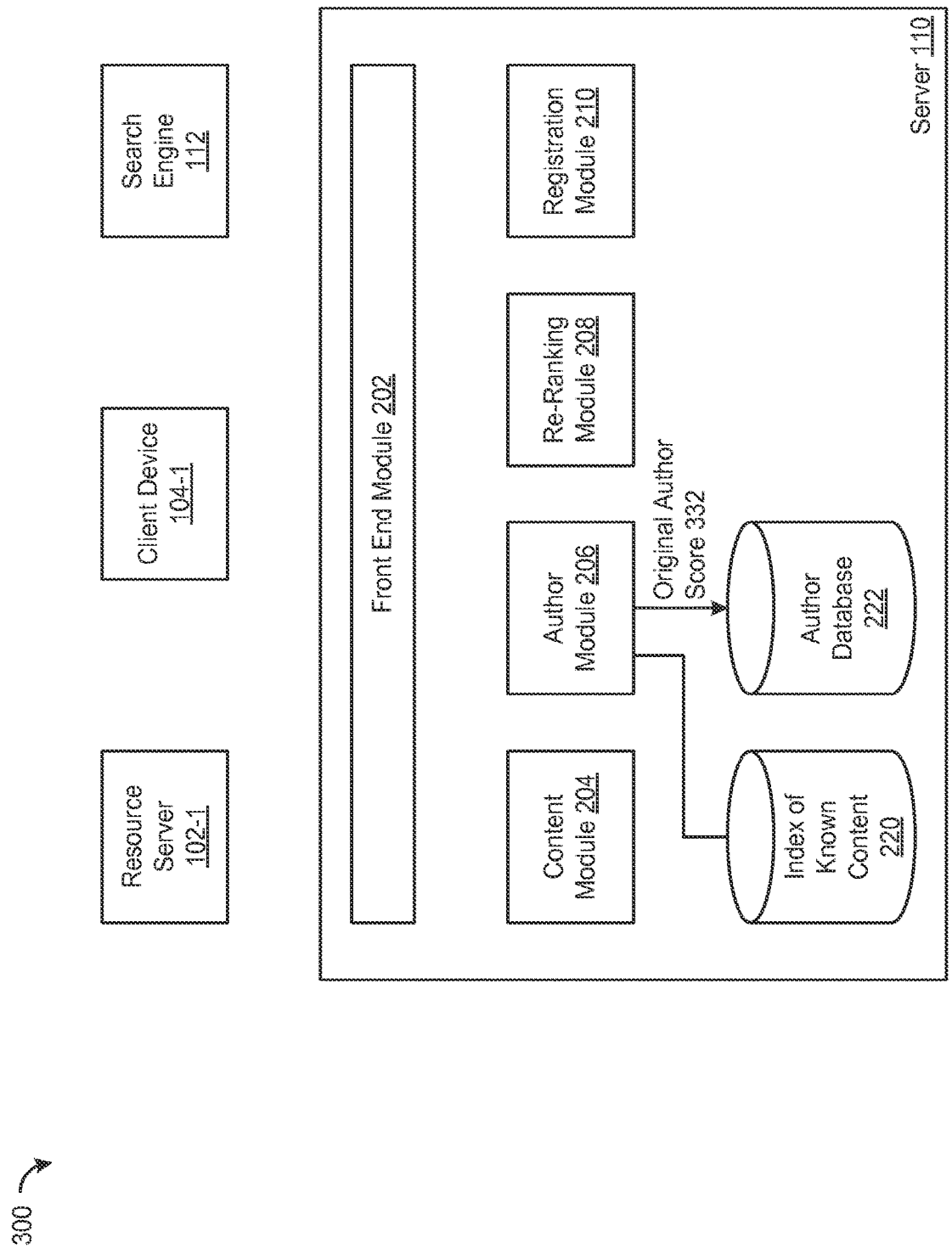

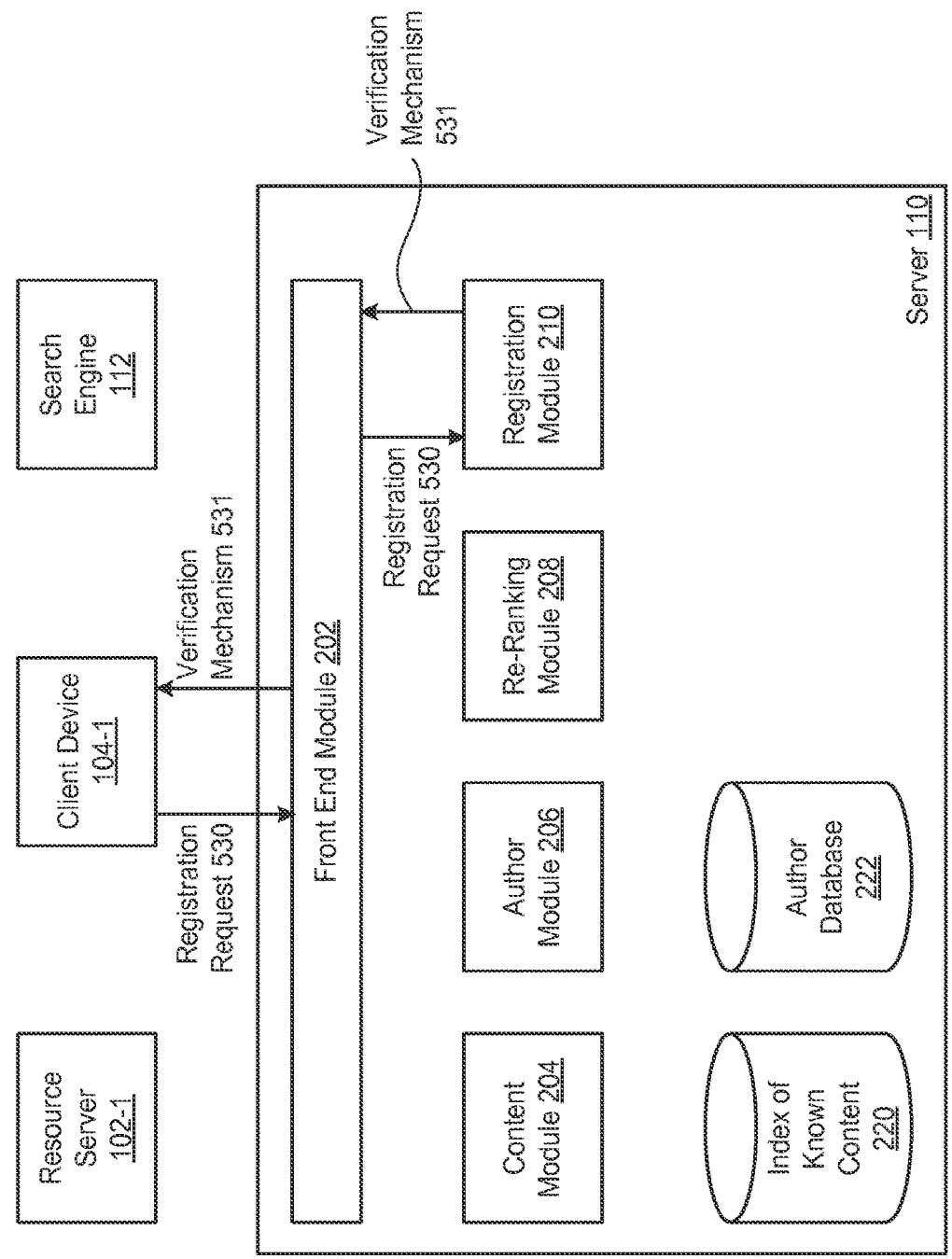

2104

2208 — When (i) at least the first predetermined threshold number of the set of shingles representing the submitted content is included in the first plurality of shingles representing the known content, (ii) at least a second predetermined threshold number of the set of shingles representing the submitted content is included in a second plurality of shingles representing other submitted content identified as being published by the entity, and (iii) at least a third predetermined threshold of corresponding shingles in the second plurality of shingles representing the other submitted content are first instances with respect to corresponding shingles in the first plurality of shingles representing the known content determining that the submitted content is new relative to the known content.

2210 — When (i) at least the first predetermined threshold number of the set of shingles representing the submitted content is included in the first plurality of shingles representing the known content, (ii) at least a second predetermined threshold number of the set of shingles representing the submitted content is included in a second plurality of shingles representing other submitted content identified as being published by the entity, and (iii) less than a third predetermined threshold of corresponding shingles in the second plurality of shingles representing the other submitted content are first instances with respect to corresponding shingles in the first plurality of shingles representing the known content, determine that the submitted content is not new relative to the known content 2212 — When (i) at least the first predetermined threshold number of the set of shingles representing the submitted content is included in the first plurality of shingles representing the known content, and (ii) less than a second predetermined threshold number of the set of shingles representing the submitted content is included in a second plurality of shingles representing other submitted content identified as being published by the entity, determine that the submitted content is not new relative to the known content.

| 2302 | Identify a second plurality of shingles representing the other submitted content identified as being published by the entity |

↓

| 2304 | Determine that at least a third predetermined threshold number of the second plurality of shingles representing the other submitted content identified as being published by the entity are first instances with respect to corresponding shingles in a first plurality of shingles representing the known content |

↓

| 2306 | Responsive to the determining, determine that the entity is an author of original content |

| 2402 | Determine a first number of the second plurality of shingles representing the other submitted content identified as being published by the entity that are unique with respect to the first plurality of shingles representing the known content |

↓

| 2404 | Determine a second number of the second plurality of shingles representing the other submitted content identified as being published by the entity that are not unique with respect to the shingles for the known content but that are associated with timestamps that precede timestamps for corresponding shingles in the first plurality of shingles representing the known content |

↓

| 2406 | Determine that a sum of the first number and the second number is at least the third predetermined threshold number |

2902 — Identify a plurality of shingles representing content, including the submitted content, in the index of known content identified as being associated with the entity 2904 — Calculate a percentage of the plurality of shingles that are first instances of the shingles in the index of known content

3002 — Determine a first number of the plurality of shingles, each having an associated timestamp, for which there are no identical shingles in the index of known content having an earlier timestamp 3004 — Calculate the percentage as a quotient of the first number and a total number of shingles in the plurality of shingles

3102 — Identify a plurality of portions of content, including the submitted content, in the index of known content identified as being associated with the entity 3104 — Calculate a percentage of the plurality of the portions that are first instances of the portions of content in the index of known content

Figure 31

United States Patent

US 11,347,760 B2

SYSTEMS AND METHODS FOR INDEXING CONTENT

CROSS REFERENCE TO RELATED APPLICATIONS

This application is a Continuation of U.S. application Ser. No. 16/691,872, filed Nov. 22, 2019, which is a Continuation of U.S. application Ser. No. 16/220,939, filed Dec. 14, 2018, which is a Continuation of U.S. application Ser. No. 16/052,210, filed Aug. 1, 2018, which is a Continuation of U.S. application Ser. No. 14/401,828, filed Nov. 17, 2014, which is a U.S. National Stage under C.F.R. § 371 of PCT Application No. PCT/US2013/041722, filed May 17, 2013, which claims the benefit of U.S. Provisional Application Nos. 61/648,553, filed May 17, 2012. U.S. application Ser. No. 14/401,828, filed Nov. 17, 2014 is also a continuation of PCT/US2013/041717, filed May 17, 2013, which claims the benefit of U.S. Provisional Application No. 61/648,546, filed May 17, 2012, and is also a continuation of PCT Application No. PCT/US2013/041723, filed May 17, 2013, which claims the benefit of U.S. Provisional Application No. 61/648,562, filed May 17, 2012. All of the aforementioned applications are hereby incorporated by reference herein in their entireties.

TECHNICAL FIELD

The disclosed embodiments relate generally re-ranking ranked search results.

BACKGROUND

When a user submits a search query to a search engine, the search engine identifies search results satisfying the search query and ranks the search results based on a number of ranking factors (e.g., relative relevance of search results). The ranked search results search results based on a may include two search results that have similar (or substantially the same) content. For example, a first document corresponding to a first search result may be associated with a first entity that is known to not produce original content (e.g., the first entity copies or otherwise redistributes original content authored by other entities). In contrast, a second document corresponding to a second search result may be associated with a second entity that is known to produce original content. In some instances, it is desirable to rank the search results that correspond to documents that are associated with entities that are authors of original content higher than search results corresponding to documents that associated with entities that are not authors of original content even though the documents associated with entities that are not authors of original content have higher relevancy scores.

SUMMARY

One aspect of the present disclosure provides a computer-implemented method for crawling and indexing content, performed on a server system having at least one processor and memory storing at least one program for execution by the at least one processor to perform the method, comprising receiving a message, the message including (i) submitted content, where the submitted content is identified as being published by an entity, and (ii) a link to location on a resource hosting the submitted content; evaluating whether the submitted content is represented in an index of known content to determine whether the submitted content is new relative to the known content; and in response to the evaluating, issuing a request to a search engine to crawl and index the submitted content hosted by the resource associated with the link when the submitted content is new relative to the known content, where the request to the search engine to crawl and index the submitted content hosted by the resource associated with the link is issued responsive to determining that the submitted content is deemed to not be represented in the index of known content.

In some embodiments, the request is a high priority request that is directed to a high priority crawler of the search engine, and where a time when the high priority crawler of the search engine is scheduled to crawl the submitted content occurs before a time when a standard crawler of the search engine is scheduled to crawl the submitted content.

In some embodiments, the evaluating whether the submitted content is represented in the index of known content to determine whether the submitted content is new relative to the known content includes: identifying a set of shingles representing the submitted content, a respective shingle in the set of shingles including a predetermined number of consecutive tokens for the submitted content; comparing the set of shingles representing the submitted content with a first plurality of shingles representing the known content; and when less than a first predetermined threshold number of the set of shingles representing the submitted content is included in the first plurality of shingles representing the known content, determining that the submitted content is new relative to the known content. In some embodiments, (i) at least the first predetermined threshold number of the set of shingles representing the submitted content is included in the first plurality of shingles representing the known content, (ii) at least a second predetermined threshold number of the set of shingles representing the submitted content is included in a second plurality of shingles representing other submitted content identified as being published by the entity, and (iii) at least a third predetermined threshold of corresponding shingles in the second plurality of shingles representing the other submitted content are first instances with respect to corresponding shingles in the first plurality of shingles representing the known content, the method includes: determining that the submitted content is new relative to the known content.

In some embodiments, when (i) at least the first predetermined threshold number of the set of shingles representing the submitted content is included in the first plurality of shingles representing the known content, (ii) at least a second predetermined threshold number of the set of shingles representing the submitted content is included in a second plurality of shingles representing other submitted content identified as being published by the entity, and (iii) less than a third predetermined threshold of corresponding shingles in the second plurality of shingles representing the other submitted content are first instances with respect to corresponding shingles in the first plurality of shingles representing the known content, the method includes: determining that the submitted content is not new relative to the known content.

In some embodiments when (i) at least the first predetermined threshold number of the set of shingles representing the submitted content is included in the first plurality of shingles representing the known content, and (ii) less than a second predetermined threshold number of the set of shingles representing the submitted content is included in a second plurality of shingles representing other submitted content identified as being published by the entity, the method includes: determining that the submitted content is not new relative to the known content.

In some embodiments, prior to issuing the request to the search engine to crawl and index the submitted content hosted by the resource associated with the link, the method includes determining that the entity is an author of original content based on an evaluation of other submitted content identified as being published by the entity, where the other submitted content identified as being published by the entity is included in the known content; and the request to the search engine to crawl and index the submitted content hosted by the resource associated with the link is issued responsive to determining that the submitted content is deemed to not be represented in the index of known content and determining that the entity is an author of original content.

In some embodiments, the disclosure further provides determining that the entity is an author of original content based on the other submitted content identified as being published by the entity includes: identifying a second plurality of shingles representing the other submitted content identified as being published by the entity; determining that at least a third predetermined threshold number of the second plurality of shingles representing the other submitted content identified as being published by the entity are first instances with respect to corresponding shingles in a first plurality of shingles representing the known content; and responsive to the determining, determining that the entity is an author of original content.

In some embodiments, the disclosure further provides determining that at least the third predetermined threshold number of the second plurality of shingles representing the other submitted content identified as being published by the entity are first instances with respect to the corresponding shingles in the first plurality of shingles representing the known content includes: determining a first number of the second plurality of shingles representing the other submitted content identified as being published by the entity that are unique with respect to the first plurality of shingles representing the known content; determining a second number of the second plurality of shingles representing the other submitted content identified as being published by the entity that are not unique with respect to the shingles for the known content but that are associated with timestamps that precede timestamps for corresponding shingles in the first plurality of shingles representing the known content; and determining that a sum of the first number and the second number is at least the third predetermined threshold number.

In some embodiments, the disclosure further provides identifying a set of shingles for the submitted content; for each respective shingle in the set of shingles, applying a hash function to the shingle to produce a respective hash value for the respective shingle; and storing the link to a location on the resource hosting the submitted content and a timestamp of the message in a record in the index of known content indexed by the respective hash value.

In some embodiments, for each respective shingle in the set of shingles, storing an identifier for the entity in the record of the index of known content. In some embodiments, the request to the search engine includes the link to the location on the resource and a timestamp associated with the message, and where the timestamp associated with the message is included in a search index entry for the submitted content. In some embodiments, the message is received in response to the entity publishing the submitted content on a website. In some embodiments, the message is received in response to the entity submitting the submitted content and the link to the location on the resource hosting the submitted content using a user interface provided by the server.

In some embodiments, the message is received in response to the entity submitting the submitted content using a user interface provided by the server, and where the submitted content is marked as being submitted by the entity prior to publication of the submitted content by the entity. In some embodiments, the entity includes at least one author of content. In some embodiments, the entity includes at least one publisher of content. In some embodiments, the entity includes at least one website.

In some embodiments, (i) a respective link to a respective location on a respective resource hosting a respective known content and (ii) a timestamp associated with the respective known content are included in a respective record of the index of known content indexed by a respective hash value for a respective shingle of the respective known content.

In some embodiments, prior to receiving the message, the method includes: receiving, from a client device of the entity, a registration request to register the entity as a registered author of content; providing, to the client device of the entity, at least one verification mechanism to verify that the entity is an author of content; responsive to the providing, receiving, from the client device of the entity, a verification request to verify that the entity is an author of content using the at least one verification mechanism; verifying that the entity is an author of content using the at least one verification mechanism; and registering the entity as a registered author of content.

Another aspect of the present disclosure provides a system to crawl and index content, comprising: at least one processor; memory; and at least one program stored in the memory and executable by the at least one processor, the at least one program comprising instructions to: receive a message, the message including (i) submitted content, where the submitted content is identified as being published by an entity, and (ii) a link to a location on a resource hosting the submitted content; evaluate whether the submitted content is represented in an index of known content to determine whether the submitted content is new relative to the known content; and in response to the evaluating, issue a request to a search engine to crawl and index the submitted content hosted by the resource associated with the link when the submitted content is new relative to the known content, where the request to the search engine to crawl and index the submitted content hosted by the resource associated with the link is issued responsive to determining that the submitted content is deemed to not be represented in the index of known content.

In some embodiments, the request is a high priority request that is directed to a high priority crawler of the search engine, and a time when the high priority crawler of the search engine is scheduled to crawl the submitted content occurs before a time when a standard crawler of the search engine is scheduled to crawl the submitted content.

In some embodiments, the instructions to evaluate whether the submitted content is represented in the index of known content to determine whether the submitted content is new relative to the known content include instructions to: identify a set of shingles representing the submitted content, a respective shingle in the set of shingles including a predetermined number of consecutive tokens for the submitted content; compare the set of shingles representing the submitted content with a first plurality of shingles representing the known content; and when less than a first predetermined threshold number of the set of shingles representing the submitted content is included in the first plurality of shingles representing the known content, determine that the submitted content is new relative to the known content.

In some embodiments, when (i) at least the first predetermined threshold number of the set of shingles representing the submitted content is included in the first plurality of shingles representing the known content, (ii) at least a second predetermined threshold number of the set of shingles representing the submitted content is included in a second plurality of shingles representing other submitted content identified as being published by the entity, and (iii) at least a third predetermined threshold of corresponding shingles in the second plurality of shingles representing the other submitted content are first instances with respect to corresponding shingles in the first plurality of shingles representing the known content, the at least one program includes instructions to: determine that the submitted content is new relative to the known content.

In some embodiments, when (i) at least the first predetermined threshold number of the set of shingles representing the submitted content is included in the first plurality of shingles representing the known content, (ii) at least a second predetermined threshold number of the set of shingles representing the submitted content is included in a second plurality of shingles representing other submitted content identified as being published by the entity, and (iii) less than a third predetermined threshold of corresponding shingles in the second plurality of shingles representing the other submitted content are first instances with respect to corresponding shingles in the first plurality of shingles representing the known content, the at least one program includes instructions to: determine that the submitted content is not new relative to the known content.

In some embodiments, when (i) at least the first predetermined threshold number of the set of shingles representing the submitted content is included in the first plurality of shingles representing the known content, and (ii) less than a second predetermined threshold number of the set of shingles representing the submitted content is included in a second plurality of shingles representing other submitted content identified as being published by the entity, the at least one program includes instructions to: determine that the submitted content is not new relative to the known content.

In some embodiments, prior to issuing the request to the search engine to crawl and index the submitted content hosted by the resource associated with the link, the at least one program includes instructions to determine that the entity is an author of original content based on an evaluation of other submitted content identified as being published by the entity, where the other submitted content identified as being published by the entity is included in the known content; and where the request to the search engine to crawl and index the submitted content hosted by the resource associated with the link is issued responsive to determining that the submitted content is deemed to not be represented in the index of known content and determining that the entity is an author of original content.

In some embodiments, the instructions to determine that the entity is an author of original content based on the other submitted content identified as being published by the entity include instructions to: identify a second plurality of shingles representing the other submitted content identified as being published by the entity; determine that at least a third predetermined threshold number of the second plurality of shingles representing the other submitted content identified as being published by the entity are first instances with respect to corresponding shingles in a first plurality of shingles representing the known content; and responsive to the determining, determine that the entity is an author of original content.

In some embodiments, the instructions to determine that at least the third predetermined threshold number of the second plurality of shingles representing the other submitted content identified as being published by the entity are first instances with respect to the corresponding shingles in the first plurality of shingles representing the known content include instructions to: determine a first number of the second plurality of shingles representing the other submitted content identified as being published by the entity that are unique with respect to the first plurality of shingles representing the known content; determine a second number of the second plurality of shingles representing the other submitted content identified as being published by the entity that are not unique with respect to the shingles for the known content but that are associated with timestamps that precede timestamps for corresponding shingles in the first plurality of shingles representing the known content; and determine that a sum of the first number and the second number is at least the third predetermined threshold number.

In some embodiments, the computer implemented method further comprises instructions to: identify a set of shingles for the submitted content; for each respective shingle in the set of shingles, apply a hash function to the shingle to produce a respective hash value for the respective shingle; and store the link to the location on the resource hosting the submitted content and a timestamp of the message in a record in the index of known content indexed by the respective hash value.

In some embodiments, the computer implemented method further comprises instructions to, for each respective shingle in the set of shingles, store an identifier for the entity in the record of the index of known content.

In some embodiments, the request to the search engine includes the link to the location on the resource and a timestamp associated with the message, and where the timestamp associated with the message is included in a search index entry for the submitted content.

In some embodiments, the message is received in response to the entity publishing the submitted content on a website. In some embodiments, the message is received in response to the entity submitting the submitted content and the link to the location on the resource hosting the submitted content using a user interface provided by the server.

In some embodiments, the message is received in response to the entity submitting the submitted content using a user interface provided by the server, and where the submitted content is marked as being submitted by the entity prior to publication of the submitted content by the entity. In some embodiments, the entity includes at least one author of content. In some embodiments, the entity includes at least one publisher of content. In some embodiments, the entity includes at least one website.

In some embodiments, (i) a respective link to a respective location on a respective resource hosting a respective known content and (ii) a timestamp associated with the respective known content are included in a respective record of the index of known content indexed by a respective hash value for a respective shingle of the respective known content. In some embodiments, prior to receiving the message, the at least one program includes instructions to: receive, from a client device of the entity, a registration request to register the entity as a registered author of content; provide, to the client device of the entity, at least one verification mechanism to verify that the entity is an author of content; responsive to the providing, receive, from the client device of the entity, a verification request to verify that the entity is an author of content using the at least one verification mechanism; verify that the entity is an author of content using the at least one verification mechanism; and register the entity as a registered author of content.

Another aspect of the present disclosure provides a non-transitory computer readable storage medium storing at least one program configured for execution by at least one processor of a computer system, the at least one program comprising instructions to: receive a message, the message including (i) submitted content, where the submitted content is identified as being published by an entity, and (ii) a link to a location on a resource hosting the submitted content; evaluate whether the submitted content is represented in an index of known content to determine whether the submitted content is new relative to the known content; and in response to the evaluating, issue a request to a search engine to crawl and index the submitted content hosted by the resource associated with the link when the submitted content is new relative to the known content, where the request to the search engine to crawl and index the submitted content hosted by the resource associated with the link is issued responsive to determining that the submitted content is deemed to not be represented in the index of known content.

In some embodiments, the request is a high priority request that is directed to a high priority crawler of the search engine, and where a time when the high priority crawler of the search engine is scheduled to crawl the submitted content occurs before a time when a standard crawler of the search engine is scheduled to crawl the submitted content.

In some embodiments, the instructions to evaluate whether the submitted content is represented in the index of known content to determine whether the submitted content is new relative to the known content include instructions to: identify a set of shingles representing the submitted content, a respective shingle in the set of shingles including a predetermined number of consecutive tokens for the submitted content; compare the set of shingles representing the submitted content with a first plurality of shingles representing the known content; and when less than a first predetermined threshold number of the set of shingles representing the submitted content is included in the first plurality of shingles representing the known content, determine that the submitted content is new relative to the known content.

In some embodiments, when (i) at least the first predetermined threshold number of the set of shingles representing the submitted content is included in the first plurality of shingles representing the known content, (ii) at least a second predetermined threshold number of the set of shingles representing the submitted content is included in a second plurality of shingles representing other submitted content identified as being published by the entity, and (iii) at least a third predetermined threshold of corresponding shingles in the second plurality of shingles representing the other submitted content are first instances with respect to corresponding shingles in the first plurality of shingles representing the known content, the at least one program includes instructions to: determine that the submitted content is new relative to the known content.

In some embodiments, when (i) at least the first predetermined threshold number of the set of shingles representing the submitted content is included in the first plurality of shingles representing the known content, (ii) at least a second predetermined threshold number of the set of shingles representing the submitted content is included in a second plurality of shingles representing other submitted content identified as being published by the entity, and (iii) less than a third predetermined threshold of corresponding shingles in the second plurality of shingles representing the other submitted content are first instances with respect to corresponding shingles in the first plurality of shingles representing the known content, the at least one program includes instructions to: determine that the submitted content is not new relative to the known content.

In some embodiments, when (i) at least the first predetermined threshold number of the set of shingles representing the submitted content is included in the first plurality of shingles representing the known content, and (ii) less than a second predetermined threshold number of the set of shingles representing the submitted content is included in a second plurality of shingles representing other submitted content identified as being published by the entity, the at least one program includes instructions to: determine that the submitted content is not new relative to the known content.

In some embodiments, prior to issuing the request to the search engine to crawl and index the submitted content hosted by the resource associated with the link, the at least one program includes instructions to determine that the entity is an author of original content based on an evaluation of other submitted content identified as being published by the entity, where the other submitted content identified as being published by the entity is included in the known content; and where the request to the search engine to crawl and index the submitted content hosted by the resource associated with the link is issued responsive to determining that the submitted content is deemed to not be represented in the index of known content and determining that the entity is an author of original content.

In some embodiments, the instructions to determine that the entity is an author of original content based on the other submitted content identified as being published by the entity include instructions to: identify a second plurality of shingles representing the other submitted content identified as being published by the entity; determine that at least a third predetermined threshold number of the second plurality of shingles representing the other submitted content identified as being published by the entity are first instances with respect to corresponding shingles in a first plurality of shingles representing the known content; and responsive to the determining, determine that the entity is an author of original content.

In some embodiments, the instructions to determine that at least the third predetermined threshold number of the second plurality of shingles representing the other submitted content identified as being published by the entity are first instances with respect to the corresponding shingles in the first plurality of shingles representing the known content include instructions to: determine a first number of the second plurality of shingles representing the other submitted content identified as being published by the entity that are unique with respect to the first plurality of shingles representing the known content; determine a second number of the second plurality of shingles representing the other submitted content identified as being published by the entity that are not unique with respect to the shingles for the known content but that are associated with timestamps that precede timestamps for corresponding shingles in the first plurality of shingles representing the known content; and determine that a sum of the first number and the second number is at least the third predetermined threshold number.

In some embodiments, the non-transitory computer readable storage medium further comprises instructions to: identify a set of shingles for the submitted content; for each respective shingle in the set of shingles, apply a hash function to the shingle to produce a respective hash value for the respective shingle; and store the link to the location on the resource hosting the submitted content and a timestamp of the message in a record in the index of known content indexed by the respective hash value.

In some embodiments, the non-transitory computer readable storage medium further comprises instructions to, for each respective shingle in the set of shingles, store an identifier for the entity in the record of the index of known content. In some embodiments the request to the search engine includes the link to the location on the resource and a timestamp associated with the message, and the timestamp associated with the message is included in a search index entry for the submitted content. In some embodiments, the message is received in response to the entity publishing the submitted content on a website. In some embodiments, the message is received in response to the entity submitting the submitted content and the link to the location on the resource hosting the submitted content using a user interface provided by the server. In some embodiments, the message is received in response to the entity submitting the submitted content using a user interface provided by the server, and where the submitted content is marked as being submitted by the entity prior to publication of the submitted content by the entity. In some embodiments, the entity includes at least one author of content. In some embodiments, the entity includes at least one publisher of content. In some embodiments, the entity includes at least one website.

In some embodiments, (i) a respective link to a respective location on a respective resource hosting a respective known content and (ii) a timestamp associated with the respective known content are included in a respective record of the index of known content indexed by a respective hash value for a respective shingle of the respective known content.

In some embodiments, prior to receiving the message, the at least one program includes instructions to: receive, from a client device of the entity, a registration request to register the entity as a registered author of content; provide, to the client device of the entity, at least one verification mechanism to verify that the entity is an author of content; responsive to the providing, receive, from the client device of the entity, a verification request to verify that the entity is an author of content using the at least one verification mechanism; verify that the entity is an author of content using the at least one verification mechanism; and register the entity as a registered author of content.

Another aspect of the present disclosure provides a non-transitory computer readable storage medium storing at least one program configured for execution by at least one processor of a system, the at least one program comprising instructions to be executed by the at least one processor so as to perform any of the methods disclosed herein.

Another aspect of the present disclosure provides a system, comprising at least one processor; and memory storing at least one program for execution by the at least one processor; the system including means for performing the computer-implemented method of any of the methods disclosed herein.

Another aspect of the present disclosure provides a computer-implemented method for re-ranking ranked search results, performed on a server system having at least one processor and memory storing at least one program for execution by the at least one processor to perform the method, comprising: obtaining ranked search results satisfying a search query, the ranked search results including a first search result corresponding to a first document associated with a first entity and a second search result corresponding to a second document associated with a second entity, the first search result being ranked higher than the second search result; determining that the first document and the second document satisfy a similarity criterion; determining that the second entity satisfies a predefined authorship differential with respect to the first entity; and responsive to determining that the second entity satisfies the predefined authorship differential with respect to the first entity, swapping the second search result and the first search result in the ranked search results to produce re-ranked search results.

In some embodiments, the determining that the first document and the second document satisfy the similarity criterion includes: identifying a first plurality of portions of content for the first document; identifying a second plurality of portions of content for the second document; and determining that at least a predetermined number of portions in the first plurality of portions of content and in the second plurality of portions of content are identical. In some embodiments, respective portions of content in the first plurality of portions of content and the second plurality of portions of content include a predetermined amount of data.

In some embodiments, the predetermined number of portions encompasses a predetermined percentage of the data in the first document. In some embodiments, the predetermined number of portions is a threshold percentage of the portions of content in the first plurality of portions of content. In some embodiments, the determining that the first document and the second document satisfy the similarity criterion includes: identifying a first plurality of shingles for the first document; identifying a second plurality of shingles for the second document; and determining that a predetermined quantity of shingles in the first plurality of shingles and in the second plurality of shingles of content are identical.

In some embodiments, the first document and the second document satisfy the similarity criterion when a character count of the first document and a character count of the second document deviate by less than a character count threshold. In some embodiments, the first document and the second document satisfy the similarity criterion when a Levenshtein edit distance from the first document to the second document is less than a predetermined number of character edits.

In some embodiments, the determining that the second entity satisfies the predefined authorship differential with respect to the first entity includes: determining an author score for the first entity and an author score for the second entity, where the author score for a respective entity, in the set of entities consisting of the first entity and the second entity, indicates a likelihood that the respective entity is an author of original content; and when the composite author score for the second entity deviates from the composite author score for the first entity by at least a predetermined threshold, determining that the second entity satisfies the predefined authorship differential with respect to the first entity.

In some embodiments, the determining the author score for a respective entity includes: determining a citation score for the respective entity, where the citation score corresponds to a frequency at which content associated with the respective entity is cited; determining an original author score for the respective entity, where the original author score corresponds to a percentage of content associated with the respective entity that is a first instance of the content in an index of known content; and combining the citation score and the original author score using a predetermined function to produce the author score.

In some embodiments, the determining the citation score for the respective entity includes calculating the citation score as a quotient of a number of citations to content that is associated with the respective entity and a quantity of content that has at least one citation.

In some embodiments, the determining the original author score for the respective entity includes: identifying a plurality of shingles representing content in the index of known content identified as being associated with the respective entity; and calculating a percentage of the plurality of shingles that are first instances of the shingles in the index of known content.

In some embodiments the calculating the percentage of the plurality of shingles that are first instances includes: determining a first number of the plurality of shingles, each having an associated timestamp, for which there are no identical shingles in the index of known content having an earlier timestamp; and calculating the percentage as a quotient of the first number and a total number of shingles in the plurality of shingles.

In some embodiments, the determining the original author score for the respective entity includes: identifying a plurality of portions of content in the index of known content identified as being associated with the respective entity, each portion in the plurality of portions representing a predetermined amount of data in the index of known content; and calculating a percentage of the plurality of the portions that are first instances of the portions of content in the index of known content.

In some embodiments, the calculating the percentage of the plurality of portions of content that are first instances includes: determining a first number of the plurality of portions of content, each having an associated timestamp, for which there are no identical portions of content in the index of known content having an earlier timestamp; and calculating the percentage as a quotient of the first number and a total number of portions of content in the plurality of portions of content.

In some embodiments, when the author score for the first entity and the second entity is within the predetermined threshold of each other, the method includes: obtaining a first timestamp corresponding to a time when the first document was included in an index of known content; obtaining a second timestamp corresponding to a time when the second document was included in the index of known content; and when the second timestamp is less than the first timestamp by at least a predetermined time interval, determining that the second entity satisfies the predefined authorship differential with respect to the first entity.

In some embodiments, the ranked search results are obtained from a search engine, and after swapping the second search result and the first search result in the ranked search results to produce the re-ranked search results, the method further comprises providing the re-ranked search results to the search engine.

Another aspect of the present disclosure provides a system to re-rank ranked search results, comprising: at least one processor; memory; and at least one program stored in the memory and executable by the at least one processor, the at least one program comprising instructions to: obtain ranked search results satisfying a search query, the ranked search results including a first search result corresponding to a first document associated with a first entity and a second search result corresponding to a second document associated with a second entity, the first search result being ranked higher than the second search result; determine that the first document and the second document satisfy a similarity criterion; determine that the second entity satisfies a predefined authorship differential with respect to the first entity; and responsive to determining that the second entity satisfies the predefined authorship differential with respect to the first entity, swap the second search result and the first search result in the ranked search results to produce re-ranked search results.

In some embodiments, the instructions to determine that the first document and the second document satisfy the similarity criterion include instructions to: identify a first plurality of portions of content for the first document; identify a second plurality of portions of content for the second document; and determine that at least a predetermined number of portions in the first plurality of portions of content and in the second plurality of portions of content are identical.

In some embodiments, respective portions of content in the first plurality of portions of content and the second plurality of portions of content include a predetermined amount of data. In some embodiments, the predetermined number of portions encompasses a predetermined percentage of the data in the first document. In some embodiments, the predetermined number of portions is a threshold percentage of the portions of content in the first plurality of portions of content. In some embodiments, the instructions to determine that the first document and the second document satisfy the similarity criterion include instructions to: identify a first plurality of shingles for the first document; identify a second plurality of shingles for the second document; and determine that a predetermined quantity of shingles in the first plurality of shingles and in the second plurality of shingles of content are identical.

In some embodiments, the first document and the second document satisfy the similarity criterion when a character count of the first document and a character count of the second document deviate by less than a character count threshold. In some embodiments, the first document and the second document satisfy the similarity criterion when a Levenshtein edit distance from the first document to the second document is less than a predetermined number of character edits.

In some embodiments, the instructions to determine that the second entity satisfies the predefined authorship differential with respect to the first entity include instructions to: determine an author score for the first entity and an author score for the second entity, where the author score for a respective entity, in the set of entities consisting of the first entity and the second entity, indicates a likelihood that the respective entity is an author of original content; and when the author score for the second entity is greater than the author score for the first entity by at least a predetermined threshold, determine that the second entity satisfies the predefined authorship differential with respect to the first entity.

In some embodiments, the instructions to determine the author score for a respective entity include instructions to: determine a citation score for the respective entity, where the citation score corresponds to a frequency at which content associated with the respective entity is cited; determine an original author score for the respective entity, where the original author score corresponds to a percentage of content associated with the respective entity that is a first instance of the content in an index of known content; and combine the citation score and the original author score using a predetermined function to produce the author score.

In some embodiments, the instructions to determine the citation score for the respective entity include instructions to calculate the citation score as a quotient of a number of citations to content that is associated with the respective entity and a quantity of content that has at least one citation.

In some embodiments, the instructions to determine the original author score for the respective entity include instructions to: identify a plurality of shingles representing content in the index of known content identified as being associated with the respective entity; and calculate a percentage of the plurality of shingles that are first instances of the shingles in the index of known content.

In some embodiments, the instructions to calculate the percentage of the plurality of shingles that are first instances include instructions to: determine a first number of the plurality of shingles, each having an associated timestamp, for which there are no identical shingles in the index of known content having an earlier timestamp; and calculate the percentage as a quotient of the first number and a total number of shingles in the plurality of shingles.

In some embodiments, the instructions to determine the original author score for the respective entity include instructions to: identify a plurality of portions of content in the index of known content identified as being associated with the respective entity, each portion in the plurality of portions representing a predetermined amount of data in the index of known content; and calculate a percentage of the plurality of the portions that are first instances of the portions of content in the index of known content.

In some embodiments, the instructions to calculate the percentage of the plurality of portions of content that are first instances include instructions to: determine a first number of the plurality of portions of content, each having an associated timestamp, for which there are no identical portions of content in the index of known content having an earlier timestamp; and calculate the percentage as a quotient of the first number and a total number of portions of content in the plurality of portions of content.

In some embodiments, when the author score for the first entity and the second entity is within the predetermined threshold of each other, the at least one program includes instructions to: obtain a first timestamp corresponding to a time when the first document was included in an index of known content; obtain a second timestamp corresponding to a time when the second document was included in the index of known content; and when the second timestamp is less than the first timestamp by at least a predetermined time interval, determine that the second entity satisfies the predefined authorship differential with respect to the first entity.

In some embodiments, the ranked search results are obtained from a search engine, and where after swapping the second search result and the first search result in the ranked search results to produce the re-ranked search results, the method further comprises providing the re-ranked search results to the search engine.

Another aspect of the present disclosure provides a non-transitory computer readable storage medium storing at least one program configured for execution by at least one processor of a computer system, the at least one program comprising instructions to: obtain ranked search results satisfying a search query, the ranked search results including a first search result corresponding to a first document associated with a first entity and a second search result corresponding to a second document associated with a second entity, the first search result being ranked higher than the second search result; determine that the first document and the second document satisfy a similarity criterion; determine that the second entity satisfies a predefined authorship differential with respect to the first entity; and responsive to determining that the second entity satisfies the predefined authorship differential with respect to the first entity, swap the second search result and the first search result in the ranked search results to produce re-ranked search results.

In some embodiments, the instructions to determine that the first document and the second document satisfy the similarity criterion include instructions to: identify a first plurality of portions of content for the first document; identify a second plurality of portions of content for the second document; and determine that at least a predetermined number of portions in the first plurality of portions of content and in the second plurality of portions of content are identical.

In some embodiments, respective portions of content in the first plurality of portions of content and the second plurality of portions of content include a predetermined amount of data. In some embodiments, the predetermined number of portions encompasses a predetermined percentage of the data in the first document. In some embodiments, the predetermined number of portions is a threshold percentage of the portions of content in the first plurality of portions of content. In some embodiments, the instructions to determine that the first document and the second document satisfy the similarity criterion include instructions to: identify a first plurality of shingles for the first document; identify a second plurality of shingles for the second document; and determine that a predetermined quantity of shingles in the first plurality of shingles and in the second plurality of shingles of content are identical.

In some embodiments, the first document and the second document satisfy the similarity criterion when a character count of the first document and a character count of the second document deviate by less than a character count threshold.

In some embodiments, the first document and the second document satisfy the similarity criterion when a Levenshtein edit distance from the first document to the second document is less than a predetermined number of character edits.

In some embodiments, the instructions to determine that the second entity satisfies the predefined authorship differential with respect to the first entity include instructions to: determine an author score for the first entity and an author score for the second entity, where the author score for a respective entity, in the set of entities consisting of the first entity and the second entity, indicates a likelihood that the respective entity is an author of original content; and when the author score for the second entity is greater than the author score for the first entity by at least a predetermined threshold, determine that the second entity satisfies the predefined authorship differential with respect to the first entity.

In some embodiments, the instructions to determine the author score for a respective entity include instructions to: determine a citation score for the respective entity, where the citation score corresponds to a frequency at which content associated with the respective entity is cited; determine an original author score for the respective entity, where the original author score corresponds to a percentage of content associated with the respective entity that is a first instance of the content in an index of known content; and combine the citation score and the original author score using a predetermined function to produce the author score.

In some embodiments, the instructions to determine the citation score for the respective entity include instructions to calculate the citation score as a quotient of a number of citations to content that is associated with the respective entity and a quantity of content that has at least one citation.

In some embodiments, the instructions to determine the original author score for the respective entity include instructions to: identify a plurality of shingles representing content in the index of known content identified as being associated with the respective entity; and calculate a percentage of the plurality of shingles that are first instances of the shingles in the index of known content.

In some embodiments, the instructions to calculate the percentage of the plurality of shingles that are first instances include instructions to: determine a first number of the plurality of shingles, each having an associated timestamp, for which there are no identical shingles in the index of known content having an earlier timestamp; and calculate the percentage as a quotient of the first number and a total number of shingles in the plurality of shingles.

In some embodiments, the instructions to determine the original author score for the respective entity include instructions to: identify a plurality of portions of content in the index of known content identified as being associated with the respective entity, each portion in the plurality of portions representing a predetermined amount of data in the index of known content; and calculate a percentage of the plurality of the portions that are first instances of the portions of content in the index of known content.

In some embodiments, the instructions to calculate the percentage of the plurality of portions of content that are first instances include instructions to: determine a first number of the plurality of portions of content, each having an associated timestamp, for which there are no identical portions of content in the index of known content having an earlier timestamp; and calculate the percentage as a quotient of the first number and a total number of portions of content in the plurality of portions of content.

In some embodiments, the author score for the first entity and the second entity is within the predetermined threshold of each other, the at least one program includes instructions to: obtain a first timestamp corresponding to a time when the first document was included in an index of known content; obtain a second timestamp corresponding to a time when the second document was included in the index of known content; and when the second timestamp is less than the first timestamp by at least a predetermined time interval, determine that the second entity satisfies the predefined authorship differential with respect to the first entity.

In some embodiments, the ranked search results are obtained from a search engine, and where after swapping the second search result and the first search result in the ranked search results to produce the re-ranked search results, the method further comprises providing the re-ranked search results to the search engine.

Another aspect of the present disclosure provides a computer-implemented method for re-ranking ranked search results, performed on a server system having at least one processor and memory storing at least one program for execution by the at least one processor to perform the method, comprising: obtaining ranked search results satisfying a search query, the ranked search results including a first search result corresponding to a first document associated with a first entity and a second search result corresponding to a second document associated with a second entity, the first search result being ranked higher than the second search result; determining that the first document and the second document satisfy a similarity criterion; obtaining a first timestamp corresponding to a time when the first document was included in an index of known content; obtaining a second timestamp corresponding to a time when the second document was included in the index of known content; and swapping the second search result and the first search result in the ranked search results to produce re-ranked search results when the second timestamp is less than the first timestamp by at least a predetermined time interval.

Another aspect of the present disclosure provides a computer-implemented method for determining a likelihood that an entity is an author of original content, performed on a server system having at least one processor and memory storing at least one program for execution by the at least one processor to perform the method, comprising: receiving a message, the message including submitted content, where the submitted content is identified as being associated with an entity; storing a representation of the submitted content in an index of known content; calculating an original author score for the entity based on an evaluation of representations of submitted content in the index of known content identified as being associated with the entity, the original author score indicating a likelihood that the entity is an author of original content; and storing the original author score and an identifier for the entity in an entity database.

In some embodiments, the message comprises a timestamp, and where storing the representation of the submitted content in the index of known content includes: identifying a set of shingles for the submitted content; for each respective shingle in the set of shingles, applying a hash function to the respective shingle to produce a hash value for the respective shingle; and storing the timestamp of the message in a record of the index of known content indexed by the hash value.

In some embodiments, the message includes a link to a location on a resource hosting the submitted content, and where the method further comprises for each respective shingle in the set of shingles, storing the link to the location on the resource hosting the submitted content in a record of the index of known content corresponding to the respective shingle in the set of shingles.

Some embodiments further disclose that, for each respective shingle in the set of shingles, storing the identifier for the entity in a record of the index of known content corresponding to the respective shingle in the set of shingles.

In some embodiments, calculating the original author score for the entity includes: identifying a plurality of shingles representing content, including the submitted content, in the index of known content identified as being associated with the entity; and calculating a percentage of the plurality of shingles that are first instances of the shingles in the index of known content. In some embodiments, calculating the percentage of the plurality of shingles that are first instances includes: determining a first number of the plurality of shingles, each having an associated timestamp, for which there are no identical shingles in the index of known content having an earlier timestamp; and calculating the percentage as a quotient of the first number and a total number of shingles in the plurality of shingles.

In some embodiments, calculating the original author score for the entity includes: identifying a plurality of portions of content, including the submitted content, in the index of known content identified as being associated with the entity, each portion in the plurality of portions representing a predetermined amount of data in the index of known content; and calculating a percentage of the plurality of the portions that are first instances of the portions of content in the index of known content. In some embodiments, calculating the percentage of the plurality of portions of content that are first instances includes: determining a first number of the plurality of portions of content, each having an associated timestamp, for which there are no identical portions of content in the index of known content having an earlier timestamp; and calculating the percentage as a quotient of the first number and a total number of portions of content in the plurality of portions of content.

In some embodiments, the message is received in response to the entity publishing the submitted content on a website. In some embodiments, the message is received in response to the entity submitting the submitted content using a user interface provided by the server. In some embodiments, the message is received in response to the entity submitting the submitted content using a user interface provided by the server, and the submitted content is marked as being submitted by the entity prior to publication of the submitted content by the entity. In some embodiments, the entity includes at least one author of content. In some embodiments, the entity includes at least one publisher of content. In some embodiments, the entity includes at least one website.

In some embodiments, prior to receiving the message from the entity, the method includes: receiving, from a client device of the entity, a registration request to register the entity as a registered author of content; providing, to the client device, at least one verification mechanism to verify that the entity is an author of content; responsive to the providing, receiving, from the client device of the entity, a verification request to verify that the entity is an author of content using the at least one verification mechanism; verifying that the entity is an author of content using the at least one verification mechanism; and registering the entity as a registered author of content.

In some embodiments, calculating the original author score for the entity based on the evaluation of representations of the submitted content in the index of known content identified as being associated with the entity includes calculating the original author score for the entity based on the evaluation of a subset of the representations of submitted content in the index of known content identified as being associated with the entity.

In some embodiments, the subset of representations of submitted content includes of all content submitted by the entity within a threshold period of time.

In some embodiments, each representation in the subset of representations of submitted content satisfies a dissimilarity criterion with respect to each other representation in the subset of representations.

In some embodiments, the subset of representations of submitted content consists of representations for ten or less documents submitted by the entity.

Another aspect of the present disclosure provides a system to determine a likelihood that an entity is an author of original content, comprising at least one processor; memory; and at least one program stored in the memory and executable by the at least one processor, the at least one program comprising instructions to: receive a message, the message including submitted content, where the submitted content is identified as being associated with an entity; store a representation of the submitted content in an index of known content; calculate an original author score for the entity based on an evaluation of representations of submitted content in the index of known content identified as being associated with the entity, the original author score indicating a likelihood that the entity is an author of original content; and store the original author score and an identifier for the entity in an entity database.

In some embodiments, the message comprises a timestamp, and where instructions to store the representation of the submitted content in the index of known content include instructions to: identify a set of shingles for the submitted content; for each respective shingle in the set of shingles, apply a hash function to the respective shingle to produce a hash value for the respective shingle; and store the timestamp of the message in a record of the index of known content indexed by the hash value.

In some embodiments, the message includes a link to a location on a resource hosting the submitted content, and where the at least one program includes instructions to, for each respective shingle in the set of shingles, store the link to the location on the resource hosting the submitted content in a record of the index of known content corresponding to the respective shingle in the set of shingles.

In some embodiments, the at least one program includes instructions to, for each respective shingle in the set of shingles, store the identifier for the entity in a record of the index of known content corresponding to the respective shingle in the set of shingles.

In some embodiments, the instructions to calculate the original author score for the entity include instructions to: identify a plurality of shingles representing content, including the submitted content, in the index of known content identified as being associated with the entity; and calculate a percentage of the plurality of shingles that are first instances of the shingles in the index of known content.

In some embodiments, the instructions to calculate the percentage of the plurality of shingles that are first instances include instructions to: determine a first number of the plurality of shingles, each having an associated timestamp, for which there are no identical shingles in the index of known content having an earlier timestamp; and calculate the percentage as a quotient of the first number and a total number of shingles in the plurality of shingles.

In some embodiments, the instructions to calculate the original author score for the entity include instructions to: identify a plurality of portions of content, including the submitted content, in the index of known content identified as being associated with the entity, each portion in the plurality of portions representing a predetermined amount of data in the index of known content; and calculate a percentage of the plurality of the portions that are first instances of the portions of content in the index of known content.

In some embodiments, the instructions to calculate the percentage of the plurality of portions of content that are first instances include instructions to: determine a first number of the plurality of portions of content, each having an associated timestamp, for which there are no identical portions of content in the index of known content having an earlier timestamp; and calculate the percentage as a quotient of the first number and a total number of portions of content in the plurality of portions of content.

In some embodiments, the message is received in response to the entity publishing the submitted content on a website. In some embodiments, the message is received in response to the entity submitting the submitted content using a user interface provided by the server. In some embodiments, the message is received in response to the entity submitting the submitted content using a user interface provided by the server, and where the submitted content is marked as being submitted by the entity prior to publication of the submitted content by the entity.

In some embodiments, the entity includes at least one author of content. In some embodiments, the entity includes at least one publisher of content. In some embodiments, the entity includes at least one website.

In some embodiments, the at least one program includes instructions to, prior to receiving the message from the entity: receive, from a client device of the entity, a registration request to register the entity as a registered author of content; provide, to the client device, at least one verification mechanism to verify that the entity is an author of content; responsive to the providing, receive, from the client device of the entity, a verification request to verify that the entity is an author of content using the at least one verification mechanism; verify that the entity is an author of content using the at least one verification mechanism; and register the entity as a registered author of content.

In some embodiments, the instructions to calculate the original author score for the entity based on the evaluation of representations of the submitted content in the index of known content identified as being associated with the entity include instructions to calculate the original author score for the entity based on the evaluation of a subset of the representations of submitted content in the index of known content identified as being associated with the entity.

In some embodiments, the subset of representations of submitted content includes of all content submitted by the entity within a threshold period of time.

In some embodiments, each representation in the subset of representations of submitted content satisfies a dissimilarity criterion with respect to each other representation in the subset of representations.

In some embodiments, the subset of representations of submitted content consists of representations for ten or less documents submitted by the entity.

Another aspect of the present disclosure provides a non-transitory computer readable storage medium storing at least one program configured for execution by at least one processor of a computer system, the at least one program comprising instructions to: receive a message, the message including submitted content, where the submitted content is identified as being associated with an entity; store a representation of the submitted content in an index of known content; calculate an original author score for the entity based on an evaluation of representations of submitted content in the index of known content identified as being associated with the entity, the original author score indicating a likelihood that the entity is an author of original content; and store the original author score and an identifier for the entity in an entity database.

In some embodiments, the message comprises a timestamp, and the instructions to store the representation of the submitted content in the index of known content include instructions to: identify a set of shingles for the submitted content; for each respective shingle in the set of shingles, apply a hash function to the respective shingle to produce a hash value for the respective shingle; and store the timestamp of the message in a record of the index of known content indexed by the hash value.

In some embodiments, the message includes a link to a location on a resource hosting the submitted content, and where the at least one program includes instructions to, for each respective shingle in the set of shingles, store the link to the location on the resource hosting the submitted content in a record of the index of known content corresponding to the respective shingle in the set of shingles.

In some embodiments, the at least one program includes instructions to, for each respective shingle in the set of shingles, store the identifier for the entity in a record of the index of known content corresponding to the respective shingle in the set of shingles.

In some embodiments, the instructions to calculate the original author score for the entity include instructions to: identify a plurality of shingles representing content, including the submitted content, in the index of known content identified as being associated with the entity; and calculate a percentage of the plurality of shingles that are first instances of the shingles in the index of known content.

In some embodiments, the instructions to calculate the percentage of the plurality of shingles that are first instances include instructions to: determine a first number of the plurality of shingles, each having an associated timestamp, for which there are no identical shingles in the index of known content having an earlier timestamp; and calculate the percentage as a quotient of the first number and a total number of shingles in the plurality of shingles.

In some embodiments, the instructions to calculate the original author score for the entity include instructions to: identify a plurality of portions of content, including the submitted content, in the index of known content identified as being associated with the entity, each portion in the plurality of portions representing a predetermined amount of data in the index of known content; and calculate a percentage of the plurality of the portions that are first instances of the portions of content in the index of known content.

In some embodiments, the instructions to calculate the percentage of the plurality of portions of content that are first instances include instructions to: determine a first number of the plurality of portions of content, each having an associated timestamp, for which there are no identical portions of content in the index of known content having an earlier timestamp; and calculate the percentage as a quotient of the first number and a total number of portions of content in the plurality of portions of content.

In some embodiments, the message is received in response to the entity publishing the submitted content on a website. In some embodiments, the message is received in response to the entity submitting the submitted content using a user interface provided by the server.

In some embodiments, the message is received in response to the entity submitting the submitted content using a user interface provided by the server, and where the submitted content is marked as being submitted by the entity prior to publication of the submitted content by the entity. In some embodiments, the entity includes at least one author of content. In some embodiments, the entity includes at least one publisher of content. In some embodiments, where the entity includes at least one website.

In some embodiments, the at least one program includes instructions to, prior to receiving the message from the entity: receive, from a client device of the entity, a registration request to register the entity as a registered author of content; provide, to the client device, at least one verification mechanism to verify that the entity is an author of content; responsive to the providing, receive, from the client device of the entity, a verification request to verify that the entity is an author of content using the at least one verification mechanism; verify that the entity is an author of content using the at least one verification mechanism; and register the entity as a registered author of content.

In some embodiments, the instructions to calculate the original author score for the entity based on the evaluation of representations of the submitted content in the index of known content identified as being associated with the entity include instructions to calculate the original author score for the entity based on the evaluation of a subset of the representations of submitted content in the index of known content identified as being associated with the entity.

In some embodiments, the subset of representations of submitted content consists of all content submitted by the entity within a threshold period of time.

In some embodiments, each representation in the subset of representations of submitted content satisfies a dissimilarity criterion with respect to each other representation in the subset of representations.

In some embodiments, the subset of representations of submitted content consists of representations for ten or less documents submitted by the entity.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings.

FIG. 3B continues the process illustrated in FIG. 3A, according to some embodiments.

FIG. 5A is a block diagram illustrating an example process for registering an entity as a registered author of content, according to some embodiments.

FIG. 22B continues the process illustrated in FIG. 22A, according to some embodiments.

FIG. 23 is a flowchart of a method for determining that an entity is an author of original content, according to some embodiments.

FIG. 24 is a flowchart of a method for determining that shingles representing other submitted content identified as being published by an entity are first instances with respect to the corresponding shingles in the first plurality of shingles representing known content, according to some embodiments.

FIG. 29 is a flowchart of a method for calculating an original author score for an entity, according to some embodiments.

FIG. 30 is a flowchart of a method for calculating a percentage of shingles that are first instances, according to some embodiments.

FIG. 31 is a flowchart of another method for calculating an original author score for an entity, according to some embodiments.

DETAILED DESCRIPTION

The embodiments described herein provide techniques for re-ranking ranked search results.

Figure 1:
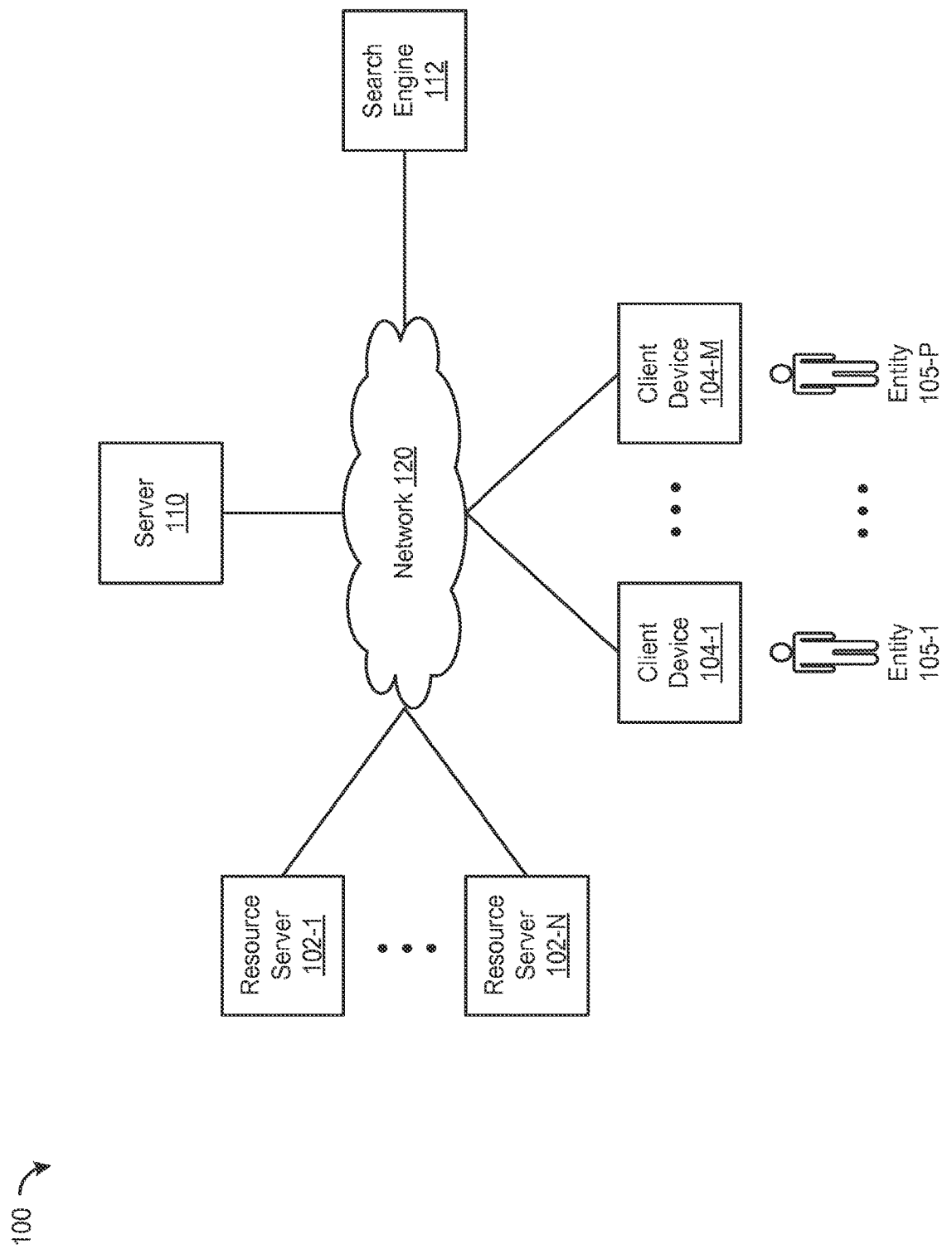
FIG. 1 is a block diagram illustrating a network system, according to some embodiments.

FIG. 1 is a block diagram illustrating a network system 100, according to some embodiments. The network system 100 includes resource servers 102 (e.g., the resource servers 102-1 to 102-N), client devices 104 (e.g., the client devices 104-1 to 104-M) of entities 105 (e.g., entities 105-1 to 105-P), a server 110, and a search engine 112 coupled to network 120. Network 120 can generally include any type of wired or wireless communication channel capable of coupling together computing nodes. This includes, but is not limited to, a local area network, a wide area network, or a combination of networks. In some embodiments, network 120 includes the Internet.

In some embodiments, a respective resource server 102 is associated with a respective entity 105. For example, in some embodiments the respective entity 105 is an operator of the respective resource server 102. In other embodiments, the respective entity 105 is a subscriber of a publication service (e.g., a news wire service) hosted by the respective resource server 102, and/or a subscriber of a web hosting service of the respective resource server 102.

In some implementations, the respective entity 105 includes at least one author of content. For example, the respective entity 105 may include an individual author or one of a plurality of co-authors for (or contributors to) content. In some embodiments, an entity 105 is a business organization that produces original or partially original content. In some embodiments, an entity 105 is a news organization. In some implementations, the entity 105 includes at least one publisher of content. For example, the respective entity 105 may be a publisher of books, a publisher of periodicals, a publisher of online content, and/or the like. In some implementations, the respective entity 105 is the author of content on at least one website. For example, the respective entity 105 may contribute original content to a blogging website, a website for a publisher (e.g., news, magazine, etc.) and/or the like. Note that such a website may include a subset of the content within a particular domain. For example, the website may include content in a particular domain (e.g., a top-level domain example.com). In another example, the website includes content in a sub-domain of the particular domain (e.g., a sub-domain biogs.example.com). In another example, the website includes content in a directory of the domain (e.g., www.example.com/johndoe/). In some embodiments, the website includes content in: a plurality of domains (e.g., a network of affiliated websites), a plurality of sub-domains of at least one domain, and/or a plurality of subdirectories of at least one domain. In some embodiments, the content authored by an entity 105 is a blog post, a social network post, or a post in an on-line discussion thread. In some embodiments, the content authored by the entity 105 is any content that has been posted to a location accessible on the Internet such that it is readily ascertainable that the entity 105 posted the content.

Thus, network system 100 encompasses a broad array of systems 100. For example, in some embodiments (i) a plurality of entities 105 author or publish content (e.g., books, periodicals, websites, etc.) that is hosted on a single resource server 102, (ii) a plurality of entities 105 author content that is stored on a plurality of resource servers 102, and/or (iii) a single entity 105 authors content that is stored on a plurality of resource servers 102. Any combination of such arrangements is also found in the network systems 100 within the scope of the present disclosure. For instance, an example network system 100 provides for one entity 105 that authors content that is stored on two resource servers 102 while two or more other entities 105 author content that is stored on a single resource server 102.

The search engine 112 periodically crawls links to identify and index new (or previously un-indexed) content hosted by resource servers 102. The frequency at which the search engine 112 crawls links for a particular domain may depend on factors including, but not limited to, a frequency at which new (or previously un-indexed content) is available on the particular domain, an amount of traffic the domain receives from users (e.g., entities), an importance of web pages in the particular domain, whether the domain includes original content, and the like. The search engine 112 also identifies ranked search results that satisfy search queries received from client devices 104.

The client devices 104 include any computing device that the entities 105 may use to access the resource servers 102 (e.g., a website or content hosted on the resource servers 102, etc.), the server 110, and/or the search engine 112. For example, the client devices 104 may include a laptop computer, a desktop computer, a smartphone, a mobile phone, a personal digital assistant, a tablet device, a set top box, a game console, and/or the like.

In some embodiments, the entity 105-1 uses the client device 104-1 to publish content onto the resource server 102-1. For example, the resource server 102-1 may host content for a newspaper website and the entity 105-1 may use the client device 104-1 to upload and to publish a news article onto the newspaper website hosted on the resource server 102-1. Note that the entity 105-1 may upload the news article to the resource server 102-1 without publishing the news article. For example, the entity 105-1 may upload the news article to the resource server 102-1 and publish the news article at a later date and/or time. The act of publishing content makes the content available to users (e.g., to the public, to subscribers, etc.).

As discussed above, one problem faced by search engines is that content uploaded to the resource server 102-1 may not be indexed and may not be available to the search engine until after the usefulness of the content has passed. In order to address this problem, in some embodiments, the resource server 102-1 sends a message to the server 110 to notify the server 110 that the content has been published on the resource server 102-1. Alternatively, in some embodiments, the entity 105-1 uses the client device 104-1 to send a message to the server 110 to notify the server 110 that the content has been published on the resource server 102-1. For example, the entity 105-1 may use the client device 104-1 to send a message to the server 110 using a web page provided by the server 110 that allows the entity 105-1 to notify the server 110 that the content has been published on the resource server 102-1. In either of these alternative embodiments, the message includes all or a portion of the content, termed the submitted content 231, which was published on the resource server 102-1 and/or a link to the published content on the resource server 102-1. The term "submitted content" is used in this specification to refer to the content included in the message or the content that is a target of a link that is included in the message. The server 110 may then conditionally issue a request to the search engine 112 to crawl and index the content (i.e., the submitted content 231) that was uploaded to the resource server 102-1. In some embodiments, the request is a high-priority request that is directed to a high priority crawler of the search engine 112. In these embodiments, a time when the high priority crawler of the search engine 112 is scheduled to crawl the content occurs before a time when a standard crawler of the search engine 112 is scheduled to crawl the submitted content 231. These embodiments are described in more detail below with reference to FIGS. 2A and 2B.

Some embodiments of the disclosed systems and methods further address the problem incurred by crawling and indexing when faced with duplicate or substantially duplicate existing content. Such duplicate content poses a challenge to the identification of authors of original content so that such original content may be attributed with authorship of content and accordingly returned in response to user queries. Accordingly, in some embodiments, the server 110 determines a likelihood that an entity is an author of original content. These embodiments are described in more detail below with reference to FIGS. 3A and 3B. Furthermore, in some embodiments, search results including the content that are associated with authors of original content may be ranked higher in ranked search results than search results including the content that are not associated with authors of original content. These embodiments are described in more detail below with reference to, for example, FIGS. 4A, 4B and 10-19.

Note that although FIG. 1 shows one instance for each of the server 110 and the search engine 112, multiple servers and search engines may be present in the network system 100. For example, each of the server 110 and the search engine 112 may include a plurality of distributed servers. The plurality of distributed servers may provide load balancing and/or may provide low-latency points of access to nearby computer systems. The distributed servers may be located within a single location (e.g., a data center, a building, etc.) or may be geographically distributed across multiple locations (e.g., data centers at various geographical locations, etc.).

Also note that although the embodiments described herein refer to the server 110 and the search engine 112, the embodiments may be applied to multiple servers and search engines. Furthermore, the functionality of any of the server 110 and the search engine 112 may be implemented within a single server (or a set of distributed servers). For example, the server 110 and the search engine 112 may be located on the same server (or the same set of distributed servers).

Figure 2A:
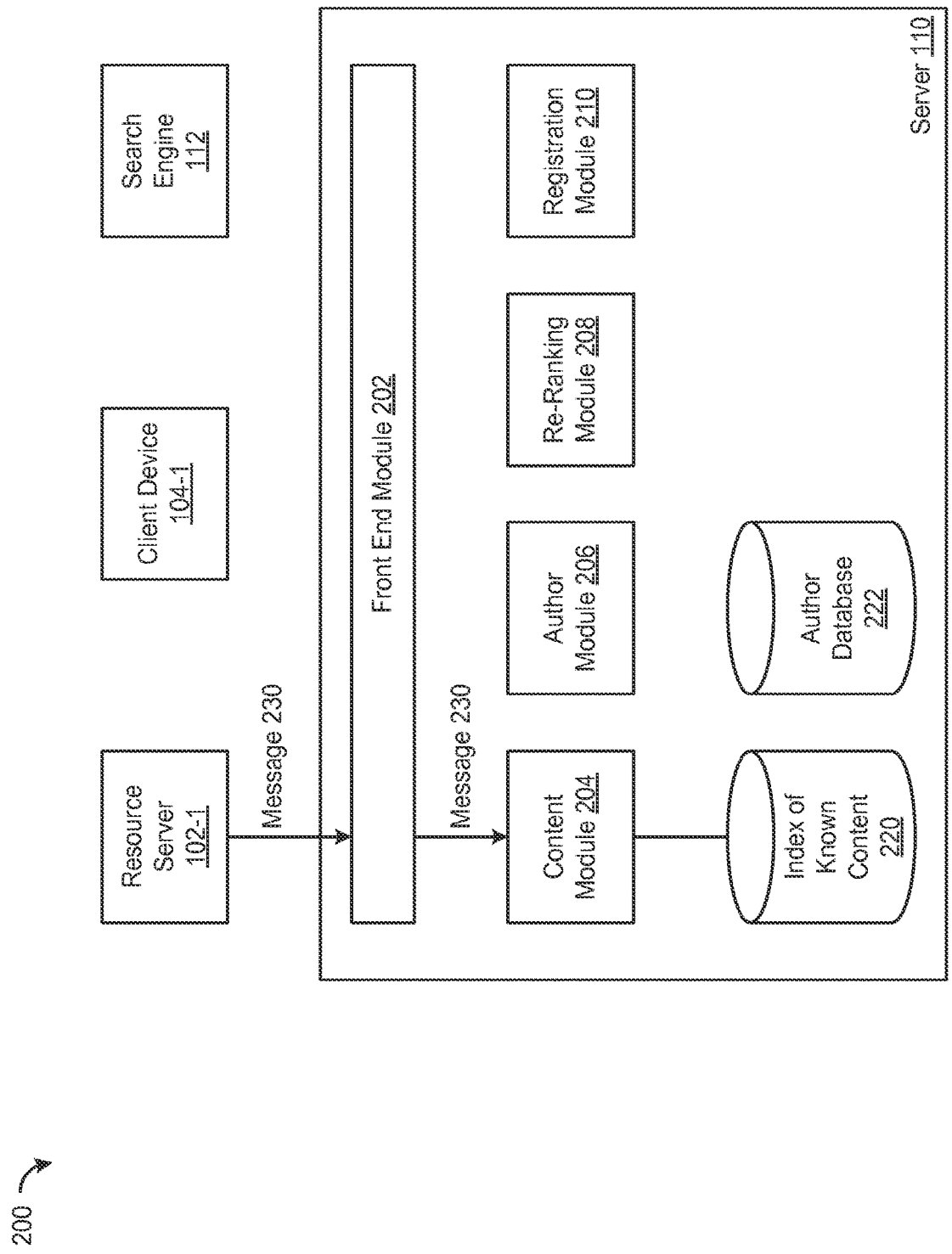
FIG. 2A is a block diagram illustrating an example process for crawling and indexing submitted content, according to some embodiments.
Figure 2B:
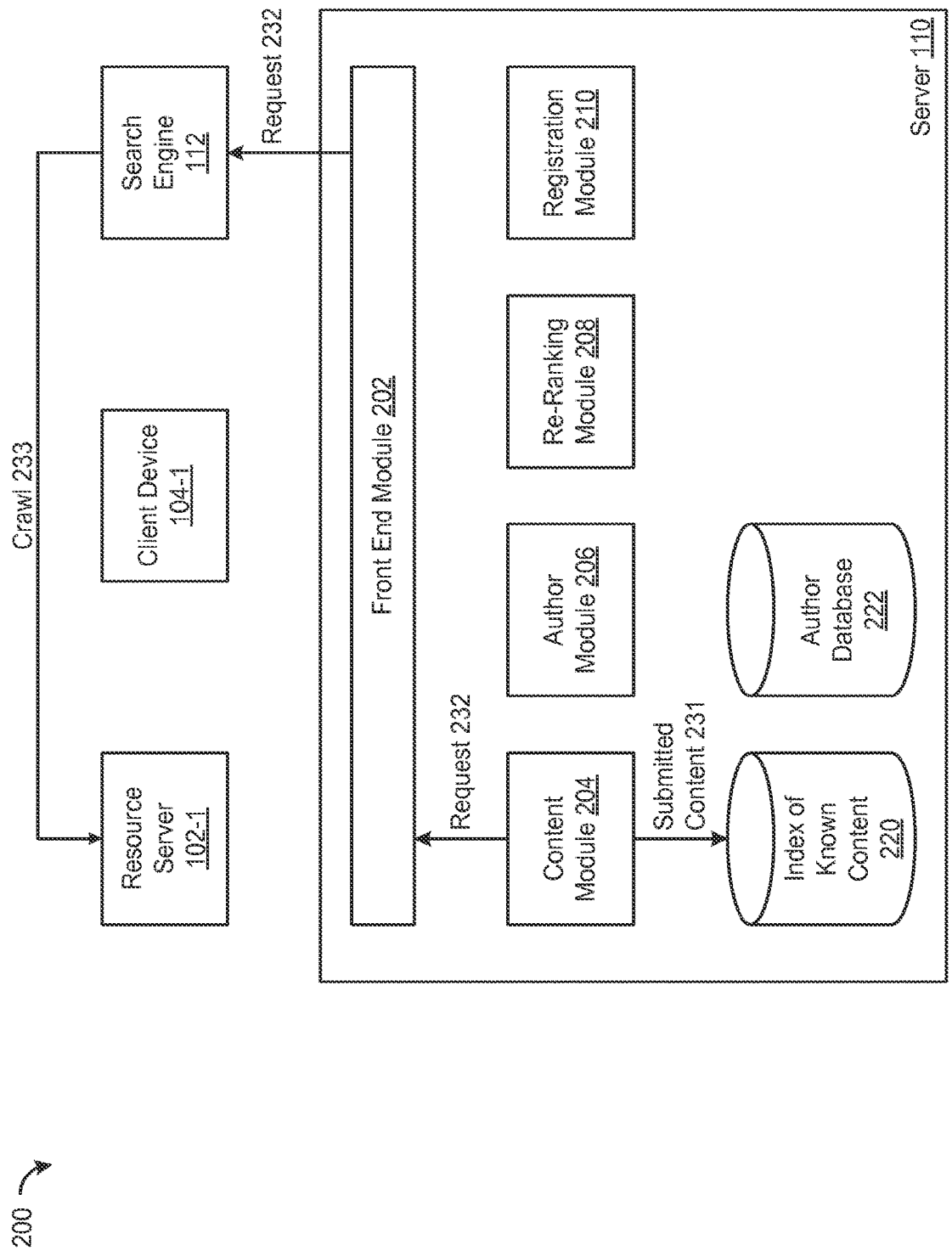
FIG. 2B continues the process illustrated in FIG. 2A, according to some embodiments.

FIGS. 2A and 2B are block diagrams 200 illustrating an example process for crawling and indexing submitted content 231, according to some embodiments. Note that although the following discussion refers to the resource server 102-1, the client device 104-1, and the entity 105-1, the process illustrated in FIGS. 2A and 2B may be applied to any resource server, client device, and entity. As illustrated in FIG. 2A, in response to content being published on the resource server 102-1, the resource server 102-1 sends a message 230 to the server 110 indicating that the content was published by the entity 105-1 on the resource server 102-1.

In an alternative embodiment not depicted in FIG. 2A, in response to content being published on the resource server 102-1, the client device 104-1 sends the message 230 to the server 110 indicating that the content was published by the entity 105-1 on the resource server 102-1. For example, the entity 105-1 may use the client device 104-1 to send the message 230 to the server 110 by accessing a web page provided by the server 110 that allows the entity 105-1 to notify the server 110 that the content has been published by the entity 105-1 on the resource server 102-1. In another example, the client device 104-1 may send the message 230 to the server 110 indicating that the content was published by the entity 105-1 on the resource server 102-1.

In some embodiments, the message 230 includes all of the content that was published on the resource server 102-1 and a link to the content that was published on the resource server 102-1. In some embodiments, the message 230 includes a portion of the content that was published on the resource server 102-1 and a link to the content that was published on the resource server 102-1. For example, the message 230 may contain the first kilobyte, first 10 kilobytes, first 100 kilobytes or first megabyte of the content that was published on the resource server 102-1. In some embodiments, the message 230 includes a digest of the content that was published on the resource server 102-1 and a link to the content that was published on the resource server 102-1. In some embodiments, the message 230 only includes a link to the content that was published on the resource server 102-1. In these embodiments, the server 110 obtains all or a portion of the content published on the resource server 102-1 prior to proceeding with the other operations described below. For example, in some embodiments the server 110 obtains the first kilobyte, first 10 kilobytes, first 100 kilobytes or first megabyte of the content that was published on the resource server 102-1. In another example, in some embodiments the server 110 obtains a digest of the content that was published on the resource server 102-1. This digest may be the result of, for example, a predetermined hash function on the known content. As discussed above, the term "submitted content" is used in this specification to refer to the content included in the message 230 or the content that is a target of a link that is included in the message 230.

Returning to the embodiment illustrated in FIG. 2A, regardless of whether the message 230 originated from resource server 102 or from client device 104, the front end module 202 receives the message 230 and provides the message 230 to the content module 204. The content module 204 evaluates whether the submitted content 231 is represented in an index of known content 220 to determine whether the submitted content 231 is new relative to the known content.

In some embodiments, the index of known content 220 includes content obtained through crawl operations of the search engine 112. In some embodiments, the index of known content 220 includes a representation of content obtained through messages (e.g., the message 230) received from the resource server 102-1 (or the client device 104-1). The content is obtained either directly from a message 230 when the message 230 includes the submitted content 231 or indirectly when the message 230 includes a link to the submitted content 231.

As illustrated in FIG. 2B, when the submitted content 231 is new relative to the known content in the index of known content 220, the content module 204 issues a request 232 to the search engine 112 (via the front end module 202) to crawl and index the submitted content 231 that is hosted by the resource server 102-1. The request 232 includes the link (e.g., address, URL, pointer) to the content that was published on the resource server 102-1 (i.e., the submitted content 231).

In some embodiments, the content module 204 stores a representation of the submitted content 231 in the index of known content 220. For example, in some instances, the content module 204 generates a set of shingles for the submitted content 231, and for each respective shingle in the set of shingles, the content module 204 (*i*) applies a hash function to the shingle to produce a corresponding hash value for the respective shingle and (i) stores information relating to the submitted content 231 (e.g., a link to a location on the resource server 102-1 hosting the submitted content 231, a timestamp of the message 230, etc.) in a record in the index of known content 220 that is indexed by the respective hash value.

The embodiments described in FIGS. 2A and 2B are described in more detail below with reference to FIGS. 21-26 below and in U.S. Provisional Patent Application No. 61/648,546 filed on May 17, 2012, entitled "Systems and Methods for Crawling and Indexing Content," which is hereby incorporated by reference herein in its entirety.

Figure 3A:
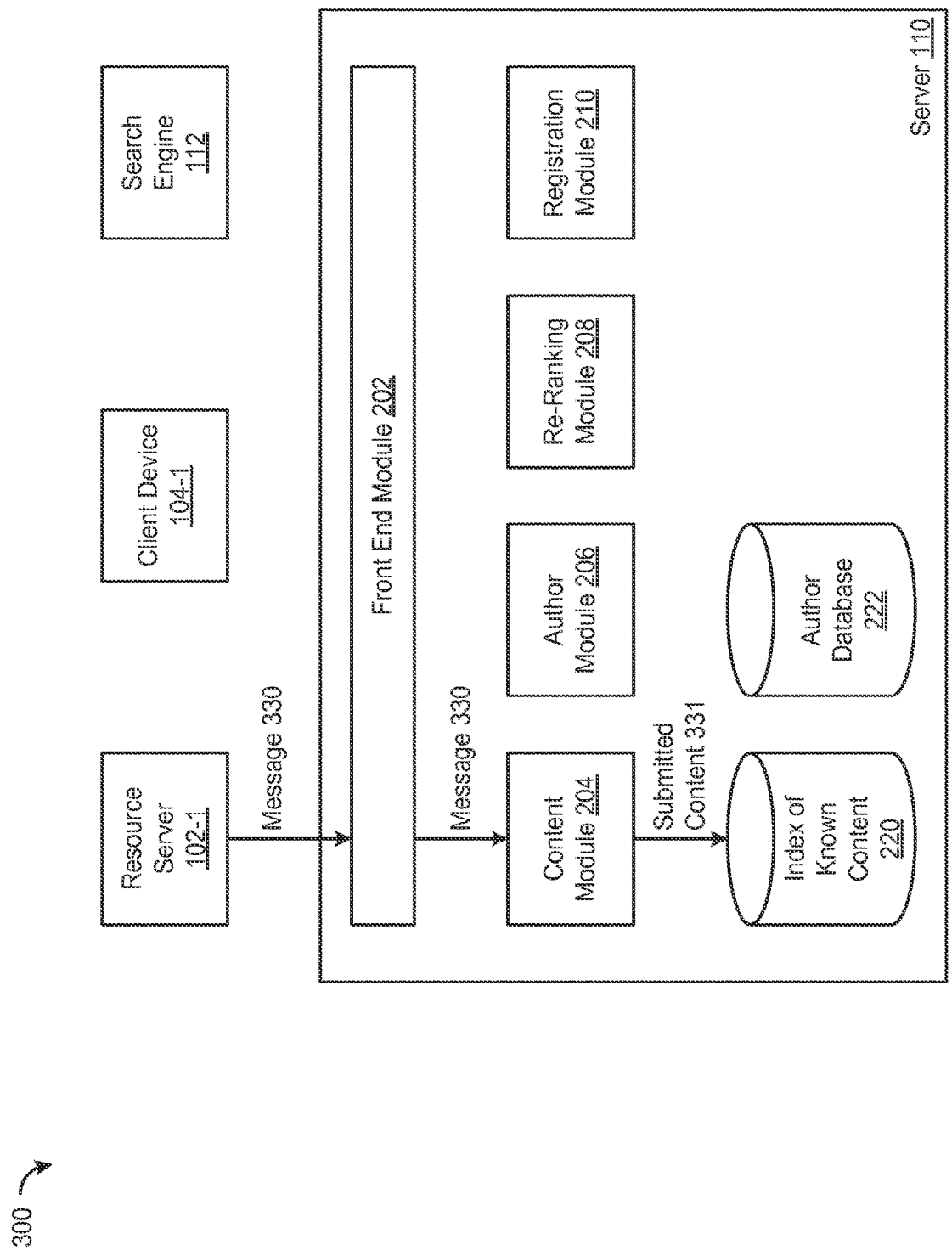
FIG. 3A is a block diagram illustrating an example process for determining a likelihood that an entity is an author of original content, according to some embodiments.
Figure 20A:
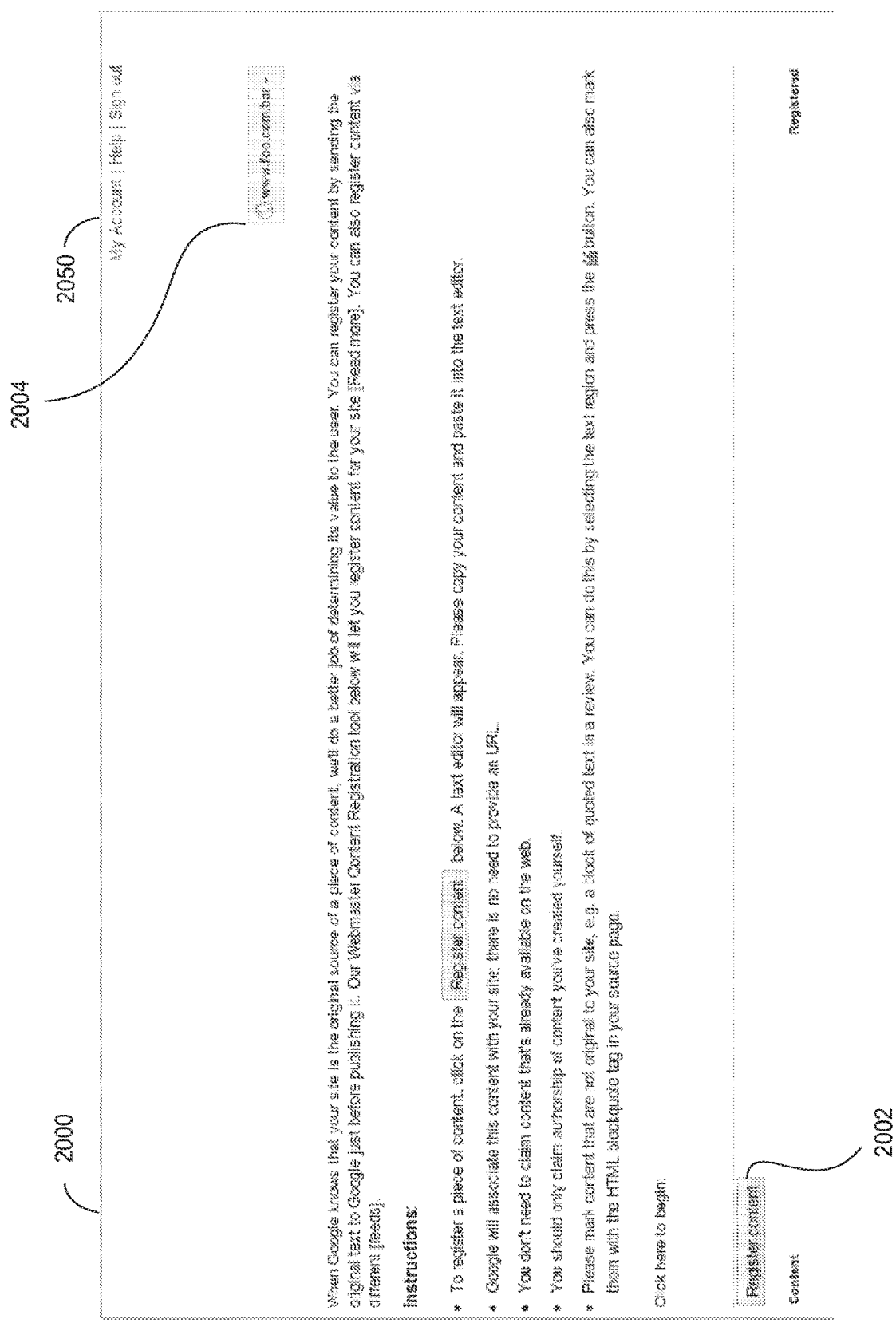
FIG. 20A is an example screenshot illustrating a web page that allows an entity to notify a server that content has been published on a resource server, according to some embodiments.
Figure 20B:
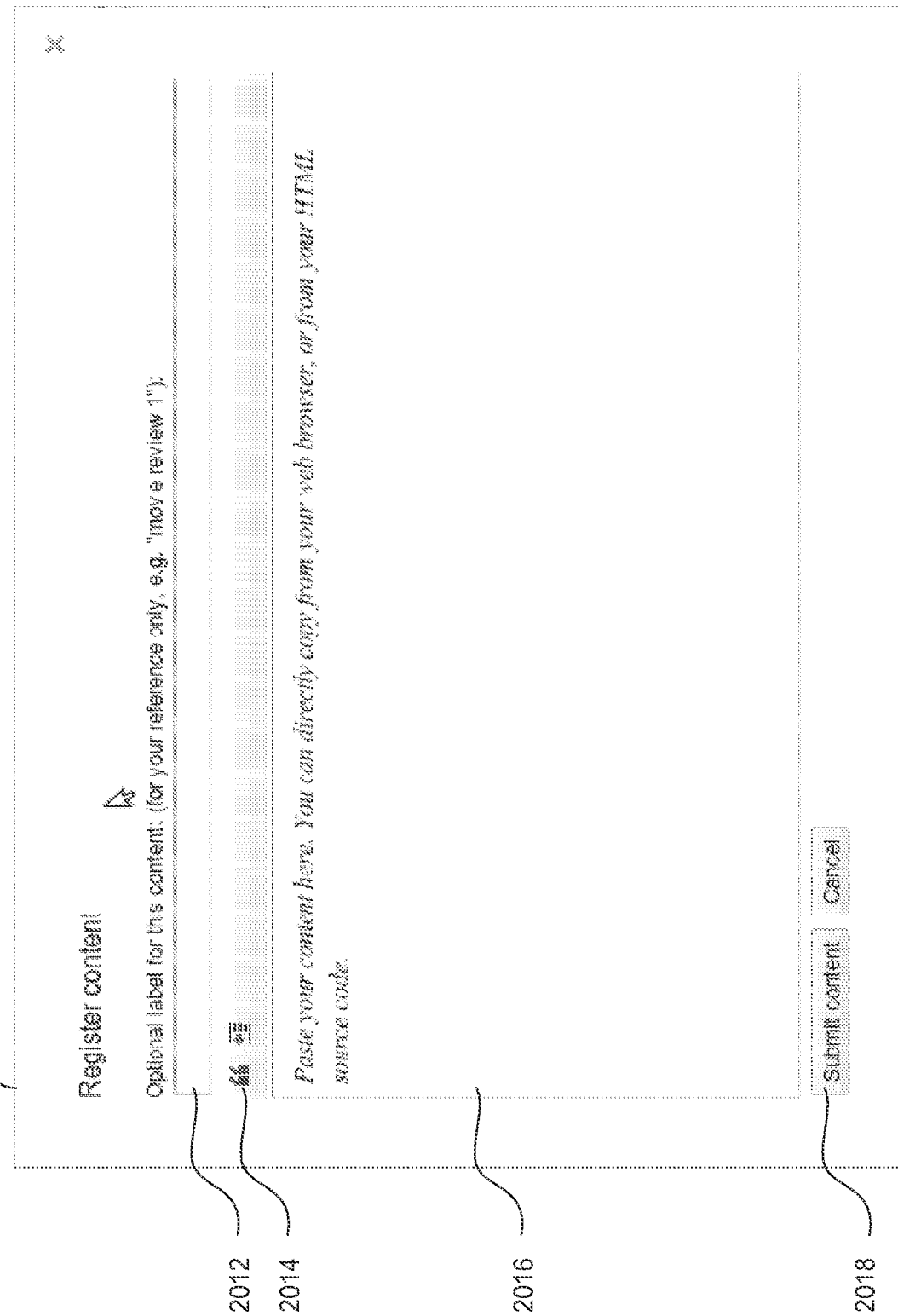
FIG. 20B is an example screenshot illustrating another web page that allows an entity to notify a server that content has been published on a resource server, according to some embodiments.
Figure 20C:
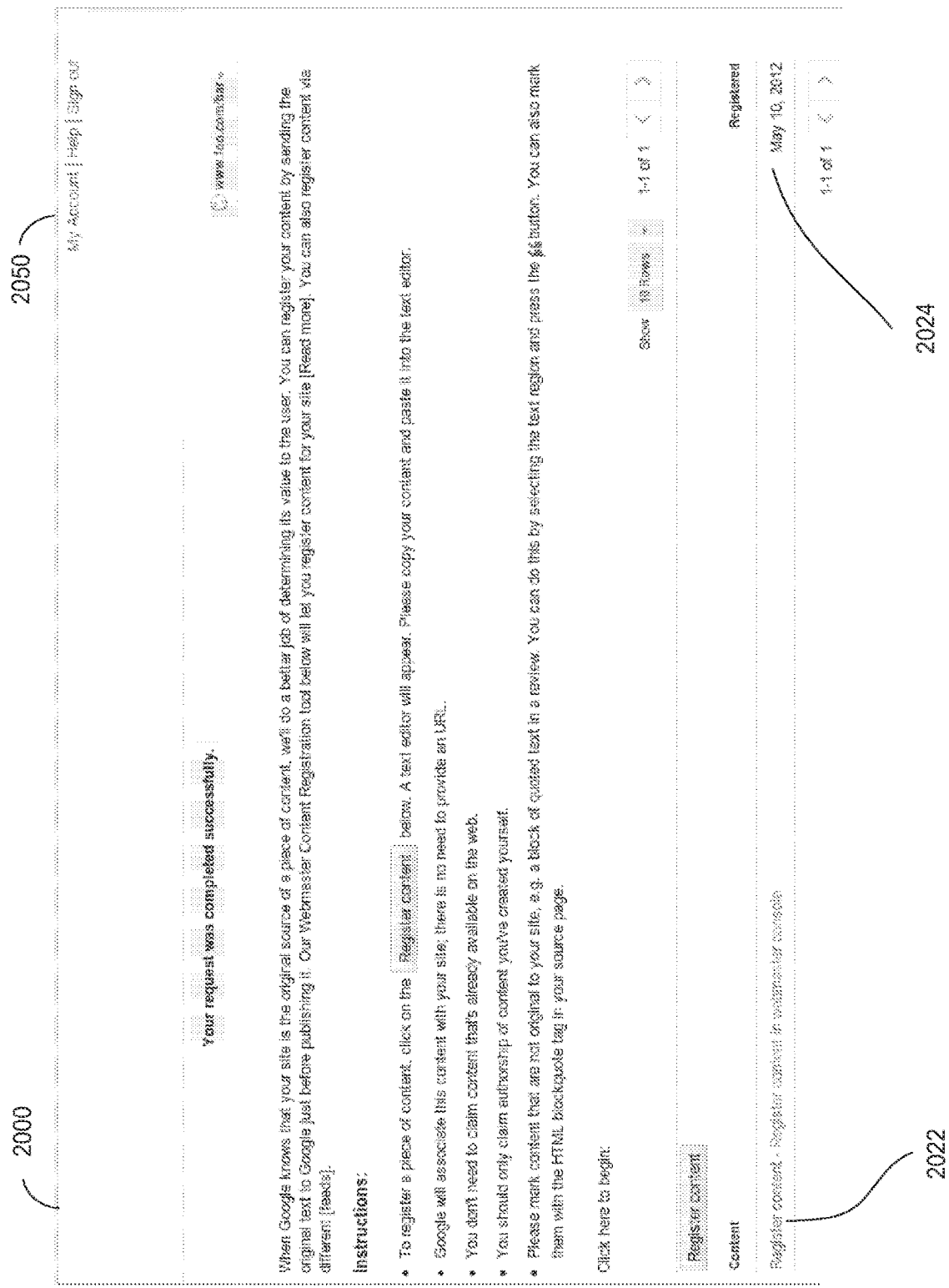
FIG. 20C is an example screenshot illustrating another web page that allows an entity to notify a server that content has been published on a resource server, according to some embodiments.

FIGS. 3A and 3B are block diagrams 300 illustrating an example process for determining a likelihood that an entity is an author of original content, according to some embodiments. Note that although the following discussion refers to the resource server 102-1, the client device 104-1, and the entity 105-1, this process may be applied to any resource server, client device, and entity (e.g., any resource server 102, any client device 104, and any entity 105). As illustrated in FIG. 3A, in response to content being published on the resource server 102-1, the resource server 102-1 sends a message 330 to the server 110 indicating that the content was published by the entity 105-1 on the resource server 102-1. Alternatively, although not depicted in FIG. 3A, in response to content being published on the resource server 102-1 (or in response to an indication that content will be published at a future time on the resource server 102-1), the client device 104-1 associated with the entity 105-1 sends the message 330 to the server 110 indicating that the content was published by the entity 105-1 on the resource server 102-1 (or will be published on the resource server 102-1 at a future time). For example, the entity 105-1 may use the client device 104-1 to send the message 330 to the server 110 by accessing a web page provided by the server 110 that allows the entity 105-1 to notify the server 110 that the content has been published by the entity 105-1 on the resource server 102-1. FIGS. 20A-20C are exemplary screenshots of web pages provided by the server 110 that allow the entity 105-1 to notify the server 110 that content has been published by the entity 105-1 on the resource server 102-1. In FIG. 20A, a web page 2000 allows the entity 105-1 to view content associated the entity 105-1. In this example, the entity 105-1 is associated with the domain "www.foo.com" and the path "bar," as illustrated by a location selector 2004. However, in other examples, the entity 105-1 may be associated with a subdomain of "foo.com" (e.g., "blog.foo.com") and/or any path of the domain (or subdomain) of "foo.com" (e.g., "blog.foo.com/bar/", "www.foo.com"). When the entity 105-1 presses a "register content" button 2002, the entity 105-1 is redirected to a content registration web page 2010, which is illustrated in FIG. 20B. The content registration web page 2010 allows the entity 105-1 to provide content in a content field 2016, provide labels for the content in an optional label field 2012, provide a link to the content (e.g., URL) in an optional link field (not shown), and format the content using formatting tools 2014. The entity 105-1 submits the content to the server 110 by pressing a "submit content" button 2018. After submitting the content using the content registration web page 2010, the entity 105-1 is redirected to the web page 2000, which now indicates that the content is registered and the date (and/or time) at which the content was registered (e.g., see reference numbers 2022 and 2024). In some embodiments, full access to the functionally associated with the web pages illustrated in FIGS. 20A, 20B, and 20C require that a user log in to their account by, for example, selecting the "My Account" tab 2050 and providing log in information that identifies the user. Returning to FIG. 3A, in another example, the client device 104-1 may send the message 330 to the server 110 indicating that the content was published by the entity 105-1 on the resource server 102-1.

Returning to FIG. 3A, in some embodiments, the message 330 includes only the content that was published on the resource server 102-1 or that will be published on the resource server 102-1 at a future time. In some embodiments, the message 330 includes the content that was published on the resource server 102-1 and a link to the content that was published on the resource server 102-1. In some embodiments, the message 330 only includes a link to the content that was published on the resource server 102-1. In some embodiments, the message 330 includes a portion of the content that was published on the resource server 102-1 and a link to the content that was published on the resource server 102-1. For example, the message 330 may contain the first kilobyte, first 10 kilobytes, first 100 kilobytes or first megabyte of the content that was published on the resource server 102-1. In some embodiments, the message 330 may contain a digest of the content that was published on the resource server 102-1. In embodiments where the message 330 does not include any portion of the content but does contain a link to the content, the server 110 obtains the content published on the resource server 102-1 prior to proceeding with the other operations described below. In some embodiments where the message 330 includes a portion of the content but not all of the content, the server 110 obtains the full set of content published on the resource server 102-1 prior to proceeding with the other operations described below. In some alternative embodiments where the message 330 includes a portion of the content but not all of the content, the server 110 does not obtain the full set of content published on the resource server 102-1 prior to proceeding with the other operations described below.

The front end module 202 receives the message 330 and provides the message 330 to the content module 204. The content module 204 stores a representation of the submitted content 331 in the index of known content 220. In some embodiments, the content module 204 stores a representation of the submitted content 331 in the index of known content 220. For example, in some embodiments, the content module 204 generates a set of shingles for the submitted content 331 and, for each respective shingle in the set of shingles, the content module 204 (i) applies a hash function to the respective shingle to produce a corresponding hash value for the respective shingle and (ii) stores information relating to the submitted content 331 (e.g., a link to a location on the resource server 102-1 hosting the submitted content 331, a timestamp of the message 330, etc.) in a record in the index of known content 220 that is indexed by the respective hash value.

As illustrated in FIG. 3B, the author module 206 calculates an original author score 332 for the entity 105-1 based on an evaluation of the collective representations of submitted content (e.g., all submitted content associated with the entity 105-1) in the index of known content 220 identified as being associated with the entity 105-1. The original author score is a metric representing a probability or likelihood that an entity is an author of original content. In some embodiments, the original author score for the entity 105-1 is calculated based at least in part on a percentage of the representations of submitted content in the index of known content 220 identified as being associated with the entity 105-1 that are first instances of representations of submitted content in the index of known content 220.

In some embodiments, the author module 206 calculates the original author score for the entity 105-1 in response to receiving the message 330. In some embodiments, the author module 206 periodically calculates the original author score for the entity 105-1 (e.g., every hour, every day, every week, etc.). In some embodiments, all content associated with the entity 105-1 in the index of known content 220 is considered in computing the original author score for the entity 105-1. In some embodiments, only more recent content associated with the entity 105-1 is considered in computing the original author score for the entity 105-1. For example, in various embodiments, only content within a threshold time period is used to calculate the original author score of the entity 105-1 (e.g., content with a timestamp within the past week, the past month, the past year, or the past two years, etc.). In some embodiments, only a discrete set of content associated with the entity 105-1 is considered in computing the original author score for the entity 105-1. For example, in various embodiments, only five or less, ten or less, fifty or less, or 100 or less different documents identified as being associated with the entity 105-1 are used to calculate the original author score of the entity 105-1. In some embodiments, recent content associated with the entity 105-1 in the index of known content provides a more significant contribution to the original author score for the entity 105-1 than less recent content. To illustrate one such embodiment, in some original authorship calculations, more recent content is up-weighted and less recent content is down-weighted in the original author score calculations.

In some embodiments, only content that is unique with respect to all other content that (i) has already been selected to compute an original author score for the entity 105-1 and (ii) is associated with the entity 105-1 is considered when computing the original author score for the entity. For example, in some embodiments, only content that (i) satisfies a dissimilarity criterion (e.g., at least 80 percent different, at least 90 percent different, etc.) with respect to all other content that has been selected for computation of an original author score for the entity 105-1 and (ii) is associated with the entity 105-1 is used in computing the original author score for the entity 105-1. In this way, original author scores are not biased by multiple submissions of the same original work by the entity 105-1.

Dissimilarity between a first document and second document associated with the entity 105-1 can be computed using any measure of similarity or dissimilarity in order to determine with the dissimilarity criterion has been satisfied. In some embodiments, a first document and second document associated with the entity 105-1 satisfy the dissimilarity criterion when a Levenshtein edit distance from the first document to the second document is greater than a predetermined number of character edits. In some embodiments, the first and second documents satisfy the dissimilarity criterion when a faro-Winkler distance metric from the first document to the second document is more than a predetermined distance. In some embodiments, the first and second documents satisfy the dissimilarity criterion when a Jaccard index is less than a predetermined value. In some embodiments, the first and second documents satisfy the dissimilarity criterion when a Masi distance is greater than a predetermined distance.

In some embodiments, the first and second documents document satisfy the dissimilarity criterion when a character count of the first document and a character count of the second document deviate by more than a character count threshold (and/or a word count threshold). For example, if the character count threshold is five characters, the first document and the second document satisfy the dissimilarity criterion when the character count of the first document and the character count of the second document deviate by more than five characters.

In some embodiments, the first and second documents document satisfy the dissimilarity criterion when the first document contains a predetermined quantity of shingles that are not found in the second document, or vice versa, where such shingles are computed using the techniques disclosed below in conjunction with step 1202 of FIG. 12.

In some embodiments, the author module 206 stores the original author score 332 in a record of an author database 222 that is associated with the entity 105-1.

The embodiments described in FIGS. 3A and 3B are described in more detail below with reference to FIGS. 27-32 below and in U.S. Provisional Patent Application No. 61/648,562 filed on May 17, 2012, entitled "Systems and Methods for Determining a Likelihood that an Entity is an Author of Original Content," which is hereby incorporated by reference herein in its entirety.

Figure 4A:
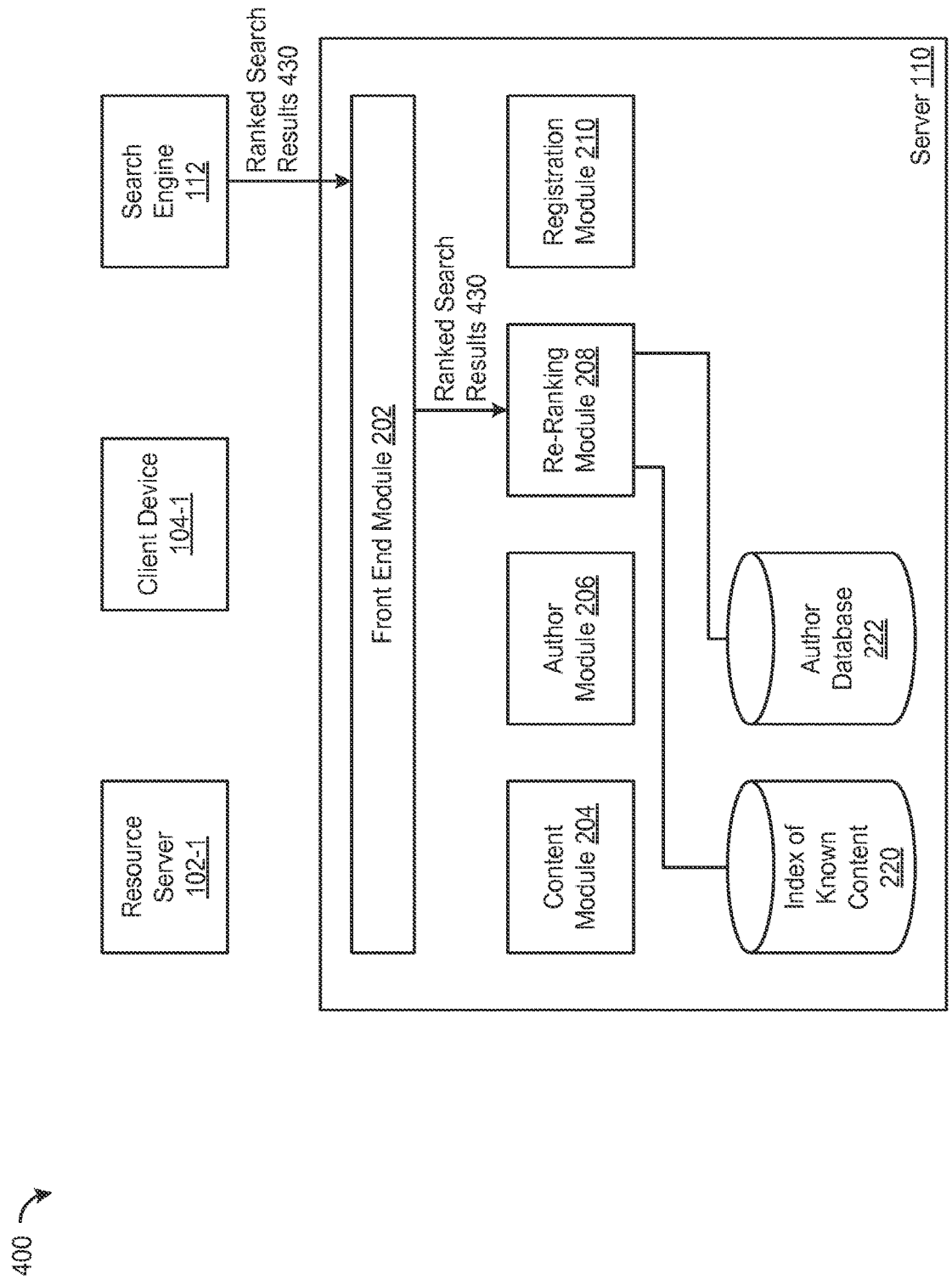
FIG. 4A is a block diagram illustrating an example process for re-ranking ranked search results, according to some embodiments.
Figure 4B:
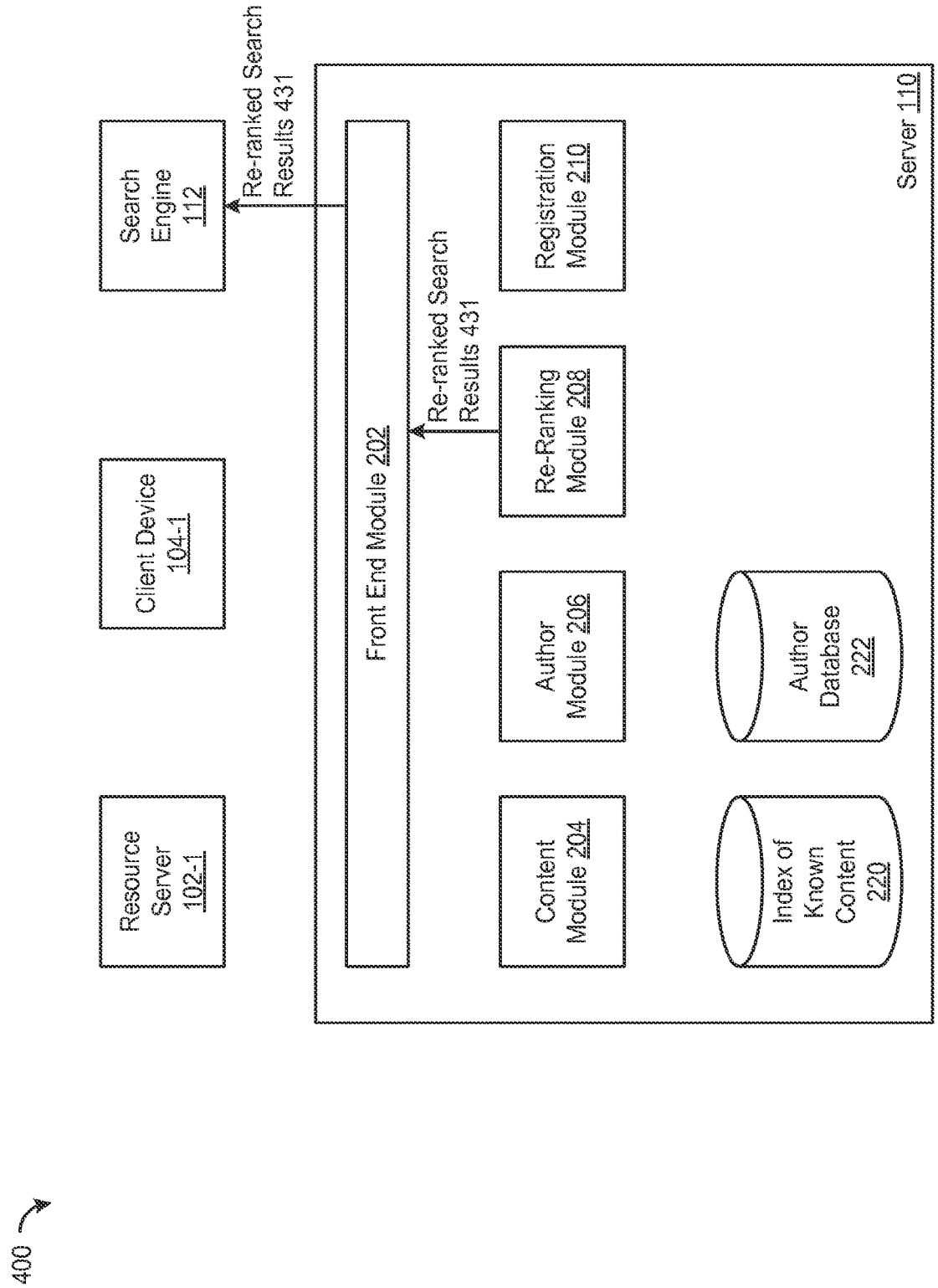
FIG. 4B continues the process illustrated in FIG. 4A, according to some embodiments.

FIGS. 4A and 4B are block diagrams 400 illustrating an example process for re-ranking ranked search results, according to some embodiments. As illustrated in FIG. 4A, ranked search results 430 are obtained from the search engine 112. The ranked search results 430 may be identified by the search engine 112 in response to the search engine 112 receiving a search query from a client device (e.g., the client device 104-1). The front end module 202 provides the ranked search results 430 to the re-ranking module 208.

When the ranked search results 430 includes a first search result corresponding to a first document associated with a first entity (e.g., entity 105-1) and a second search result corresponding to a second document associated with a second entity (e.g., entity 105-2) where (1) the first search result is ranked higher than the second search result, (2) the first document and the second document satisfy a similarity criterion (e.g., based on information obtained from the index of known content 220), and (3) the second entity satisfies a predefined authorship differential with respect to the first entity (e.g., based on original author scores obtained from the author database 222), the re-ranking module 208 swaps the first ranked search result and the second ranked search result to produce re-ranked search results 431.

As illustrated in FIG. 4B, the re-ranking module 208 provides the re-ranked search results 431 to the search engine 112 via the front end module 202. The search engine 112 then provides the re-ranked search results 431 to the client device for presentation to a user of the client device.

The embodiments described in FIGS. 4A and 4B are described in more detail below with reference to FIGS. 10-19 below and in U.S. Provisional Patent Application No. 61/648,553 filed on May 17, 2012, entitled "System and Method Re-ranking Ranked Search Results" which is hereby incorporated by reference herein in its entirety.

Figure 5B:
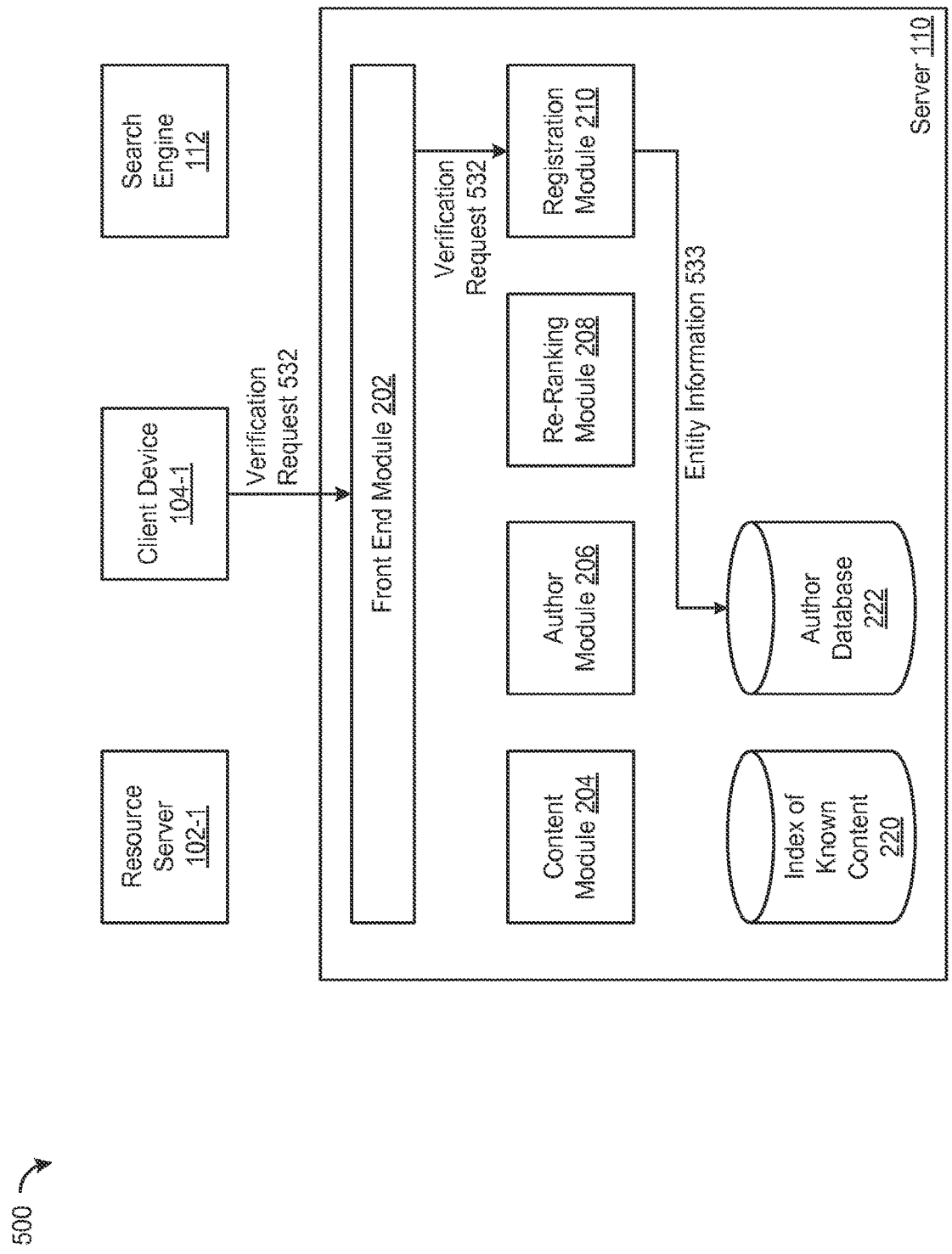
FIG. 5B continues the process illustrated in FIG. 5A, according to some embodiments.

FIGS. 5A and 5B are block diagrams 500 illustrating an example process for registering an entity as a registered author of content, according to some embodiments. The process of registering an entity as a registered author of content is an optional process that is performed prior to processes described above with reference to FIGS. 2-4. Note that although the following discussion refers to the entity 105-1, this process may be used to register any entity as a registered author of content. Also note that the process of registering an entity as a registered author of content merely identifies the entity as an author of content, but does not verify whether the entity is an author of original content (e.g., an entity that generates original content versus an entity that copies content).

In accordance with the example embodiments illustrated in FIGS. 5A and 5B, the server 110 receives, from the client device 104-1, a registration request 530 to register the entity 105-1 as a registered author of content. The front end module 202 provides the registration request 530 to the registration module 210. When the registration module 210 determines that the entity 105-1 is not registered as a registered author of content, the registration module 210 provides, to the client device 104-1 associated with the entity 105-1 via the front end module 202, a verification mechanism 531 to verify that the entity 105-1 is an author of content. The verification mechanism 531 includes one or more requests and one or more targets. For example, the verification mechanism 531 may include a request for the entity 105-1 to upload a predetermined file to a specified target such as a predetermined location on a resource server associated with the entity 105-1 (e.g., the resource server 102-1). In another example, the verification mechanism 531 includes a request for the entity 105-1 to add predetermined text to a target such as a predetermined webpage on a resource server associated with the entity 105-1 (e.g., the resource server 102-1). In another example, the verification mechanism 531 includes a request for the entity 105-1 to add a predetermined HTML, tag in a target such as a predetermined webpage hosted on a resource server associated with the entity 105-1 (e.g., the resource server 102-1). In still another example, the verification mechanism 531 includes a request for the entity 105-1 to add a predetermined script to the target such as a predetermined webpage hosted on the resource server 102 associated with the entity 105-1. In yet another example, the verification mechanism 531 includes a request for the entity 105-1 to add a DNS TXT record to a DNS record for a website operated by the entity 105-1 and hosted on a resource server associated with the entity 105-1 (e.g., a website of the entity 105-1 that is hosted on the resource server 102-1). In some embodiments, in addition to performing any one of, or any combination of, the above-identified verification mechanisms, the registration module 210 may perform additional verification mechanisms such as, for example, ensuring that the applicant entity 105 is not on a list of known bad actors. For example, in some embodiments, when the applicant entity 105 is on a list of known bad actors, the applicant is denied registration even if the applicant successfully enacted the request at the target specified by the at least one verification mechanism 531. Example verification mechanisms 531 have now been described. One of skill in the art, based on the present disclosure, will recognize and appreciate that there are numerous other verification mechanisms 531 and all such verification mechanisms are within the scope of the present disclosure.

As illustrated in FIG. 5B in some embodiments, responsive to the providing the at least one verification mechanism 531, the server 110 receives a verification request 532 from the client device 104-1 to verify that the entity 105-1 is an author of content based upon the verification mechanism 531. The registration module 210 verifies that the entity 105-1 is an author of content by checking to see if the one or more requests included in the verification mechanism 531 have been enacted at the one or more targets specified by the verification mechanism 531. If each of the respective requests in the one or more requests has been enacted at corresponding targets in the one or more targets, the registration module 210 registers the entity 105-1 as a registered author of content. For example, the registration module 210 may store entity information 533 for the entity 105-1 in a record of an author database 222. In some embodiments in accordance with this example, the entity information 533 for the entity 105-1 includes a name of the entity 105-1, an original author score for the entity 105-1, links to websites associated with the entity 105-1, links to content authored by the entity 105-1, links to profile pages for the entity 105-1 (e.g., on social networks or other websites), biographic information for the entity 105-1, and/or bibliographic information for the entity 105-1.

In an alternative to the embodiment depicted in FIG. 5B, after providing the at least one verification mechanism 531 to the client device 104-1, the registration module 210 polls the target specified by the verification mechanism 531 to determine whether the request set forth in the verification mechanism 531 has been enacted. In some embodiments, the registration module 210 polls the target a number of times (e.g., every minute, every five minutes, every hour, each day) within a predetermined cut off time (e.g., within one hour, one day, one week after providing the verification mechanism 531 to the client device 104-1) to determine whether the request set forth in the verification mechanism 531 has been enacted. If this polling successfully determines that the request specified by the verification mechanism 531 has been enacted at the target, the registration module 210 registers the entity 105-1 as a registered author of content.

Figure 6:
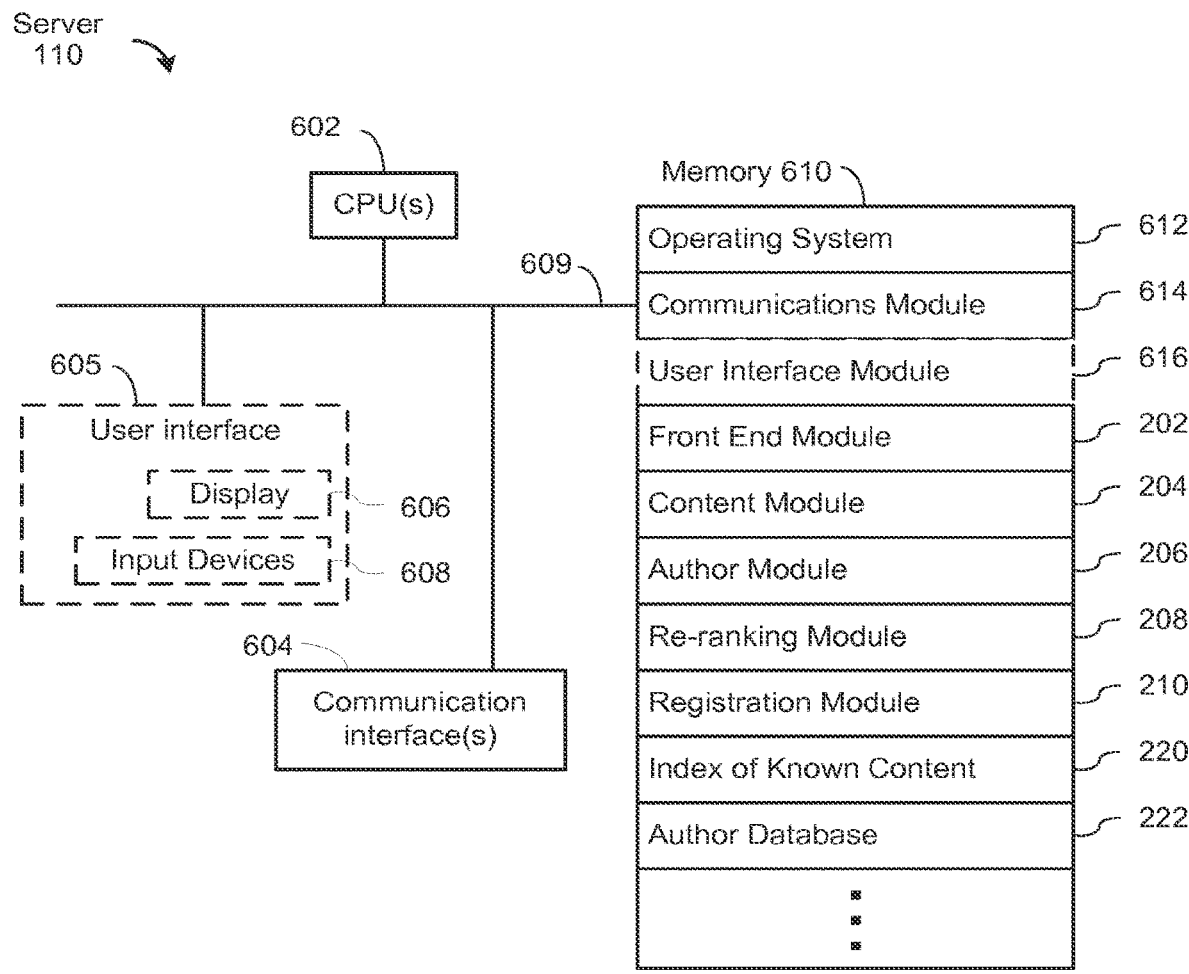
FIG. 6 is a block diagram illustrating a server, according to some embodiments.

FIG. 6 is a block diagram illustrating the server 110, according to some embodiments. The server 110 typically includes one or more processing units (CPU's, sometimes called processors) 602 for executing programs (e.g., programs stored in memory 610), one or more network or other communications interfaces 604, memory 610, and one or more communication buses 609 for interconnecting these components. The communication buses 609 may include circuitry (sometimes called a chipset) that interconnects and controls communications between system components. The server 110 optionally includes (but typically does not include) a user interface 605 comprising a display device 606 and input devices 608 (e.g., keyboard, mouse, touch screen, keypads, etc.). Memory 610 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 610 optionally includes one or more storage devices remotely located from the CPU(s) 602. Memory 610, or alternately the non-volatile memory device(s) within memory 610, comprises a non-transitory computer readable storage medium. In some embodiments, memory 610 or the computer readable storage medium of memory 610 stores the following programs, modules and data structures, or a subset thereof:

- an operating system 612 that includes procedures for handling various basic system services and for performing hardware dependent tasks;
- a communication module 614 that is used for connecting the server 110 to other computers via the one or more communication interfaces 604 (wired or wireless) and one or more communication networks, such as the Internet, other wide area networks, local area networks, metropolitan area networks, and so on;
- an optional user interface module 616 that receives commands from the user via the input devices 608 and generates user interface objects in the display device 606;

the front end module 202 that provides an interface between the server 110 and other computer systems, as described herein;

the content module 204 that evaluates submitted content to determine whether the submitted content is new relative to known content in the index of known content 220, issues requests to the search engine 112 to crawl and index the submitted content, and/or stores a representation of the submitted content in the index of known content 220, as described herein;

the author module 206 that calculates an original author score for an entity based at least in part on an evaluation of representations of submitted content in the index of known content 220 identified as being associated with the entity, as described herein;

the re-ranking module 208 that re-ranks ranked search results based at least in part on an original author score for the entities associated with the ranked search results, as described herein;

the registration module 210 that registers an entity as a registered author of content, as described herein;

the index of known content 220 that includes representations of submitted content, as described herein; and the author database 222 that includes entity information for entities (e.g., the entity information 533).

In some embodiments, the programs or modules identified above correspond to sets of instructions for performing a function described above. The sets of instructions can be executed by one or more processors (e.g., the CPUs 602). The above identified modules or programs (i.e., sets of instructions) need not be implemented as separate software programs, procedures or modules, and thus various subsets of these programs or modules may be combined or otherwise re-arranged in various embodiments. In some embodiments, memory 610 stores a subset of the modules and data structures identified above. Furthermore, memory 610 may store additional modules and data structures not described above.

Although FIG. 6 shows a "server," FIG. 6 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 6 could be implemented on single servers and single items could be implemented by one or more servers. The actual number of servers used to implement a server and how features are allocated among them will vary from one implementation to another, and may depend in part on the amount of data traffic that the system must handle during peak usage periods as well as during average usage periods.

Figure 7:
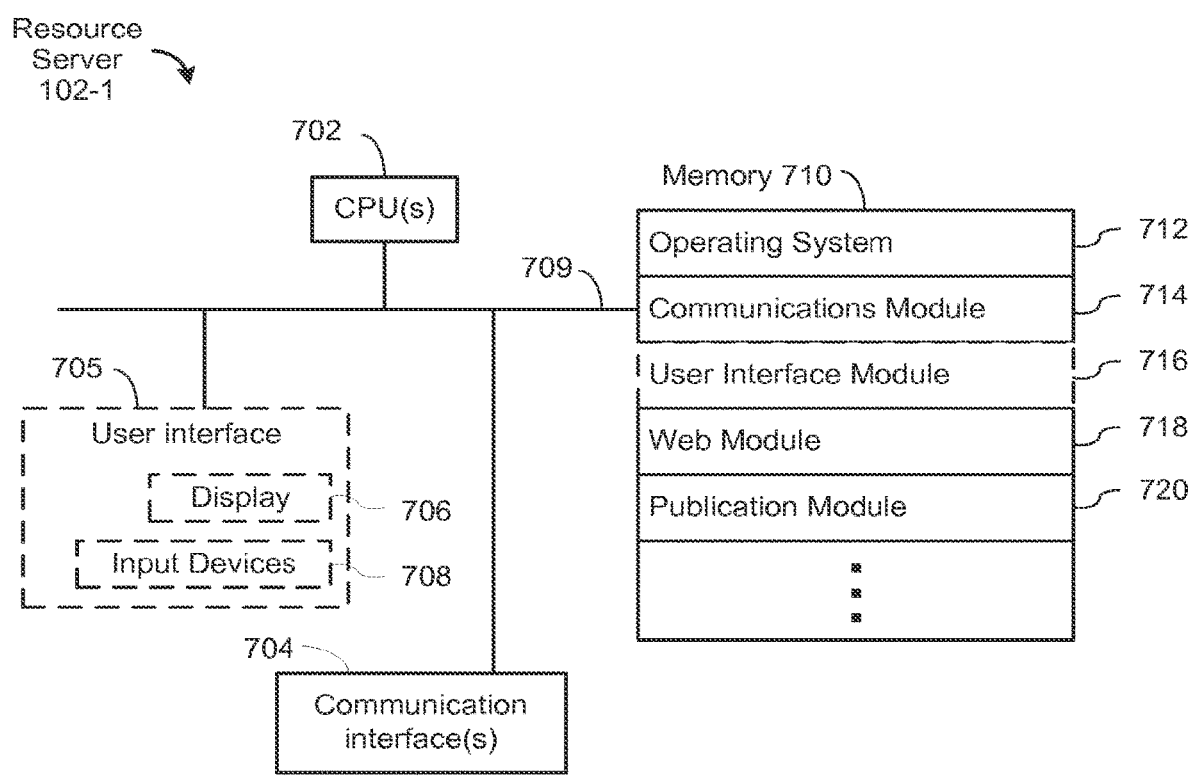
FIG. 7 is a block diagram illustrating a resource server, according to some embodiments.

FIG. 7 is a block diagram illustrating the resource server 102-1, according to some embodiments. Note that discussion below is not limited to the resource server 102-1 and may apply to any resource server. The resource server 102-1 typically includes one or more processing units (CPU's, sometimes called processors) 702 for executing programs (e.g., programs stored in memory 710), one or more network or other communications interfaces 704, memory 710, and one or more communication buses 709 for interconnecting these components. The communication buses 709 may include circuitry (sometimes called a chipset) that interconnects and controls communications between system components. The resource server 102-1 optionally includes (but typically does not include) a user interface 705 comprising a display device 706 and input devices 708 (e.g., keyboard, mouse, touch screen, keypads, etc.). Memory 710 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 710 optionally includes one or more storage devices remotely located from the CPU(s) 702. Memory 710, or alternately the non-volatile memory device(s) within memory 710, comprises a non-transitory computer readable storage medium. In some embodiments, memory 710 or the computer readable storage medium of memory 710 stores the following programs, modules and data structures, or a subset thereof:

an operating system 712 that includes procedures for handling various basic system services and for performing hardware dependent tasks;

a communication module 714 that is used for connecting the resource server 102-1 to other computers via the one or more communication interfaces 704 (wired or wireless) and one or more communication networks, such as the Internet, other wide area networks, local area networks, metropolitan area networks, and so on;

an optional user interface module 716 that receives commands from the user via the input devices 708 and generates user interface objects in the display device 706;

a web module 718 that responds to requests to access web pages or other resources (e.g., scripts, programs, etc.) hosted on the resource server 102-1; and a publication module 720 that publishes content for entities and sends messages (e.g., the messages 230 and 330) to the server 110 indicating that content has been published on the resource server 102-1.

In some embodiments, the programs or modules identified above correspond to sets of instructions for performing a function described above. The sets of instructions can be executed by one or more processors (e.g., the CPUs 702). The above identified modules or programs (i.e., sets of instructions) need not be implemented as separate software programs, procedures or modules, and thus various subsets of these programs or modules may be combined or otherwise re-arranged in various embodiments. In some embodiments, memory 710 stores a subset of the modules and data structures identified above. Furthermore, memory 710 may store additional modules and data structures not described above.

Although FIG. 7 shows a "resource server," FIG. 7 is intended more as functional description of the various features which may be present in a set of resource servers than as a structural schematic of the embodiments described herein. In practice, and as recognized by those of ordinary skill in the art, items shown separately could be combined and some items could be separated. For example, some items shown separately in FIG. 7 could be implemented on single servers and single items could be implemented by one or more servers. The actual number of servers used to implement a resource server and how features are allocated among them will vary from one implementation to another, and may depend in part on the amount of data traffic that the system must handle during peak usage periods as well as during average usage periods.

Figure 8:
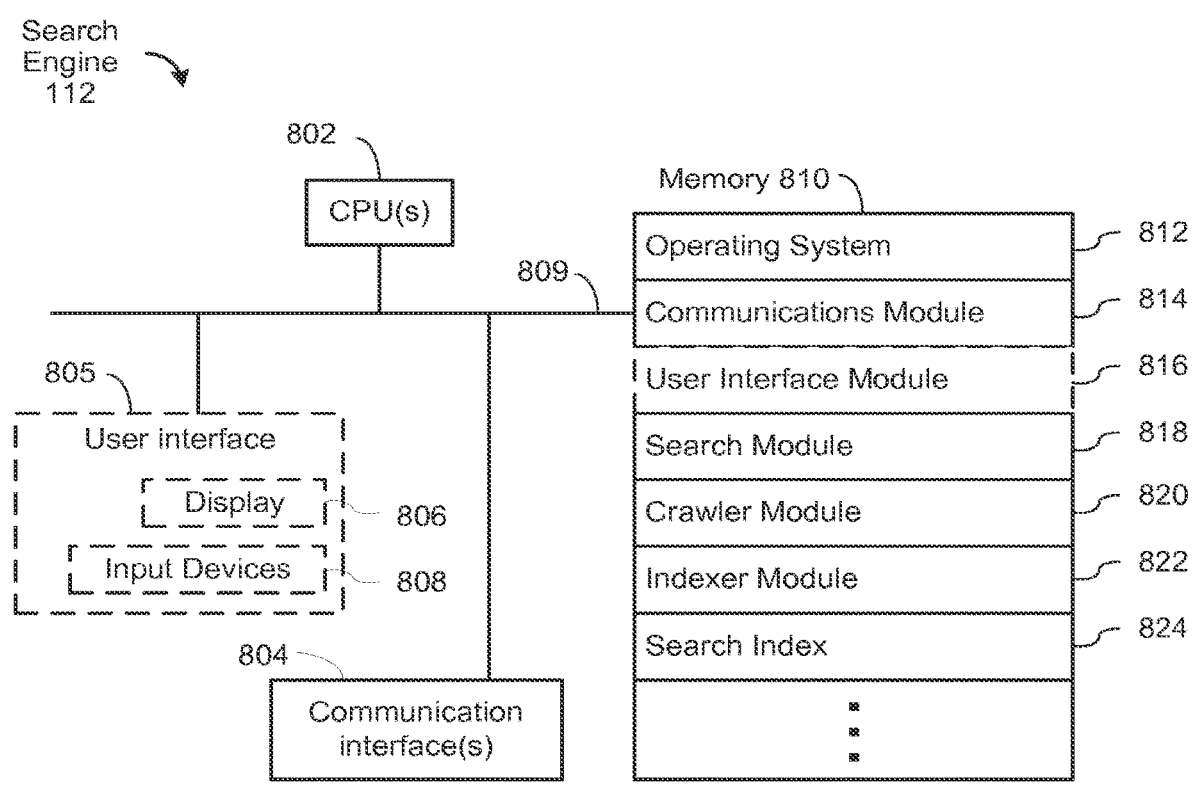
FIG. 8 is a block diagram illustrating a search engine, according to some embodiments.

FIG. 8 is a block diagram illustrating the search engine 112, according to some embodiments. The search engine 112 typically includes one or more processing units (CPU's, sometimes called processors) 802 for executing programs (e.g., programs stored in memory 810), one or more network or other communications interfaces 804, memory 810, and one or more communication buses 809 for interconnecting these components. The communication buses 809 may include circuitry (sometimes called a chipset) that interconnects and controls communications between system components.

The search engine 112 optionally includes (but typically does not include) a user interface 805 comprising a display device 806 and input devices 808 (e.g., keyboard, mouse, touch screen, keypads, etc.). Memory 810 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 810 optionally includes one or more storage devices remotely located from the CPU(s) 802. Memory 810, or alternately the non-volatile memory device(s) within memory 810, comprises a non-transitory computer readable storage medium. In some embodiments, memory 810 or the computer readable storage medium of memory 810 stores the following programs, modules and data structures, or a subset thereof:

- an operating system 812 that includes procedures for handling various basic system services and for performing hardware dependent tasks;
- a communication module 814 that is used for connecting the search engine 112 to other computers via the one or more communication interfaces 804 (wired or wireless) and one or more communication networks, such as the Internet, other wide area networks, local area networks, metropolitan area networks, and so on;
- an optional user interface module 816 that receives commands from the user via the input devices 808 and generates user interface objects in the display device 806;
- a search module 818 that identifies ranked search results that satisfy a search query;
- a crawler module 820 that periodically performs normal-priority crawl operations on links to identify new content and performs high-priority crawl operations to identify new content in response to receiving a request from the content module 204 of the server 110; and
- an indexer module 822 that indexes new content identified by the crawler module 820 into a search index 824.

In some embodiments, the programs or modules identified above correspond to sets of instructions for performing a function described above. The sets of instructions can be executed by one or more processors (e.g., the CPUs 802). The above identified modules or programs (i.e., sets of instructions) need not be implemented as separate software programs, procedures or modules, and thus various subsets of these programs or modules may be combined or otherwise re-arranged in various embodiments. In some embodiments, memory 810 stores a subset of the modules and data structures identified above. Furthermore, memory 810 may store additional modules and data structures not described above.

Although FIG. 8 shows a "search engine," FIG. 8 is intended more as functional description of the various features which may be present in a set of servers implementing a search engine than as a structural schematic of the embodiments described herein. In practice, and as recognized by those of ordinary skill in the art, items shown separately could be combined and some items could be separated. For example, some items shown separately in FIG. 8 could be implemented on single servers and single items could be implemented by one or more servers. The actual number of servers used to implement a search engine and how features are allocated among them will vary from one implementation to another, and may depend in part on the amount of data traffic that the system must handle during peak usage periods as well as during average usage periods.

Figure 9:
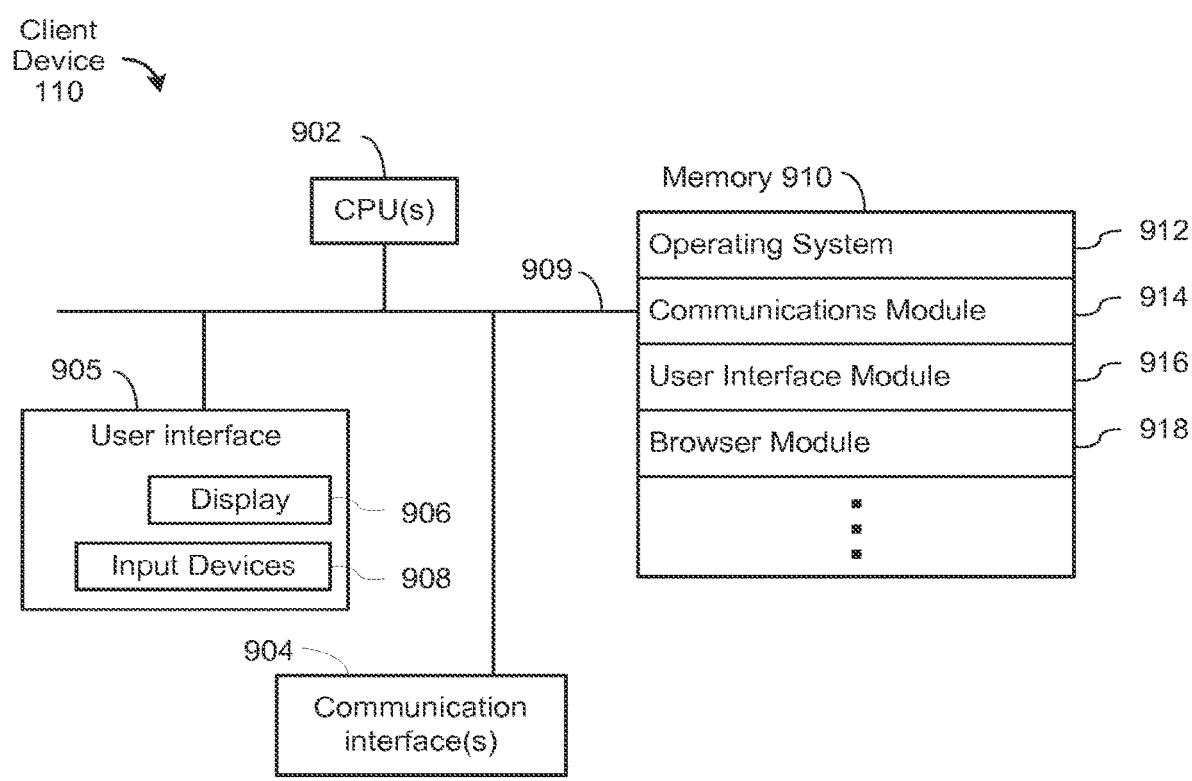
FIG. 9 is a block diagram illustrating a client device, according to some embodiments.

FIG. 9 is a block diagram illustrating the client device 104-1, according to some embodiments. Note that discussion below may apply to any client device. The client device 104-1 typically includes one or more processing units (CPU's, sometimes called processors) 902 for executing programs (e.g., programs stored in memory 910), one or more network or other communications interfaces 904, memory 910, and one or more communication buses 909 for interconnecting these components. The communication buses 909 may include circuitry (sometimes called a chipset) that interconnects and controls communications between system components. The client device 104-1 includes a user interface 905 comprising a display device 906 and input devices 908 (e.g., keyboard, mouse, touch screen, keypads, etc.). Memory 910 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 910 optionally includes one or more storage devices remotely located from the CPU(s) 902. Memory 910, or alternately the non-volatile memory device(s) within memory 910, comprises a non-transitory computer readable storage medium. In some embodiments, memory 910 or the computer readable storage medium of memory 910 stores the following programs, modules and data structures, or a subset thereof:

- an operating system 912 that includes procedures for handling various basic system services and for performing hardware dependent tasks;
- a communication module 914 that is used for connecting the client device 104-1 to other computers via the one or more communication interfaces 904 (wired or wireless) and one or more communication networks, such as the Internet, other wide area networks, local area networks, metropolitan area networks, and so on;
- a user interface module 916 that receives commands from the user via the input devices 908 and generates user interface objects in the display device 906; and
- a browser module 918 that provides a user interface for users to access and obtain documents and/or services hosted on servers (e.g., the resource servers 102), renders the documents and/or services in the user interface, and/or executes scripts (or other code).

In some embodiments, the programs or modules identified above correspond to sets of instructions for performing a function described above. The sets of instructions can be executed by one or more processors (e.g., the CPUs 902). The above identified modules or programs (i.e., sets of instructions) need not be implemented as separate software programs, procedures or modules, and thus various subsets of these programs or modules may be combined or otherwise re-arranged in various embodiments. In some embodiments, memory 910 stores a subset of the modules and data structures identified above. Furthermore, memory 910 may store additional modules and data structures not described above.

Although FIG. 9 shows a "client device," FIG. 9 is intended more as functional description of the various features which may be present in a client device than as a structural schematic of the embodiments described herein. In practice, and as recognized by those of ordinary skill in the art, items shown separately could be combined and some items could be separated.

Re-Ranking Ranked Search Results

The embodiments described below with reference to FIGS. 10-19 provide techniques for re-ranking ranked search results.

The following discussion refers to the resource server 102-1, the client device 104-1, the entity 105-1, and the search engine 112. However, it should be noted that the following discussion may be applied to any resource server, client device, entity, and search engine. Furthermore, the following discussion refers to particular modules of the server 110 performing particular operations illustrated in the FIGS. 10-19. However, the operations discussed below may be performed by other modules of the server 110.

Figure 10:
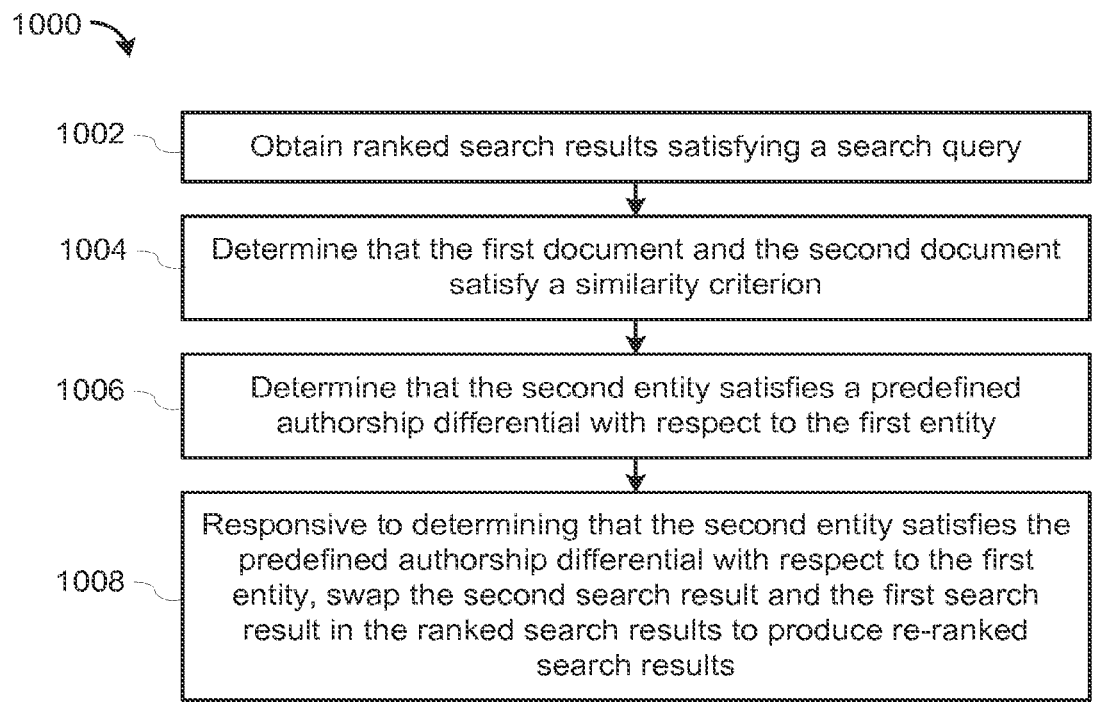
FIG. 10 is a flowchart of a method for re-ranking ranked search results, according to some embodiments.

FIG. 10 is a flowchart of a method 1000 for re-ranking ranked search results, according to some embodiments. The re-ranking module 208 obtains (1002) ranked search results (e.g., the ranked search results 430) satisfying a search query, where the ranked search results includes a first search result corresponding to a first document associated with a first entity and a second search result corresponding to a second document associated with a second entity, and where the first search result is ranked higher than the second search result.

The re-ranking module 208 determines (1004) that the first document and the second document satisfy a similarity criterion. In some embodiments, the first document and the second document satisfy the similarity criterion when a similarity threshold has been exceeded. For example, if the similarity criterion is based on the percentage of the content in the first and second documents that are similar, the similarity threshold may be set to a value of 90%. Accordingly, when the percentage of the content in the first and second documents that are similar exceeds the 90% similarity threshold, the re-ranking module 208 determines that the first document and the second document satisfy the similarity criterion. Operation 1004 is described in more detail below with reference to FIGS. 11 and 12.

The re-ranking module 208 determines (1006) that the second entity satisfies a predefined authorship differential with respect to the first entity. In some embodiments, the authorship differential is a difference between the original author scores for the first and second entities. Operation 1006 is described in more detail below with reference to FIG. 13.

Responsive to determining that the second entity satisfies the predefined authorship differential with respect to the first entity, the re-ranking module 208 swaps (1008) the second search result and the first search result in the ranked search results to produce re-ranked search results.

In some embodiments, when the ranked search results are obtained from the search engine 112, after swapping the second search result and the first search result in the ranked search results to produce the re-ranked search results, the re-ranking module 208 provides the re-ranked search results to the search engine 112.

In some embodiments, rather than swapping the second search result and the first search result in the ranked search results to produce re-ranked search results as specified in (1008), the second search result is given a higher ranking that is not necessarily that of the first search result. For example, in some implementations, the second search result is given the ranking of the first result and the first result is deleted from the ranked search results. In another example, the first search result is given a ranking in the ranked search results that is less than its original ranking and the second search result is given a ranking that is greater than its original ranking in the ranked search results. In this way, the second search result obtains a ranking that is higher than the ranking of the first search result in the revised ranked search results. In yet another example, the second search result is given a ranking that is greater than it original ranking such that its ranking is higher than the ranking of the first search result in the revised ranked search results.

Figure 11:
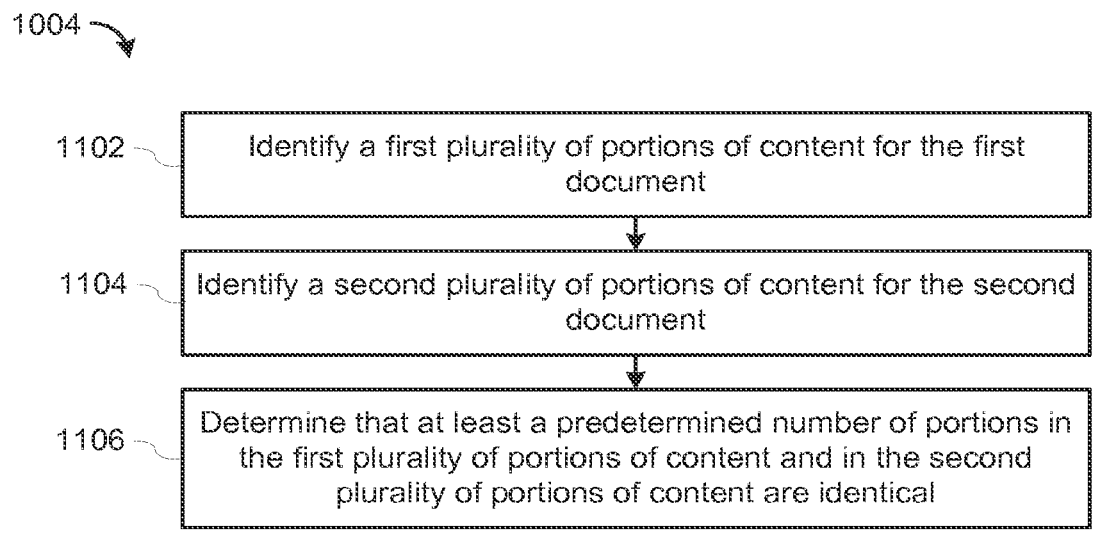
FIG. 11 is a flowchart of a method for determining that a first document and a second document satisfy a similarity criterion, according to some embodiments.

FIG. 11 is a flowchart of a method for determining (1004) that a first document and a second document satisfy a similarity criterion, according to some embodiments. The re-ranking module 208 identifies (1102) a first plurality of portions of content for the first document, identifies (1104) a second plurality of portions of content for the second document, and determines (1106) that at least a predetermined number of portions in the first plurality of portions of content and in the second plurality of portions of content are identical. In some embodiments, the predetermined number of portions encompasses a predetermined percentage of the data in the first document. In some embodiments, the predetermined number of portions is a threshold percentage of the portions of content in the first plurality of portions of content.

In some embodiments, respective portions of content in the first plurality of portions of content and the second plurality of portions of content include a predetermined amount of data. For example, the predetermined amount of data may include a predetermined number of characters, a predetermined number of bytes, a predetermined number of words, and the like.

Figure 12:
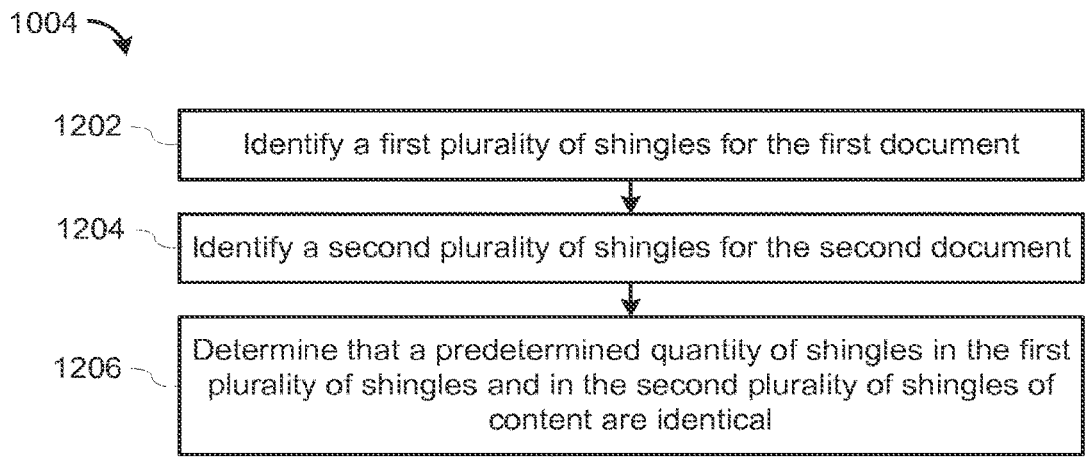
FIG. 12 is a flowchart of another method for determining that a first document and second document satisfy a similarity criterion, according to some embodiments.

FIG. 12 is a flowchart of another method for determining (1004) that a first document and a second document satisfy a similarity criterion, according to some embodiments. The re-ranking module 208 identifies (1202) a first plurality of shingles for the first document, identifies (1204) a second plurality of shingles for the second document, and determines (1206) that a predetermined quantity of shingles in the first plurality of shingles and in the second plurality of shingles of content are identical. In some implementations, the predetermined quantity is a predetermined percentage of shingles (e.g., 90% of the shingles). In some implementations, the predetermined quantity is a predetermined number of shingles (e.g., 20 shingles).

In some embodiments, the shingles in a respective plurality of shingles include at least one overlapping token (e.g., word or character). For example, if the content is "a big dog crosses the street" and 3-shingling is used (i.e., the set of all unique combinations of three words in the content is used as the basis for shingling), the set of shingles includes the following shingles: "a big dog," "big dog crosses," "dog crosses the," and "crosses the street." In some embodiments, the shingles in the respective plurality of shingles do not include overlapping tokens. For example, using the example content from the previous example, the set of shingles for a 3-shingling of the content includes the following shingles: "a big dog," and "crosses the street." Note that the discussion with reference to FIG. 12 refers to operations performed with respect to shingles (e.g., the respective tokens of the content included in the respective shingles). However, in some embodiments, hash values of the tokens in the shingles are used instead of the actual tokens in the shingles. The hash values for the tokens of the content may be generated using any appropriate hash function (e.g., MD5, SHA1, etc.). For example, for the overlapping token 3-shingling of the content from the example above, the hash values for the shingles "a big dog," "big dog crosses," "dog crosses the," and "crosses the street" may be used instead of the tokens themselves. Thus, when the terms "shingles" is used, it should be understood that hash values of the tokens in the shingles may be used instead. It will be appreciated that w-Shingling, where w is a positive integer greater than 1, is used to perform the shingling disclosed herein. In some embodiments w is 2, 3, 4, 5, 6, or an integer greater than 6.

In some embodiments, the first document and the second document satisfy the similarity criterion when a character count of the first document and a character count of the second document deviate by less than a character count threshold (and/or a word count threshold). For example, if the character count threshold is five characters, the first document and the second document satisfy the similarity criterion when the character count of the first document and the character count of the second document deviate by less than five characters.

In some embodiments, the first document and the second document satisfy the similarity criterion when a Levenshtein edit distance from the first document to the second document is less than a predetermined number of character edits. In some embodiments, the first document and the second document satisfy the similarity criterion when a faro-Winkler distance metric from the first document to the second document is less than a predetermined distance. In some embodiments, the first document and the second document satisfy the similarity criterion when a Jaccard index is greater than a predetermined value. In some embodiments, the first document and the second document satisfy the similarity criterion when a Masi distance is less than a predetermined distance.

Figure 13:
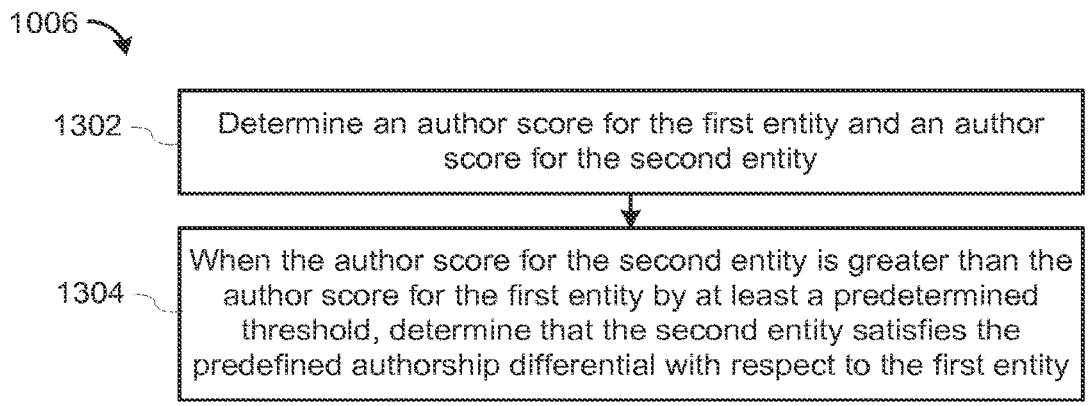
FIG. 13 is a flowchart of a method for determining that a second entity satisfies a predefined authorship differential with respect to a first entity, according to some embodiments.

FIG. 13 is a flowchart of a method for determining (1006) that a second entity satisfies a predefined authorship differential with respect to a first entity, according to some embodiments. The re-ranking module 208 determines (1302) an author score for the first entity and an author score for the second entity, where the author score for a respective entity indicates likelihood that the respective entity is an author of original content. Operation 1302 is described in more detail below with reference to FIG. 14.

When the author score for the second entity is greater than the author score for the first entity by at least a predetermined threshold (e.g., 10%), the re-ranking module 208 determines (1304) that the second entity satisfies the predefined authorship differential with respect to the first entity.

Figure 14:
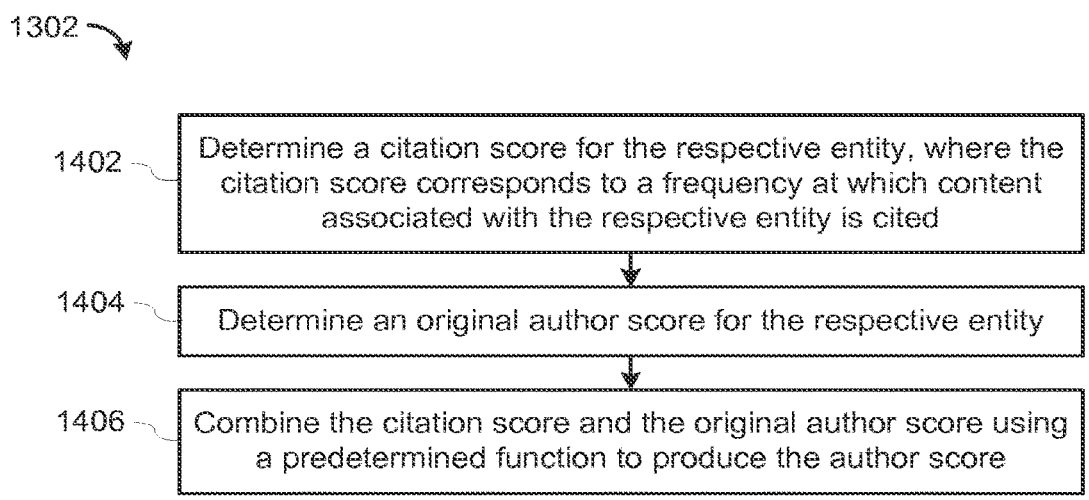
FIG. 14 is a flowchart of a method for determining an author score for a respective entity, according to some embodiments.

FIG. 14 is a flowchart of a method for determining (1302) an author score for a respective entity, according to some embodiments. The re-ranking module 208 determines (1402) a citation score for the respective entity. The citation score corresponds to a frequency at which content associated with the respective entity is cited. In some embodiments, the re-ranking module 208 determines the citation score for the respective entity by calculating the citation score as a quotient of a number of citations to content that is associated with the respective entity and a quantity of content that has at least one citation. In some embodiments, the re-ranking module 208 determines the citation score for the respective entity by calculating the citation score as a quotient of a number of citations to content that is associated with the respective entity and a quantity of content associated with the respective entity. In some implementations, the citation includes a link to at least a portion of the content (e.g., a subset of the content, the entire content, etc.). In some embodiments, the content is all content associated with the respective entity. In some embodiments, the content is content satisfying any of the criterion used to identify content for computation of an original author score discussed above in conjunction with FIG. 3B.

The re-ranking module 208 determines (1404) an original author score for the respective entity, where the original author score corresponds to a percentage of content associated with the respective entity that is a first instance of the content in the index of known content 220. Operation 1404 is described in more detail below with reference to FIGS. 15 and 17.

The re-ranking module 208 combines (1406) the citation score and the original author score using a predetermined function (e.g., simple summation of the citation score and the original author score, a weighted sum of the citation score and the original author score, multiplication of the citation score and the original author score, etc.) to produce the author score.

Figure 15:
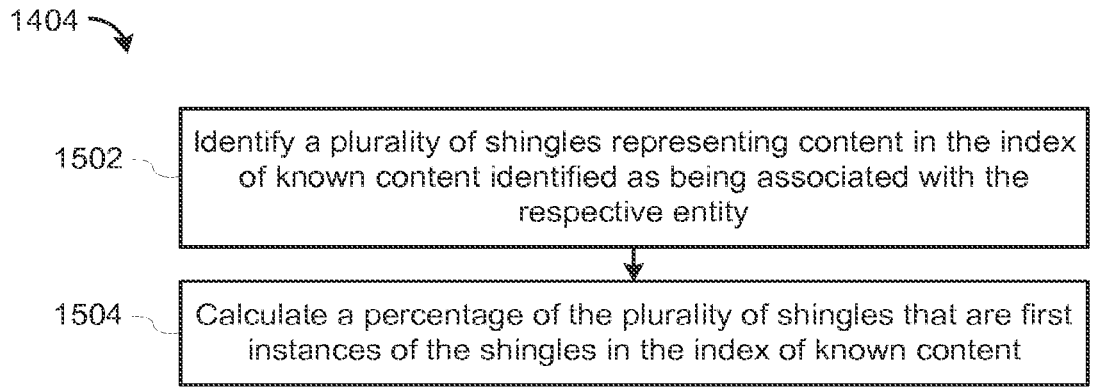
FIG. 15 is a flowchart of a method for determining an original author score for a respective entity, according to some embodiments.

FIG. 15 is a flowchart of a method for determining (1404) an original author score for a respective entity, according to some embodiments. The re-ranking module 208 identifies (1502) a plurality of shingles representing content in the index of known content identified as being associated with the respective entity and calculates (1504) a percentage of the plurality of shingles that are first instances of the shingles in the index of known content 220. Operation 1504 is described in more detail below with reference to FIG. 16.

Figure 16:
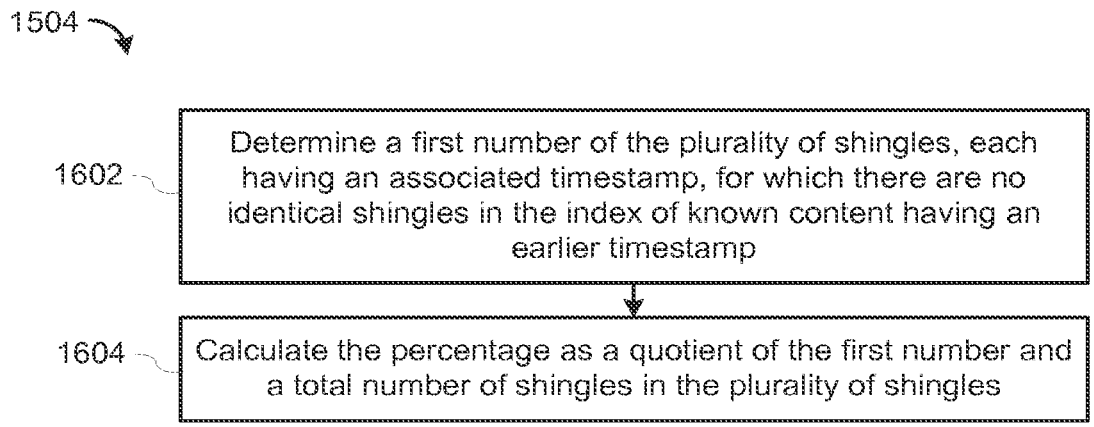
FIG. 16 is a flowchart of a method for calculating a percentage of shingles that are first instances, according to some embodiments.

FIG. 16 is a flowchart of a method for calculating (1504) a percentage of shingles that are first instances, according to some embodiments. The re-ranking module 208 determines (1602) a first number of the plurality of shingles, each having an associated timestamp, for which there are no identical shingles in the index of known content having an earlier timestamp. The re-ranking module 208 then calculates (1604) the percentage as a quotient of the (i) first number and (ii) a total number of shingles in the plurality of shingles.

In some embodiments, the re-ranking module 208 determines a first number of the plurality of shingles that are unique with respect to all other shingles in the index of known content and determines a second number of the plurality of shingles that are not unique with respect to the corresponding shingles in the index of known content but that are associated with timestamps that precede timestamps for identical shingles in the index of known content. The re-ranking module 208 then calculates the percentage as a quotient of (i) a sum of the first number and the second number and (ii) a total number of shingles in the plurality of shingles.

Figure 17:
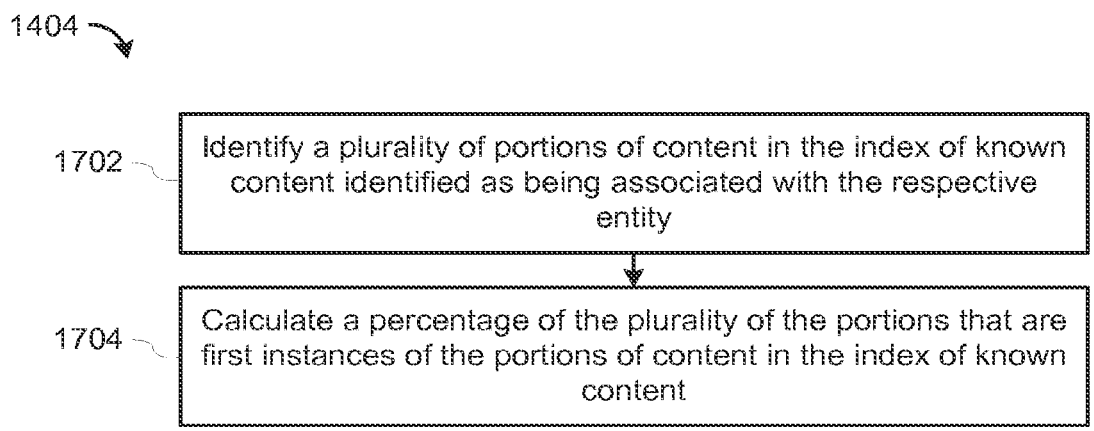
FIG. 17 is a flowchart of another method for determining an original author score for a respective entity, according to some embodiments.

FIG. 17 is a flowchart of another method for determining (1404) an original author score for a respective entity, according to some embodiments. The re-ranking module 208 identifies (1702) a plurality of portions of content in the index of known content identified as being associated with the respective entity, where each portion in the plurality of portions represents a predetermined amount of data in the index of known content. The re-ranking module 208 calculates (1704) a percentage of the plurality of the portions that are first instances of the portions of content in the index of known content. Operation 1704 is described in more detail below with reference to FIG. 18.

Figure 18:
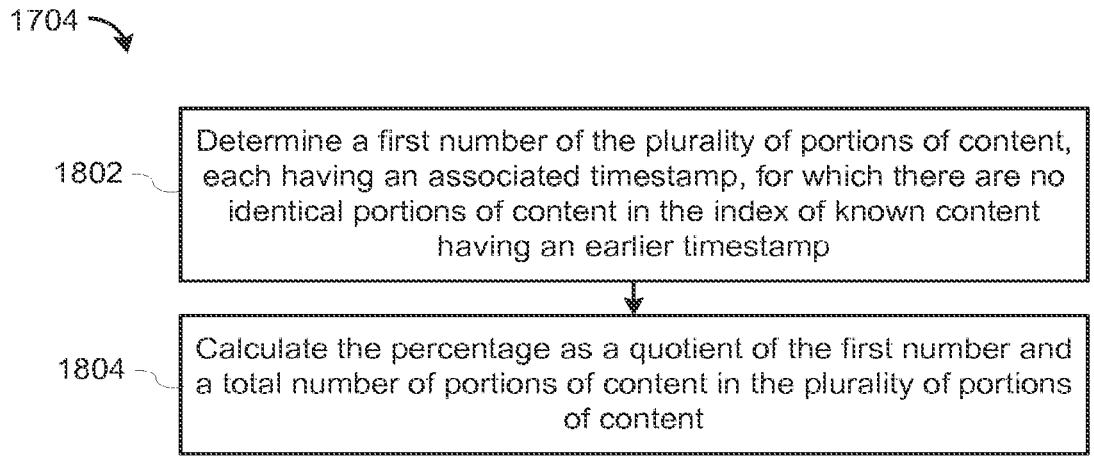
FIG. 18 is a flowchart of a method for calculating a percentage of portions of content that are first instances, according to some embodiments.

FIG. 18 is a flowchart of a method for calculating (1704) a percentage of portions of content that are first instances, according to some embodiments. The re-ranking module 208 determines (1802) a first number of the plurality of portions of content, each having an associated timestamp, for which there are no identical portions of content in the index of known content having an earlier timestamp. The re-ranking module 208 then calculates (1804) the percentage as a quotient of (i) the first number and (ii) a total number of portions of content in the plurality of portions of content.

In some embodiments, the re-ranking module 208 calculates (1704) a percentage of portions of content that are first instances by determining a first number of the plurality of portions of content that are unique with respect to all other portions of content in the index of known content and determining a second number of the plurality of portions of content that are not unique with respect to the corresponding portions of content in the index of known content but that are associated with timestamps that precede timestamps for identical portions of content in the index of known content. The re-ranking module 208 then calculates the percentage as a quotient of (i) a sum of the first number and the second number and (ii) a total number of portions of content in the plurality of portions of content.

In some embodiments, the re-ranking module 208 determines (1404) an original author score for a respective entity by identifying an amount of content in the index of known content identified as being associated with the entity, where the amount of content includes the submitted content. The re-ranking module 208 then calculates a percentage of the amount that is uniquely represented in the index of known content. In some implementations, the re-ranking module 208 calculates the percentage of the amount by determining a subset of the amount for which there are no identical portions of content in the index of known content having an earlier timestamp and calculating the percentage as a quotient of the subset and the amount.

Figure 19:
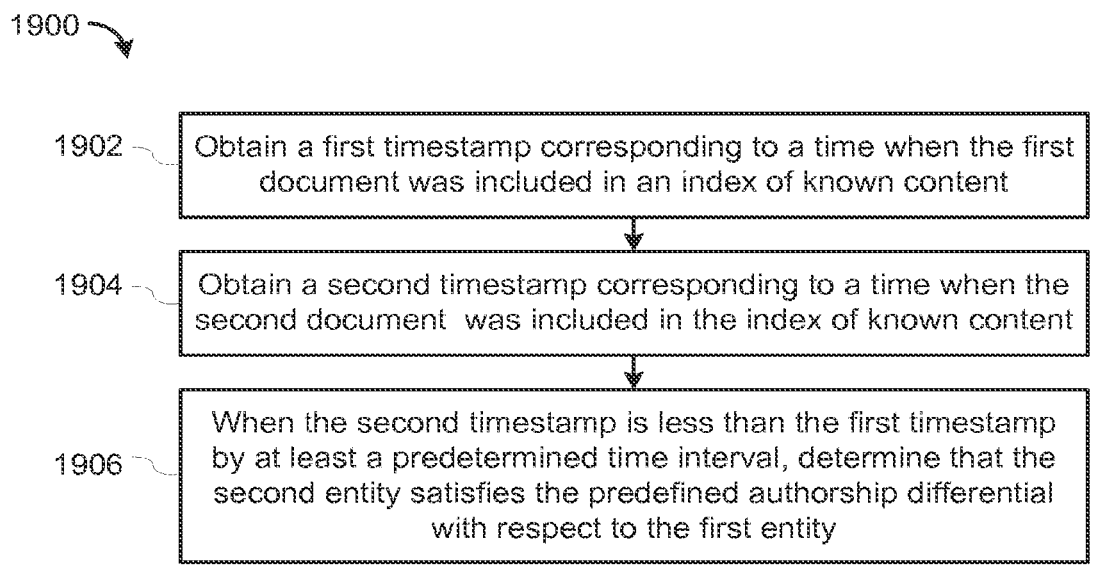
FIG. 19 is a flowchart of another method for re-ranking ranked search results, according to some embodiments.

In some embodiments, when the second entity does not satisfy a predefined authorship differential with respect to the first entity (e.g., the other branch of operation 1006), the re-ranking module 208 compares timestamps associated with the first document and the second document to determine whether to swap the first and second search results. FIG. 19 is a flowchart of a method 1900 for re-ranking ranked search results, according to some embodiments. The re-ranking module 208 obtains (1902) a first timestamp corresponding to a time when the first document was included in an index of known content 220 and obtains (1904) a second timestamp corresponding to a time when the second document was included in the index of known content 220. A respective timestamp may include one of: a time when a message (e.g., the message 230, the message 330) is received indicating that the respective document has been published on a resource server, a time when a message is received indicating that the respective document will be published at a future time, or a time when the search engine 112 first crawled and indexed the respective document. When the second timestamp is less than the first timestamp by at least a predetermined time interval, the re-ranking module 208 determines (1906) that the second entity satisfies the predefined authorship differential with respect to the first entity. In other words, the second document was included in the index of known content 220 prior to the first document being included in the index of known content 220. In such instances, the re-ranking module 208 swaps (1008) the second search result and the first search result in the ranked search results to produce re-ranked search results.

Crawling and Indexing Content

The embodiments described below with reference to FIGS. 21-26 address the problems faced by search engines in which content uploaded to a resource server may not be indexed and may not be available to the search engine until after the usefulness of the content has passed.

The following discussion refers to the resource server 102-1, the client device 104-1, the entity 105-1, and the search engine 112. However, it should be noted that the following discussion may be applied to any resource server, client device, entity, and search engine. Furthermore, the following discussion refers to particular modules of the server 110 performing particular operations illustrated in the FIGS. 10-15. However, the operations discussed below may be performed by other modules of the server 110.

Figure 21:
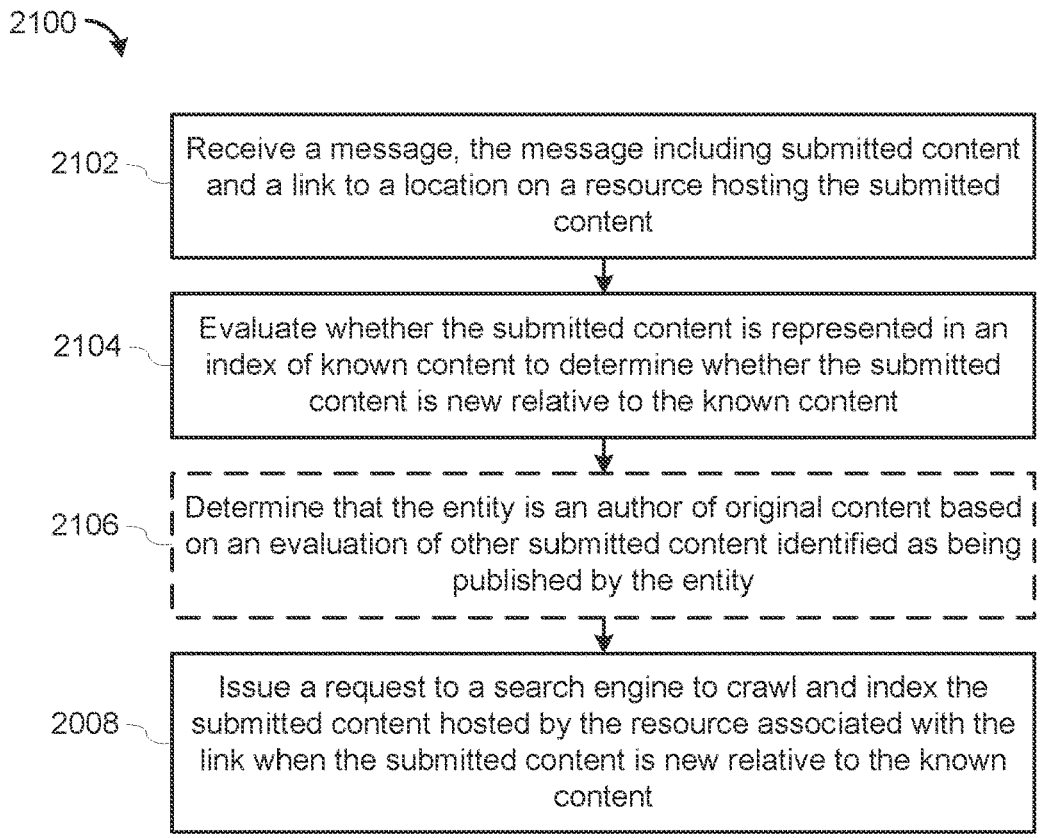
FIG. 21 is a flowchart of a method for crawling and indexing content, according to some embodiments.

FIG. 21 is a flowchart of a method 2100 for crawling and indexing submitted content, according to some embodiments. The content module 204 receives (2102) a message (e.g., the message 230, the message 330, etc.), where the message includes (i) submitted content (e.g., the submitted content 231, the submitted content 331, etc.), where the submitted content is identified as being published by an entity (e.g., the entity 105-1), and (ii) a link to location on a resource (e.g., the resource server 102-1) hosting the submitted content.

In some embodiments, the message is received in response to the entity publishing the submitted content on a website. For example, the message may be generated automatically when the entity 105-1 publishes content on a website hosted on the resource server 102-1.

In some embodiments, the message is received in response to the entity submitting the submitted content and the link to the location on the resource hosting the submitted content using a user interface provided by the server 110. For example, the user interface provided by the server 110 may be a web page that allows an entity to notify the server 110 that content has been published by the entity on a resource server.

In some embodiments, the message is received in response to the entity submitting a link to the published location of the submitted content (e.g., an address associated with a resource server 102) using a user interface provided by the server 110.

In some embodiments, the message is received in response to the entity submitting the submitted content using a user interface provided by the server 110, where the submitted content is marked as being submitted by the entity prior to publication of the submitted content by the entity. For example, the user interface provided by the server 110 may be a web page that allows an entity to notify the server 110 that content will be published at a future time by the entity on a resource server. In some embodiments, the server infers that the content will be published at a future time by the entity on a resource server if a URL of the resource server on which the content will be published is not provided by the entity.

The content module 204 evaluates (2104) whether the submitted content is represented in the index of known content 220 to determine whether the submitted content is new relative to the known content. Operation 2104 is described in more detail below with reference to FIGS. 22A and 22B.

In response to the evaluating, the content module 204 issues (2108) a request to the search engine 112 to crawl and index the submitted content hosted by the resource associated with the link when the submitted content is new relative to the known content. In some embodiments, the request is a high priority request that is directed to a high priority crawler of the search engine 112. In these embodiments, a time when the high priority crawler of the search engine 112 is scheduled to crawl the submitted content occurs before a time when a standard crawler of the search engine 112 is scheduled to crawl the submitted content.

In some embodiments, the request to the search engine 112 includes the link to the location on the resource and a timestamp associated with the message. In these embodiments, the timestamp associated with the message is included in a search index entry for the submitted content (e.g., in an entry of the search index 824).

In some embodiments, a respective link to a respective location on a respective resource hosting a respective known content and a timestamp associated with the respective known content are included in a respective record of the index of known content 220. In some such embodiments, the index of known content 220 is indexed by a respective hash value for a respective shingle of the respective known content.

Figure 22A:
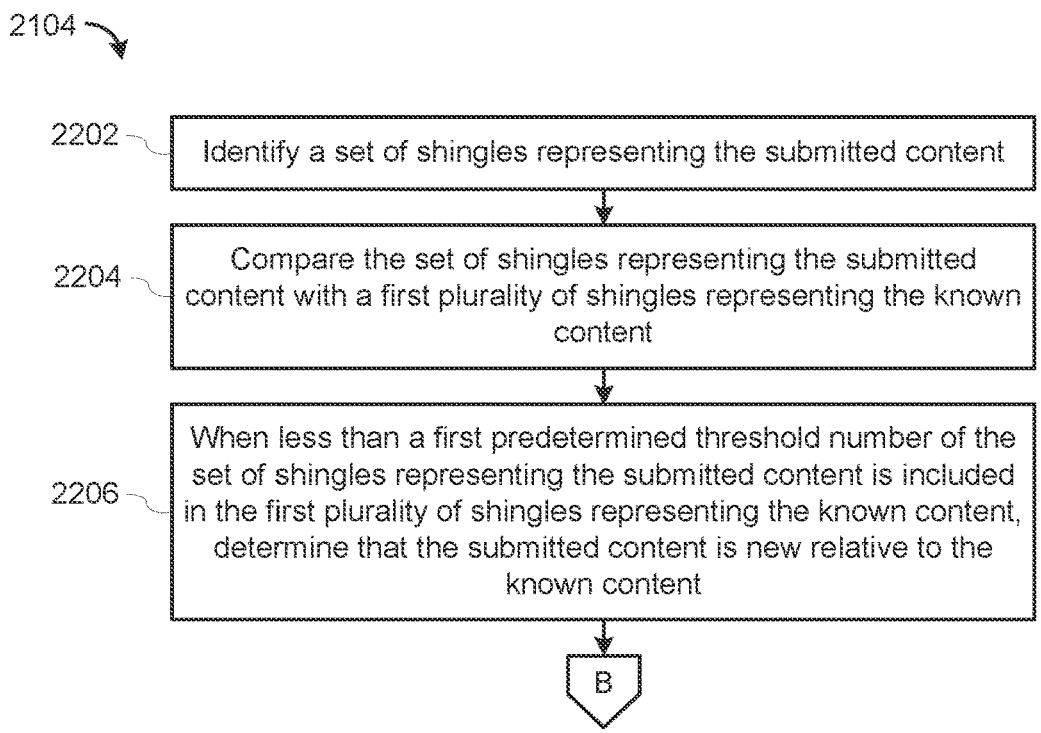
FIG. 22A is a flowchart of a method for determining whether submitted content is new relative to known content, according to some embodiments.

Attention is now directed to FIGS. 22A and 22B, which are flowcharts of a method for determining (2104) whether submitted content is new relative to known content, according to some embodiments. The content module 204 identifies (2202) a set of shingles representing the submitted content, where a respective shingle in the set of shingles includes a predetermined number of consecutive tokens for the submitted content. In some embodiments, the shingles in the set of shingles include at least one overlapping token (e.g., word or character). For example, if the content is "a big dog crosses the street" and 3-shingling is used (i.e., the set of all unique combinations of three words in the content is used as the basis for shingling), the set of shingles includes the following shingles: "a big dog," "big dog crosses," "dog crosses the," and "crosses the street." In some embodiments, the shingles in the set of shingles do not include overlapping tokens. For example, using the example content from the previous example, the set of shingles for a 3-shingling of the content includes the following shingles: "a big dog," and "crosses the street." It will be appreciated that w-Shingling, where w is a positive integer greater than 1, is used to perform the shingling disclosed herein. In some embodiments w is 2, 3, 4, 5, 6, or an integer greater than 6.

Similar to the discussion with reference to FIG. 12, FIGS. 22A and 22B refer to operations performed with respect to shingles (e.g., the respective tokens of the content included in the respective shingles). However, in some embodiments, hash values of the tokens in the shingles are used instead of the actual tokens in the shingles. The hash values for the tokens of the content may be generated using any appropriate hash function (e.g., MD5, SHA1, etc.). For example, for the overlapping token 3-shingling of the content from the example above, the hash values for the shingles "a big dog," "big dog crosses," "dog crosses the," and "crosses the street" may be used instead of the tokens themselves. Thus, when the terms "shingles" is used, it should be understood that hash values of the tokens in the shingles may be used instead.

The content module 204 compares (2204) the set of shingles representing the submitted content with a first plurality of shingles representing the known content. For example, the first plurality of shingles may include all or a subset of all of the shingles representing the known content that are included in the index of known content 220.

Operation 2206 specifies the conditions under which the submitted content is deemed to be a first instance (e.g., in time) of content based on a single criterion. The criterion specifies that, when less than a first predetermined threshold number of the set of shingles representing the submitted content is included in the first plurality of shingles representing the known content (e.g., all or a subset of the shingles included in the index of known content 220), the content module 204 determines (2206) that the submitted content is new relative to the known content. For example, if the first predetermined threshold number of the set of shingles representing the submitted content is 51% of the total number of shingles in the set of shingles representing the submitted content, the content module 204 determines that the submitted content is new relative to the known content when less than 51% of the shingles in the set of shingles representing the submitted content is included in the first plurality of shingles representing the known content (e.g., all or a subset of the shingles included in the index of known content 220).

Operations 2208-2212 specify the disposition of the submitted content when the criterion specified in operation 2206 fails. That is, when more than a first predetermined threshold number of the shingles in the submitted content shingle set are also found in the known content shingle set. Failure of the criterion specified in operation 2206 suggests that the index of known content 220 includes a sufficient number of shingles that match the shingles of the submitted content such that the submitted content is deemed to not be a first instance of the content. However, operations 2208-2212 include three possible condition sets which collectively determine whether the submitted content may be deemed new relative to the known content despite the failure of the criterion of operation 2206.

When (i) at least the first predetermined threshold number of the set of shingles representing the submitted content (e.g., 51% of the total number of shingles in the set of shingles representing the submitted content) is included in the first plurality of shingles representing the known content, (ii) at least a second predetermined threshold number of the set of shingles representing the submitted content (e.g., 50% of the total number of shingles in the set of shingles representing the submitted content) is included in a second plurality of shingles representing other submitted content identified as being published by the entity, and (iii) at least a third predetermined threshold of corresponding shingles in the second plurality of shingles representing the other submitted content (e.g., 51% of the total number of corresponding shingles in the second plurality of shingles representing the other submitted content) are first instances with respect to corresponding shingles in the first plurality of shingles representing the known content, the content module 204 determines (2208) that the submitted content is new relative to the known content. Stated another way, when condition (i) is satisfied, the submitted content is deemed to not be a first instance of the content in the index of known content 220. In other words, the index of known content 220 includes a sufficient number of shingles that match the shingles of the submitted content so that the submitted content is deemed to not be a first instance of the content in the index of known content 220. When condition (ii) is satisfied, the submitted content is deemed to be similar to (or a duplicate of) other submitted content associated with the entity. For example, the entity may have submitted the content prior to publication of the content (e.g., as discussed above with reference to FIGS. 2A and 2B). When condition (iii) is satisfied, the shingles for the other submitted content that correspond to the submitted content are deemed to be first instances of the shingles in the index of known content 220. Operation 2208 serves to identify instances where operation 2206 failed to identify submitted content as new because the known content already included an appreciable amount of the entities' 105 own work and such work was causing the criterion of operation 2206 to fail. On this basis, when conditions (i), (ii), and (iii) of 2208 are satisfied, the submitted content is nevertheless deemed to be new relative to the known content in the index of known content 220.

When (i) at least the first predetermined threshold number of the set of shingles representing the submitted content is included in the first plurality of shingles representing the known content, (ii) at least a second predetermined threshold number of the set of shingles representing the submitted content is included in a second plurality of shingles representing other submitted content identified as being published by the entity, and (iii) less than a third predetermined threshold of corresponding shingles in the second plurality of shingles representing the other submitted content are first instances with respect to corresponding shingles in the first plurality of shingles representing the known content, the content module 204 determines (2210) that the submitted content is not new relative to the known content. Conditions (i) and (ii) are the same as conditions (i) and (ii), respectively, in operation 2208. Condition (iii) in operation 2210 contemplates the other case of condition (iii) in operation 2208, where the shingles for the other submitted content that correspond to the submitted content are not first instances of the shingles in the index of known content 220. When conditions (i), (ii), and (iii) are satisfied, the submitted content is deemed to not be new relative to the known content in the index of known content 220.

When (i) at least the first predetermined threshold number of the set of shingles representing the submitted content is included in the first plurality of shingles representing the known content, and (ii) less than a second predetermined threshold number of the set of shingles representing the submitted content is included in a second plurality of shingles representing other submitted content identified as being published by the entity, the content module 204 determines (2212) that the submitted content is not new relative to the known content. Condition (i) is the same condition (i) in operation 2208. Condition (ii) in operation 2212 contemplates the other case of condition (iii) in operation 2208 where the submitted content is deemed to not be similar (or not be a duplicate) to other submitted content associated with the entity. In other words, the submitted content is similar to (or a duplicate of) known content in the index of known content 220, but was not previously submitted by (or associated with) the entity (e.g., the submitted content was not previously submitted prior to publication of the submitted content). In some embodiments, the first predetermined threshold number, the second predetermined threshold number, and the third predetermined threshold number are each different numbers. In some embodiments one or more of the first predetermined threshold number, the second predetermined threshold number, and the third predetermined threshold number are the same. When conditions (i), (ii), and (iii) are satisfied, the submitted content is deemed to not be new relative to the known content in the index of known content 220.

In some embodiments, prior to issuing (2108) the request to the search engine 112 to crawl and index the submitted content hosted by the resource associated with the link, the content module 204 determines (2106) that the entity is an author of original content based on an evaluation of other submitted content identified as being published by the entity, where the other submitted content identified as being published by the entity is included in the known content. In these embodiments, the request to the search engine 112 to crawl and index the submitted content hosted by the resource associated with the link is issued responsive to determining that the submitted content is deemed to not be represented in the index of known content (i.e., new with respect to the index of known content) and determining that the entity is an author of original content.

Attention is now directed to FIG. 23, which is a flowchart of a method for determining (2106) that an entity is an author of original content based on the other submitted content identified as being published by the entity, according to some embodiments. The content module 204 identifies (2302) a second plurality of shingles representing the other submitted content identified as being published by the entity.

The content module 204 determines (2304) that at least a third predetermined threshold number of the second plurality of shingles representing the other submitted content identified as being published by the entity are first instances with respect to corresponding shingles in a first plurality of shingles representing the known content. Responsive to the determining, the content module 204 determines (2306) that the entity is an author of original content. In other words, when at least the third predetermined threshold number of shingles (e.g., 51% of the shingles) representing other submitted content identified as being published by (or otherwise associated with) the entity, the entity is deemed to be an author of original content. In some embodiments, an original author score is calculated for the entity. In these embodiments, when the original author score exceeds a predetermined threshold, the entity is deemed to be an author of original content.

FIG. 24 is a flowchart of a method for determining (2304) that shingles representing the other submitted content identified as being published by an entity are first instances with respect to the corresponding shingles in the first plurality of shingles representing known content, according to some embodiments. The content module 204 determines (2402) a first number of the second plurality of shingles representing the other submitted content identified as being published by the entity that are unique with respect to the first plurality of shingles representing the known content.

The content module 204 determines (2404) a second number of the second plurality of shingles representing the other submitted content identified as being published by the entity that are not unique with respect to the shingles for the known content but that are associated with timestamps that precede timestamps for corresponding shingles in the first plurality of shingles representing the known content.

The content module 204 determines (2406) that a sum of the first number and the second number is at least the third predetermined threshold number.

Note that although the discussion above refers to shingles, any technique for partitioning content to generate portions of the content may be used. For example, the content may be partitioned into portions based on a predetermined number of characters.

Figure 25:
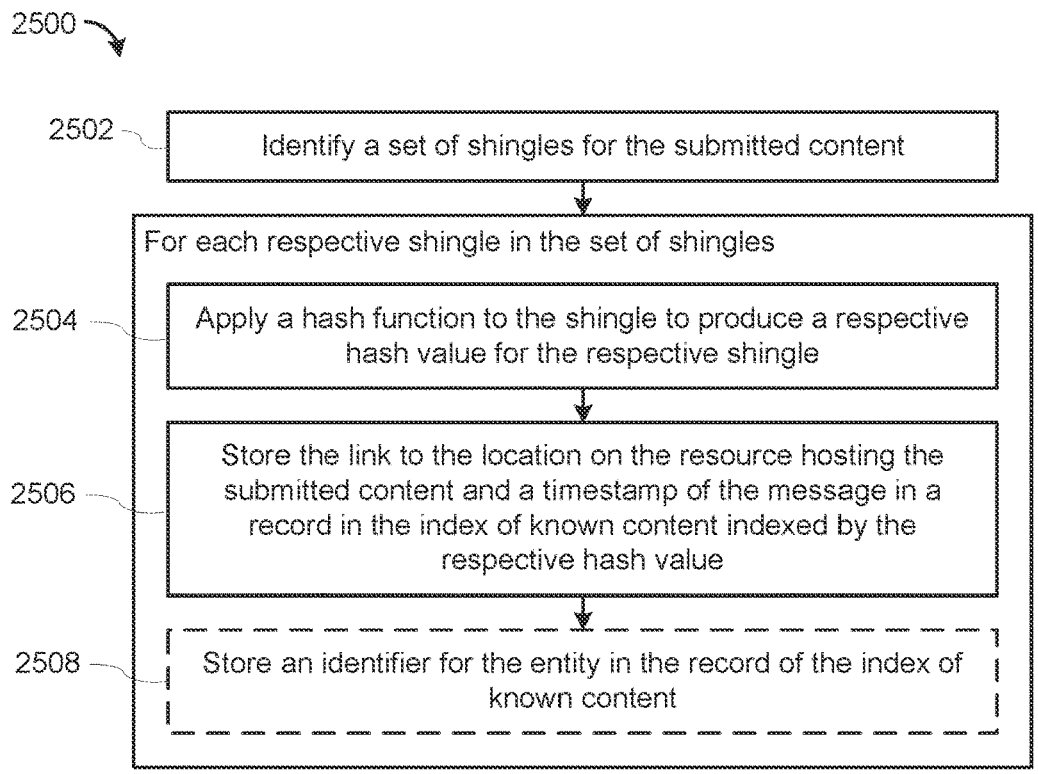
FIG. 25 is a flowchart of a method for storing information for submitted content, according to some embodiments.

In some embodiments, the content module 204 stores information for the submitted content in the index of known content 220. FIG. 25 is a flowchart of a method 2500 for storing information for submitted content, according to some embodiments. The content module 204 identifies (2502) a set of shingles for the submitted content. For each respective shingle in the set of shingles, the content module applies (2504) a hash function to the shingle to produce a respective hash value for the respective shingle, stores (2506) the link to a location on the resource hosting the submitted content and a timestamp of the message in a record in the index of known content indexed by the respective hash value, and optionally stores (2508) an identifier for the entity in the record of the index of known content.

Figure 26:
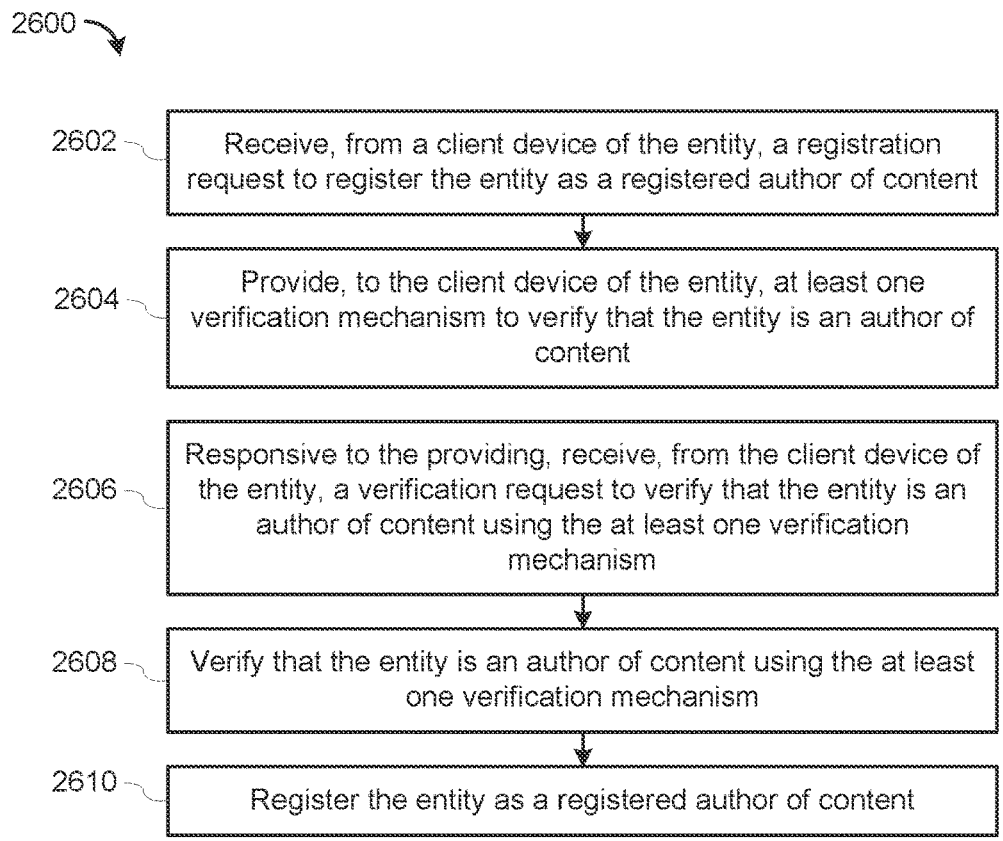
FIG. 26 is a flowchart of a method for registering an entity as a registered author of content, according to some embodiments.

In some embodiments, prior to receiving the message, the server 110 registers the entity as a registered author of content. FIG. 26 is a flowchart of a method 2600 for registering an entity as a registered author of content, according to some embodiments. The registration module 210 receives (2602), from a client device of the entity (e.g., the client device 104-1 of the entity 105-1), a registration request to register the entity as a registered author of content (e.g., the registration request 530). The registration module 210 provides (2604), to the client device of the entity, at least one verification mechanism to verify that the entity is an author of content (e.g., the verification mechanism 531). Responsive to the providing, the registration module 210 receives (2606), from the client device of the entity, a verification request to verify that the entity is an author of content using the at least one verification mechanism (e.g., the verification request 532). The registration module 210 verifies (2608) that the entity is an author of content using the at least one verification mechanism and registers (2610) the entity as a registered author of content.

Determining a Likelihood that an Entity is an Author of Original Content

The embodiments described below with reference to FIGS. 27-32 provide techniques for determining a likelihood that an entity is an author of original content.

The following discussion refers to the resource server 102-1, the client device 104-1, the entity 105-1, and the search engine 112. However, it should be noted that the following discussion may be applied to any resource server, client device, entity, and search engine. Furthermore, the following discussion refers to particular modules of the server 110 performing particular operations illustrated in the FIGS. 27-32. However, the operations discussed below may be performed by other modules of the server 110.

Figure 27:
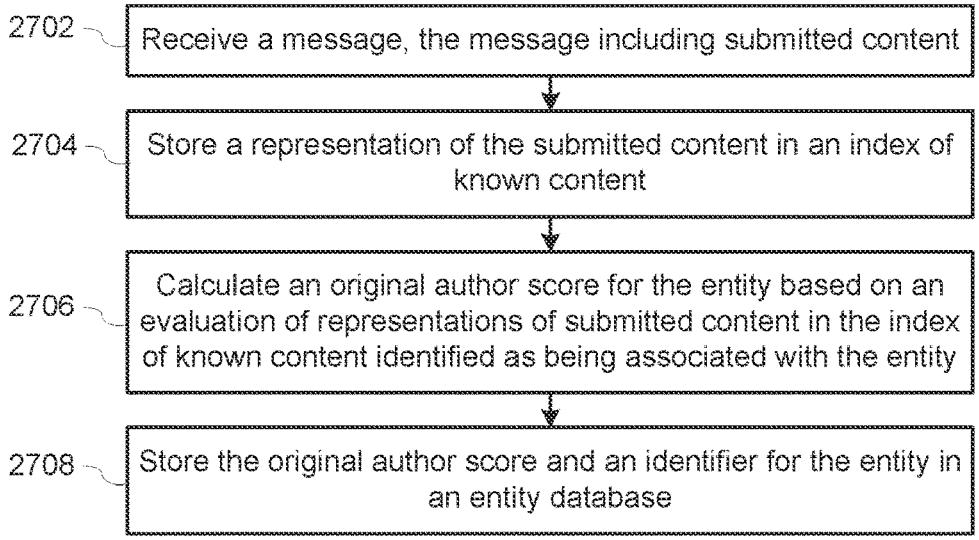
FIG. 27 is a flowchart of a method for determining a likelihood that an entity is an author of original content, according to some embodiments.

FIG. 27 is a flowchart of a method 2700 for determining a likelihood that an entity is an author of original content, according to some embodiments. Note that an author of original content is an entity that generates original content. Specifically, an author of original content is more likely to generate original content than to generate (or copy) content (or a subset of content) authored by others. The content module 204 receives (2702) a message (e.g., the message 230, the message 330, etc.), where the message includes submitted content (e.g., the submitted content 231, the submitted content 331, etc.), and where the submitted content is identified as being associated with an entity (e.g., the entity 105-1). In some embodiments, the message includes a timestamp. In some embodiments, the message includes a link to a location on a resource (e.g., the resource server 102-1) hosting the submitted content.

In some embodiments, the message is received in response to the entity publishing the submitted content on a website. In some embodiments, the message is received in response to the entity submitting the submitted content using a user interface provided by the server. In some embodiments, the message is received in response to the entity submitting the submitted content using a user interface provided by the server, where the submitted content is marked as being submitted by the entity prior to publication of the submitted content by the entity.

The content module 204 stores (2704) a representation of the submitted content in the index of known content 220. Operation 2704 is described in more detail below with reference to FIG. 28.

The author module 206 calculates (2706) an original author score (e.g., the original author score 332) for the entity based on an evaluation of representations of submitted content in the index of known content 220 identified as being associated with the entity. In some embodiments, the original author score indicates a likelihood that the entity is an author of original content. Operation 2706 is described in more detail below with reference to FIGS. 29 and 31.

The author module 206 stores (2708) the original author score and an identifier for the entity in an entity database (e.g., the author database 222).

Figure 28:
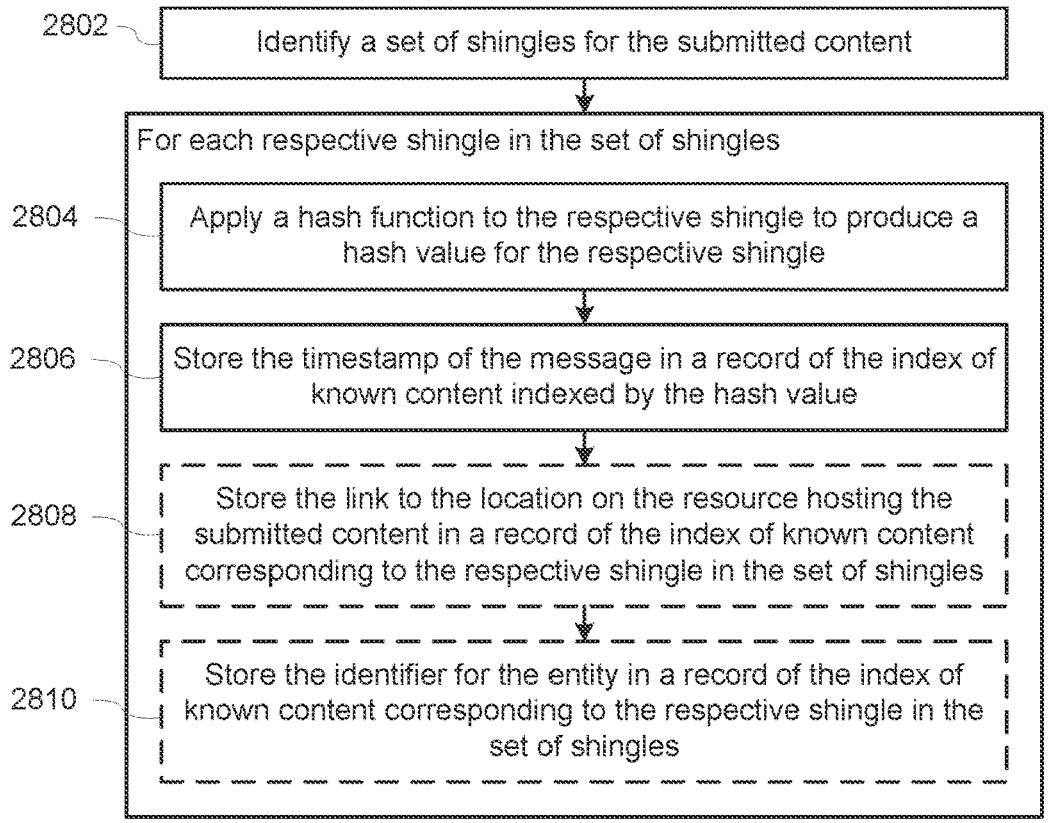
FIG. 28 is a flowchart of a method for storing a representation of submitted content in an index of known content, according to some embodiments.

FIG. 28 is a flowchart of a method for storing (2704) a representation of submitted content in an index of known content, according to some embodiments. The content module 204 identifies a set of shingles for the submitted content. For each respective shingle in the set of shingles, the content module 204 applies (2804) a hash function (e.g., MD5, SHA1, etc.) to the respective shingle to produce a hash value for the respective shingle, stores (2806) the timestamp of the message in a record of the index of known content indexed by the hash value, optionally stores (2808) the link to the location on the resource hosting the submitted content in the record of the index of known content 220 corresponding to the respective shingle in the set of shingles, and optionally stores (2810) the identifier for the entity in the record of the index of known content 220 corresponding to the respective shingle in the set of shingles.

FIG. 29 is a flowchart of a method for calculating (2706) an original author score for an entity, according to some embodiments. The author module 206 identifies (2902) a plurality of shingles representing content, including the submitted content, in the index of known content 220 identified as being associated with the entity. The author module 206 then calculates (2904) a percentage of the plurality of shingles that are first instances of the shingles in the index of known content 220.

FIG. 30 is a flowchart of a method for calculating (2904) a percentage of shingles that are first instances, according to some embodiments. The author module 206 determines (3002) a first number of the plurality of shingles, each having an associated timestamp, for which there are no identical shingles in the index of known content 220 having an earlier timestamp. The author module 206 then calculates (3004) the percentage as a quotient of the first number and a total number of shingles in the plurality of shingles.

In some embodiments, the author module 206 calculates (2904) a percentage of shingles that are first instances by determining a first number of the plurality of shingles that are unique with respect to all other shingles in the index of known content 220, determining a second number of the plurality of shingles that are not unique with respect to the corresponding shingles in the index of known content but that are associated with timestamps that precede timestamps for identical shingles in the index of known content, and calculating the percentage as a quotient of (i) a sum of the first number and the second number and (ii) a total number of shingles in the plurality of shingles.

FIG. 31 is a flowchart of another method for calculating (2706) an original author score for an entity, according to some embodiments. The author module 206 identifies (3102) a plurality of portions of content, including the submitted content, in the index of known content identified as being associated with the entity. In some embodiments, each portion in the plurality of portions represents a predetermined amount of data in the index of known content. The author module 206 then calculates (3104) a percentage of the plurality of the portions that are first instances of the portions of content in the index of known content.

Figure 32:
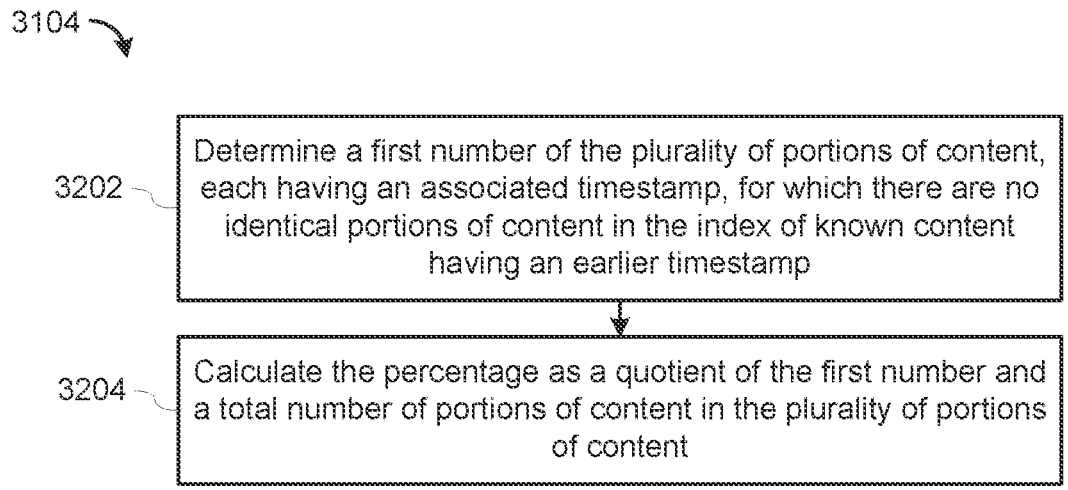
FIG. 32 is a flowchart of a method for calculating a percentage of portions of content that are first instances, according to some embodiments.
Figure 33:
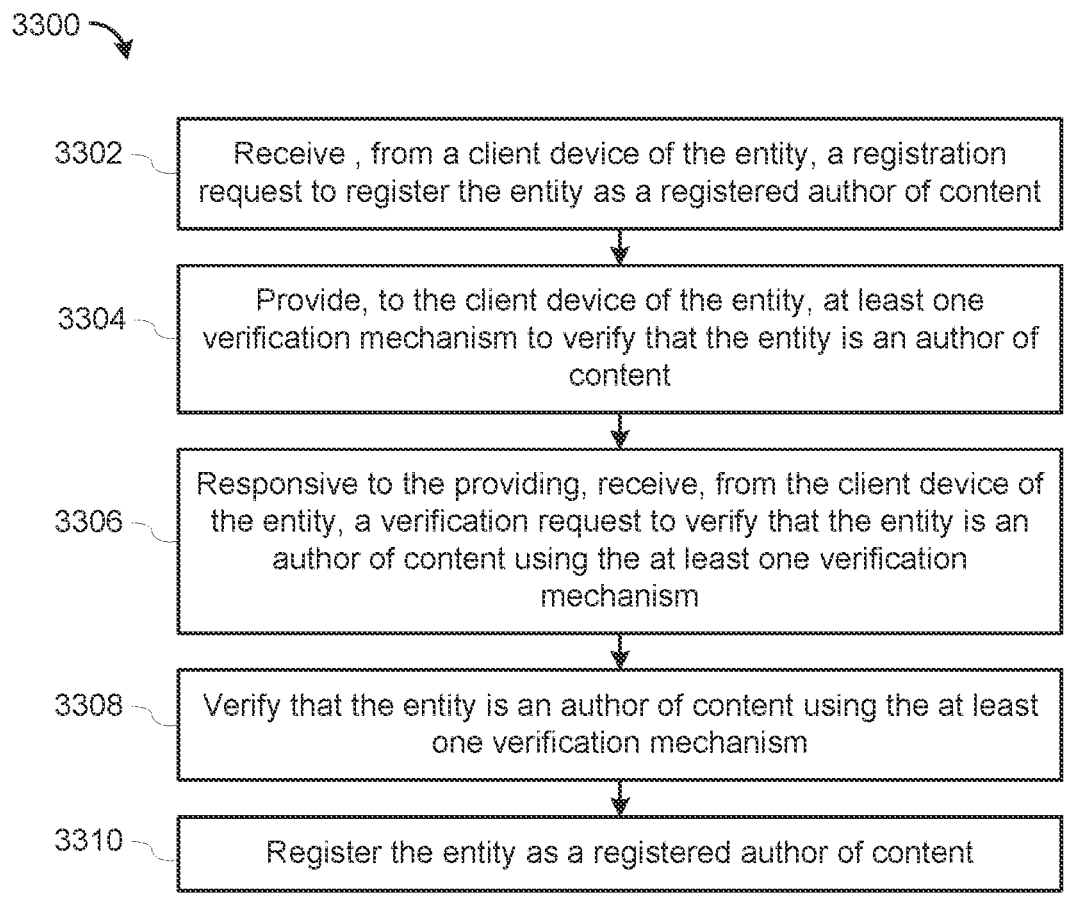
FIG. 33 is a flowchart of a method for registering an entity as a registered author of content, according to some embodiments.

FIG. 32 is a flowchart of a method for calculating (3104) a percentage of portions of content that are first instances, according to some embodiments. The author module 206 determines (3202) a first number of the plurality of portions of content, where each portion of content in the plurality of portions of content has an associated timestamp, for which there are no identical portions of content in the index of known content having an earlier timestamp. The author module 206 then calculates (3204) the percentage as a quotient of the first number and a total number of portions of content in the plurality of portions of content.

In some embodiments, the author module 206 calculates (3104) a percentage of portions of content that are first instances by determining a first number of the plurality of portions of content that are unique with respect to all other portions of content in the index of known content, determining a second number of the plurality of portions of content that are not unique with respect to the corresponding portions of content in the index of known content but that are associated with timestamps that precede timestamps for identical portions of content in the index of known content, and calculating the percentage as a quotient of (i) a sum of the first number and the second number and (ii) a total number of portions of content in the plurality of portions of content.

In some embodiments, the author module 206 calculates (2706) an original author score for an entity by identifying an amount of content (where the amount of content includes the submitted content) in the index of known content 220 identified as being associated with the entity and calculating a percentage of the amount that is uniquely represented in the index of known content. In some implementations, the author module 206 calculates the percentage of the amount by determining a subset of the amount for which there are no identical portions of content in the index of known content having an earlier timestamp and calculating the percentage as a quotient of the subset and the amount.

The methods illustrated in FIGS. 10-19 and 21-27 may be governed by instructions that are stored in a computer readable storage medium and that are executed by at least one processor of at least one server. Each of the operations shown in FIGS. 10-19 may correspond to instructions stored in a non-transitory computer memory or computer readable storage medium. In various implementations, the non-transitory computer readable storage medium includes a magnetic or optical disk storage device, solid state storage devices such as Flash memory, or other non-volatile memory device or devices.

The computer readable instructions stored on the non-transitory computer readable storage medium may be in source code, assembly language code, object code, or other instruction format that is interpreted and/or executable by one or more processors.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

Embodiments in which a second search result and a first search result are swapped in ranked search results have been presented above. In an alternative implementation of any of these embodiments, rather than swapping the second search result and the first search result in the ranked search results to produce re-ranked search results as specified, the second search result is given a higher ranking that is not necessarily that of the first search result. For example, in some embodiments, the second search result is given the ranking of the first result and the first result is deleted from the ranked search results. In another example, the first search result is given a ranking in the ranked search results that is less than its original ranking and the second search result is given a ranking that is greater than its original ranking in the ranked search results. In this way, the second search result obtains a ranking that is higher than the ranking of the first search result in the revised ranked search results. In yet another example, the second search result is given a ranking that is greater than it original ranking such that its ranking is higher than the ranking of the first search result in the revised ranked search results.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

We claim:

1. A system comprising:
   at least one processor;
   memory; and
   at least one program configured to provide an interface for submitting content for high-priority indexing when executed by the at least one processor, the at least one program comprising instructions to:
      receive submitted content via the interface, the interface receiving the submitted content from an entity claiming authorship of the submitted content;
      receive a link identifying an Internet address hosting the submitted content; and
      in response to determining that the submitted content is new relative to known content in an index of known content, add the submitted content to the index of the known content, the submitted content being added without visiting the Internet address.

2. The system of claim 1, the at least one program further comprising instructions to:
   determine an original author score for the entity based on an evaluation of representations of submitted content in the index of known content identified as being associated with the entity, the original author score indicating a likelihood that the entity is an author of original content,
   wherein adding the submitted content to the index occurs responsive to determining that the submitted content is new relative to known content and that the original author score satisfies a threshold.

3. The system of claim 1, wherein determining whether the submitted content is new relative to known content includes:
   identifying a set of shingles representing the submitted content, a respective shingle in the set of shingles including a predetermined number of consecutive tokens for the submitted content;
   comparing the set of shingles representing the submitted content with a first plurality of shingles representing the known content; and
   when less than a second predetermined threshold number of the set of shingles representing the submitted content is included in the first plurality of shingles representing the known content, determining that the submitted content is new relative to the known content.

4. The system of claim 1, wherein adding the submitted content to the index includes:
   identifying a set of shingles for the submitted content; and
   for each respective shingle in the set of shingles:
      applying a hash function to the respective shingle to produce a respective hash value for the respective shingle, and
      storing the link and a timestamp of receipt of the submitted content in a record in the index of known content indexed by the respective hash value.

5. The system of claim 1, wherein the at least one program further comprises operations to receive a successful login by the entity prior to providing the interface.

6. The system of claim 5, wherein the link is associated with an account for the entity, the account being accessible in response to the successful login.

7. The system of claim 1, wherein the link is submitted with the submitted content via the interface.

8. A computer-implemented method for crawling and indexing content, performed on a server system having at least one processor and memory storing at least one program for execution by the at least one processor to perform the method, comprising:
   receiving submitted content via an interface for receiving the submitted content from an entity claiming authorship of the submitted content;
   receiving a link identifying a location hosting the submitted content; and
   in response to determining that the submitted content is new relative to known content, issuing a high-priority request to a search engine to index the submitted content without crawling the location.

9. The computer-implemented method of claim 8, further comprising associating the submitted content with the entity in a registered content database.

10. The computer-implemented method of claim 8, wherein the submitted content is content copied from the location.

11. The computer-implemented method of claim 9, further comprising associating the link with the entity in the registered content database.

12. The computer-implemented method of claim 8, further comprising:
   determining an original author score for the entity based on an evaluation of representations of submitted content in the known content identified as being associated with the entity, the original author score indicating a likelihood that the entity is an author of original content,
   wherein issuing the high-priority request occurs responsive to determining that the submitted content is new relative to known content and that the original author score satisfies a threshold.

13. The computer-implemented method of claim 8, wherein the at least one program further comprises operations to receive a successful login by the entity prior to providing the interface.

14. The computer-implemented method of claim 9, wherein the registered content database associates the link with the submitted content.

15. A non-transitory computer-readable medium storing instructions that, when executed by at least one processor, cause a server to perform operations comprising:
   receive submitted content via an interface for receiving the submitted content from an entity claiming authorship of the submitted content;
   receive a link identifying a location hosting the submitted content; and
   in response to determining that the submitted content is new relative to known content, issue a high-priority request to a search engine to index the submitted content without crawling the location.

16. The non-transitory computer-readable medium of claim 15, further storing instructions that cause the server to associate the submitted content with the entity in a registered content database.

17. The non-transitory computer-readable medium of claim 15, wherein the submitted content is content copied from the location.

18. The non-transitory computer-readable medium of claim 16, further storing instructions that cause the server to associate the link with the entity in the registered content database.

19. The non-transitory computer-readable medium of claim 15, further storing instructions that cause the server to receive a successful login by the entity prior to providing the interface.

20. The non-transitory computer-readable medium of claim 16, wherein the registered content database associates the link with the entity, the link being associated with an Internet address that contains a copy of the submitted content.

\* \* \* \* \*